US012112691B2

(12) United States Patent
Kim et al.

(10) Patent No.: US 12,112,691 B2
(45) Date of Patent: Oct. 8, 2024

(54) DISPLAY MODULE INCLUDING A DISPLAY PANEL AND DRIVING CIRCUIT

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Eun Kyo Jung, Suwon-si (KR); Jungwoo Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 18/154,364

(22) Filed: Jan. 13, 2023

(65) Prior Publication Data

US 2023/0178012 A1 Jun. 8, 2023

Related U.S. Application Data

(63) Continuation of application No. PCT/KR2021/010905, filed on Aug. 17, 2021.

(30) Foreign Application Priority Data

Sep. 17, 2020 (KR) ........................ 10-2020-0119691
Mar. 30, 2021 (KR) ........................ 10-2021-0041407

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01);
(Continued)

(58) Field of Classification Search
CPC ............. G09G 3/32; G09G 2310/0267; G09G 2310/08; G09G 2320/0633; G09G 2330/021
See application file for complete search history.

(56) References Cited

U.S. PATENT DOCUMENTS 7,167,169 B2 1/2007 Libsch et al.
7,808,497 B2 10/2010 Lo et al.
(Continued)

FOREIGN PATENT DOCUMENTS

CN 110310594 A 10/2019
CN 111243514 A 6/2020
(Continued)

OTHER PUBLICATIONS

International Search Report (PCT/ISA/210) issued Nov. 21, 2021 by the International Searching Authority in International Patent Application No. PCT/KR2021/010905.
(Continued)

*Primary Examiner* — Lisa S Landis
(74) *Attorney, Agent, or Firm* — Sughrue Mion, PLLC

(57) ABSTRACT

A display module comprises: a display panel; and a driving unit configured to apply a first control signal for setting a PWM data voltage to sub-pixels, included in each row-line of the display panel for each image frame, to the sub-pixels in a row-line order, and apply a second control signal for controlling the light emission of sub-pixels, included in each row-line, to the sub-pixel in a row-line order, wherein the sub-pixels included in each row-line emit light for a time corresponding to the PWM data voltage set according to the
(Continued)

300 first control signal, based on the second control signal applied to the light emission section corresponding to the image frame, and do not emit light for a preset time based on second control signal applied in a period between consecutive image frame periods.

11 Claims, 36 Drawing Sheets

(52) U.S. Cl.
CPC ............... *G09G 2320/0633* (2013.01); *G09G 2330/021* (2013.01)

(56) References Cited

U.S. PATENT DOCUMENTS

| | | | |
|---|---|---|---|
| 8,022,907 B2 | 9/2011 | Park et al. | |
| 9,349,313 B2 | 5/2016 | KaWae et al. | |
| 9,478,175 B2 | 10/2016 | Lim | |
| 10,706,766 B2 | 7/2020 | Kim et al. | |
| 10,832,615 B2 | 11/2020 | Kim et al. | |
| 10,902,793 B2 | 1/2021 | Oh et al. | |
| 11,056,047 B2 | 7/2021 | Shigeta et al. | |
| 11,335,243 B2 | 5/2022 | Zheng et al. | |
| 11,398,181 B2 | 7/2022 | Kim et al. | |
| 2006/0220578 A1 | 10/2006 | Park et al. | |
| 2014/0055444 A1 | 2/2014 | Jang | |
| 2014/0152709 A1 | 6/2014 | Kawae et al. | |
| 2015/0035733 A1 | 2/2015 | Woo et al. | |
| 2017/0263183 A1 | 9/2017 | Lin et al. | |
| 2018/0151132 A1 | 5/2018 | Lee et al. | |
| 2018/0240382 A1 | 8/2018 | Choi et al. | |
| 2019/0189063 A1 | 6/2019 | Kitani et al. | |
| 2019/0371232 A1* | 12/2019 | Kim | G09G 3/2011 |
| 2020/0082768 A1 | 3/2020 | Oh et al. | |
| 2020/0111404 A1 | 4/2020 | Kim et al. | |
| 2020/0265777 A1 | 8/2020 | Shigeta et al. | |
| 2021/0027699 A1 | 1/2021 | Zheng et al. | |
| 2021/0304670 A1 | 9/2021 | Shigeta et al. | |

FOREIGN PATENT DOCUMENTS

| | | |
|---|---|---|
| EP | 4 018 431 A1 | 6/2022 |
| KR | 10-0629586 B1 | 9/2006 |
| KR | 10-2014-0071236 A | 6/2014 |
| KR | 10-2019-0137658 A | 12/2019 |
| KR | 10-2020-0030431 A | 3/2020 |
| KR | 10-2020-0088696 A | 7/2020 |
| KR | 10-2020-0101605 A | 8/2020 |
| KR | 10-2317528 B1 | 10/2021 |
| WO | 2020/007024 A1 | 1/2020 |

OTHER PUBLICATIONS

Written Opinion (PCT/ISA/237) issued Nov. 21, 2021 by the International Searching Authority in International Patent Application No. PCT/KR2021/010905.
International Search Report (PCT/ISA/210) issued Nov. 23, 2021 by the International Searching Authority in International Patent Application No. PCT/KR2021/010905.
Written Opinion (PCT/ISA/237) issued Nov. 23, 2021 by the International Searching Authority in International Patent Application No. PCT/KR2021/010905.
The partial supplementary European search report issued on Jul. 6, 2023 by European Patent Office for European Patent Application No. 21869556.7.
The extended European search report issued on Sep. 6, 2023 by European Patent Office for European Patent Application No. 21869556.7.

* cited by examiner

DISPLAY MODULE INCLUDING A DISPLAY PANEL AND DRIVING CIRCUIT

CROSS-REFERENCE TO RELATED APPLICATIONS

This application is a bypass continuation application of International Application No. PCT/KR2021/010905, filed Aug. 17, 2021, which claims priority to Korean Patent Application Nos. 10-2020-0119691 and 10-2021-0041407 filed on Sep. 17, 2020 and Mar. 30, 2021, respectively, in the Korean Intellectual Property Office, the disclosures of which are herein incorporated by reference in their entireties.

BACKGROUND

1. Field

The present disclosure relates to a display module, and more particularly, to a display module in which a self-luminous device is included in a sub-pixel.

2. Description of Related Art

A conventional display panel in which an inorganic light emitting device such as a red light emitting diode (LED), a green LED, or a blue LED (hereinafter, LED refers to the inorganic light emitting device) which drives as a sub-pixel may express a grayscale of the sub-pixel by using a pulse amplitude modulation (PAM) driving method.

In this case, not only a grayscale of an emitted light but also a wavelength thereof may be changed based on a magnitude of a driving current, thereby reducing color reproducibility of an image. FIG. 1A shows a change in the wavelength based on the magnitude of the driving current flowing through the blue LED, the green LED, or the red LED.

In a related art, to solve this problem, a method of expressing the grayscale of the sub-pixel by using a pulse width modulation (PWM) driving method may be used. However, in the case of the conventional PWM driving method, the data voltage may be charged to each sub-pixel and all the sub-pixels of the display panel may then collectively emit light.

In this case, a light emission section may require a high peak current during the light emission section to thus increase peak power consumption required for a product. As the peak power consumption is increased, a power supply such as a switched mode power supply (SMPS) mounted on the product may require more capacity, which results in an increased cost and a larger volume, thereby also causing a design restriction.

SUMMARY

Provided is a display module having improved color reproducibility based on an input image signal, and a method of driving that includes a display panel in which a plurality of pixels each including a plurality of sub-pixels are arranged in a matrix form; and a driving unit applying a first control signal for setting a pulse width modulation (PWM) data voltage of the sub-pixels included in each row-line of the display panel to the sub-pixels included in all the row-lines of the display panel in the row-line order for each image frame, and applying a second control signal for controlling light emission of the sub-pixels included in the each row-line to the sub-pixels included in all the row-lines thereof in the row-line order based on of a start signal, wherein the sub-pixels included in each row-line emit light for time corresponding to the PWM data voltage set based on the first control signal, based on the second control signal applied to a light emission section corresponding to the image frame, and emit no light for a predetermined time based on the second control signal applied to a period between consecutive image frame periods.

According to an embodiment of the disclosure, a display module may include a sub-pixel circuit and a driving circuit, which may drive an inorganic light emitting device included in a sub-pixel more efficiently and stably, and a method of driving the same.

According to another embodiment of the disclosure, a display module may detect its malfunction even while a user uses the display module, and a method of driving the same.

Additional embodiments will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
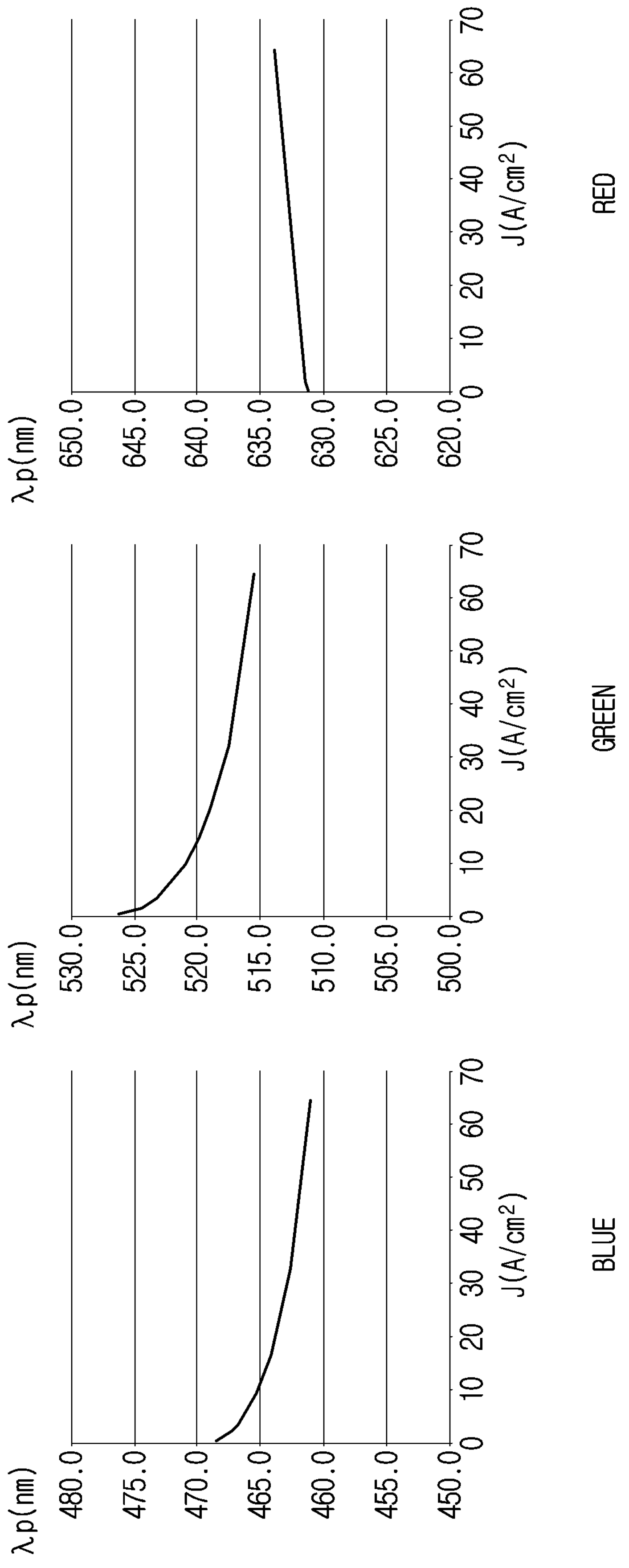
FIG. 1 shows a change in a light wavelength based on a magnitude of a driving current flowing through a blue light emitting diode (LED), a green LED, or a red LED.

Various embodiments will be described in greater detail below with reference to the accompanied drawings. The embodiments described herein may be variously modified. Specific embodiments may be depicted in the drawings and described in detail in the detailed description. However, the specific embodiments described in the accompanied drawings are merely to assist in the understanding of various embodiments. Accordingly, the technical spirit is not to be limited by the specific embodiments described in the accompanied drawings, and should be interpreted to include all equivalents or alternatives of the embodiments included in the idea and the technical scope disclosed herein.

Terms used in the specification are used to describe embodiments, and are not intended to restrict and/or limit the present disclosure. A term of a singular number may include its plural number unless explicitly indicated otherwise in the context.

It is to be understood that terms "include", 'have', or the like used in the specification specify the presence of features, numerals, steps, operations, components, parts mentioned in the specification, or combinations thereof, and do not preclude the presence or addition of one or more other features, numerals, steps, operations, components, parts, or combinations thereof.

Terms including ordinals such as "first," "second" and the like, may be used in the present disclosure to describe various components regardless of a sequence and/or importance of the components. These expressions are used only to distinguish one component from the other components, and do not limit the corresponding components.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component).

On the other hand, in case that any component (for example, the first component) is mentioned to be "directly coupled to" or "directly connected to" another component (for example, the second component), it is to be understood that still other component (for example, the third component) is not present between any component and another component.

Terms used in embodiments of the present disclosure may be interpreted as having the same meanings as meanings generally known to those skilled in the art unless defined otherwise.

Hereinafter, various embodiments of the present disclosure will be described in detail with reference to the drawings.

According to an embodiment of the present disclosure, a display module includes: a display panel in which a plurality of pixels each including a plurality of sub-pixels are arranged in a matrix form; and a driving unit applying a first control signal for setting a pulse width modulation (PWM) data voltage of the sub-pixels included in each row-line of the display panel to the sub-pixels included in all the row-lines of the display panel in a row-line order for each image frame, and applying a second control signal for controlling light emission of the sub-pixels included in each row-line to the sub-pixels included in all the row-lines thereof in the row-line order based on a start signal, wherein the sub-pixels included in each row-line emit light for time corresponding to the PWM data voltage set based on the first control signal, based on the second control signal applied to a light emission section corresponding to the image frame, and emit no light for a predetermined time based on the second control signal applied to a period between consecutive image frame periods.

Whether the display panel malfunctions may be detected based on power supplied to the display panel for the predetermined time.

The driving unit may apply the second control signal to the sub-pixels included in all the row-lines in the row-line order whenever the start signal is input in case that the start signal is input several times at predetermined time intervals during one image frame period.

The sub-pixels included in each row-line may be operated in the plurality of light emission sections whose number corresponds to the input number of the start signal during the one image frame period.

Each of the sub-pixels included in each row-line may include an inorganic light emitting device and a transistor connected to the inorganic light emitting device, and the transistor may be turned on based on the second control signal applied to the plurality of light emission sections, and turned off based on the second control signal applied to the period between the consecutive image frame periods.

The driving unit may include a plurality of driver circuits for applying the second control signal for each row-line.

Each of the plurality of driver circuits may include: an output terminal for outputting a carry signal; and a transistor having a gate terminal connected to the output terminal, and the transistor may select the second control signal applied to the sub-pixels included in each row-line from an input signal and output the same, based on the carry signal input through the gate terminal.

A first driver circuit for outputting the second control signal applied to sub-pixels included in a first row-line among the plurality of driver circuits may generate a first carry signal based on the start signal, select the second control signal applied to the sub-pixels included in the first row-line from the input signal and output the same, based on the first carry signal, and a second driver circuit for outputting the second control signal applied to sub-pixels included in a second row-line among the plurality of driver circuits may generate a second carry signal based on the first carry signal, and generate the second control signal applied to the sub-pixels included in the second row-line from the input signal, based on the second carry signal.

The input signals input to the first driver circuit and the second driver circuit may be the same signals having different phases.

The driving unit may apply scan signals including the first control signal to sub-pixels included in one row-line to set the PWM data voltage of the sub-pixels included in the one row-line, during a data setting section for the one row-line of all the row-lines, and apply emission signals including the second control signal to the sub-pixels included in the one row-line to drive the display panel for the sub-pixels included in the one row-line to emit light for the time corresponding to the set PWM data voltage, during each of the plurality of light emission sections for the one row-line.

A first light emission section among the plurality of light emission sections may be temporally consecutive with a 22-th data setting section (data setting section), and the plurality of light emission sections may have a predetermined time interval.

According to the various embodiments of the present disclosure as described above, it is possible to prevent the wavelength of light emitted from the inorganic light emitting device from being changed based on its grayscale.

It may also be possible to easily correct the blotch or color which may occur in the image displayed on the display panel due to the characteristic deviation between the sub-pixel circuits. In particular, it may be possible to more easily correct the difference in the luminance or colors of the display modules even when the large-area display panel is configured by combining the module-type display panels with each other.

It may also be possible to design the more optimized driving circuit, and drive the inorganic light emitting device stably and efficiently.

It may also be possible to reduce the power consumption when driving the display panel.

It may also contribute to the smaller size and weight of the display panel.

It may also possible to detect the malfunction of the display panel even while the user uses the display module.

Figure 2:
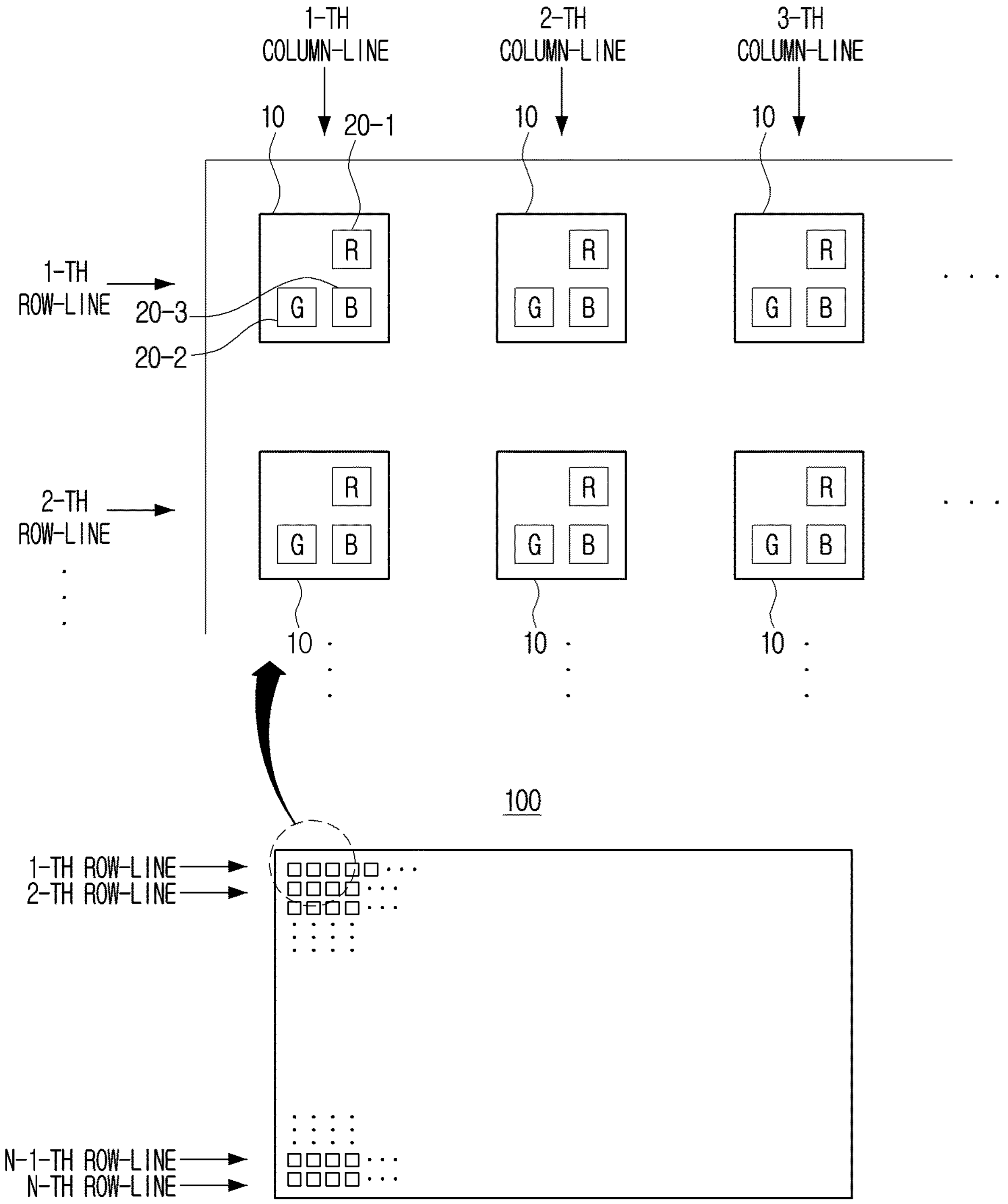
FIG. 2 is a view for explaining a structure of a pixel included in a display panel according to an embodiment.

FIG. 2 is a view for explaining a structure of a pixel included in a display panel according to an embodiment of the present disclosure.

Referring to FIG. 2, a display panel 100 may include a plurality of pixels 10 disposed (or arranged) in a matrix form. Here, the matrix form may include a plurality of row-lines or a plurality of column-lines.

Alternatively, the row-line may be referred to as a horizontal line, a scan line, or a gate line, and the column-line may be referred to as a vertical line or a data line.

Each pixel 10 included in the display panel 100 may have three types of sub-pixels such as a red (R) sub-pixel 20-1, a green (G) sub-pixel 20-2, and a blue (B) sub-pixel 20-3.

Meanwhile, each of the sub-pixels 20-1 to 20-3 may include an inorganic light emitting device corresponding to a type of the sub-pixel and a sub-pixel circuit for controlling a light emission time of the inorganic light emitting device.

That is, the R sub-pixel 20-1 may include a red (R) inorganic light emitting device and a sub-pixel circuit for controlling a light emission time of the R inorganic light emitting device, the G sub-pixel 20-2 may include a green (G) inorganic light emitting device and a sub-pixel circuit for controlling a light emission time of the G inorganic light emitting device, and the B sub-pixel 20-3 may include a blue (B) inorganic light emitting device and a sub-pixel circuit for controlling a light emission time of the B inorganic light emitting device.

Here, each sub-pixel circuit may control the light emission time of the corresponding inorganic light emitting device based on of an applied pulse width modulation (PWM) data voltage, thereby expressing a grayscale of each sub-pixel.

Meanwhile, the sub-pixels included in each row-line of the display panel 100 may be driven in an order of "PWM data voltage setting (or programming)" and "light emission based on the set PWM data voltage." Here, according to an embodiment of the present disclosure, the sub-pixels included in each row-line of the display panel 100 may be driven in a row-line order.

That is, for example, the PWM data voltage setting and light emission operations of sub-pixels included in one row-line (e.g., first row-line), and the PWM data voltage setting and light emission operations of sub-pixels included in a next row-line (e.g., second row-line) may be sequentially performed in the row-line order.

Here, the sequential progress may not indicate that the operations related to the next row-line starts after all the operations (i.e., data setting and light emission operations) related to one row-line are completed.

That is, in the above example, the PWM data voltage setting for the sub-pixels included in the second row-line may not have to be performed after the light emission operation of the sub-pixels included in the first row-line is completed, and the PWM data voltage setting of the sub-pixels included in the second row-line may be performed right after the PWM data voltage setting of the sub-pixels included in the first row-line is performed.

Figure 3A:
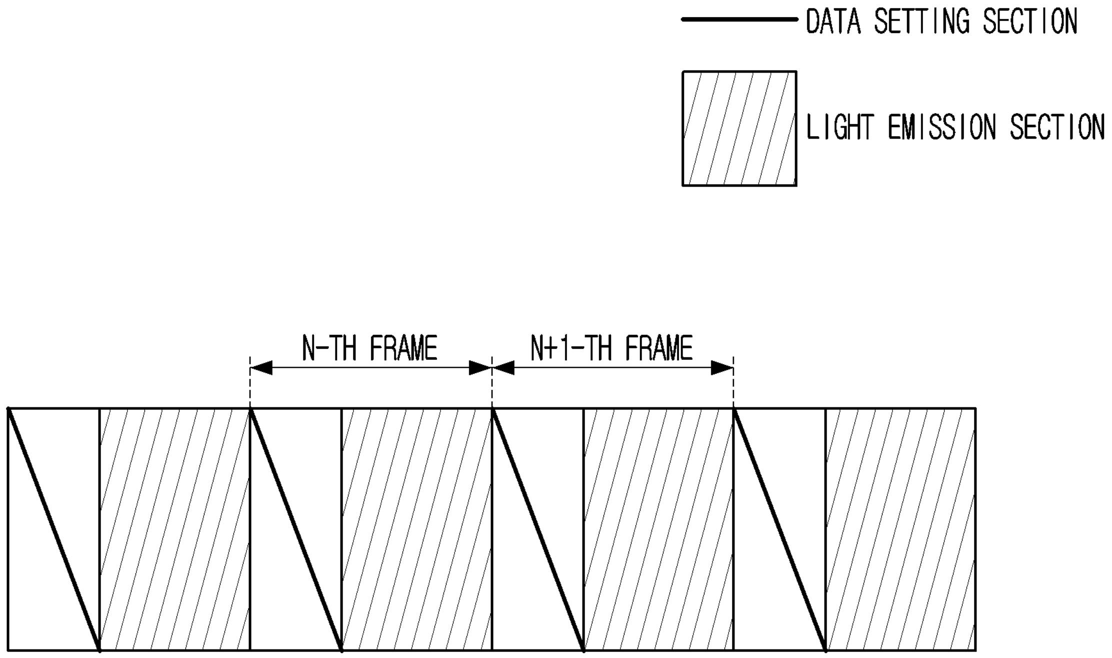
FIG. 3A is a conceptual diagram showing a method of driving a conventional display panel.
Figure 3B:
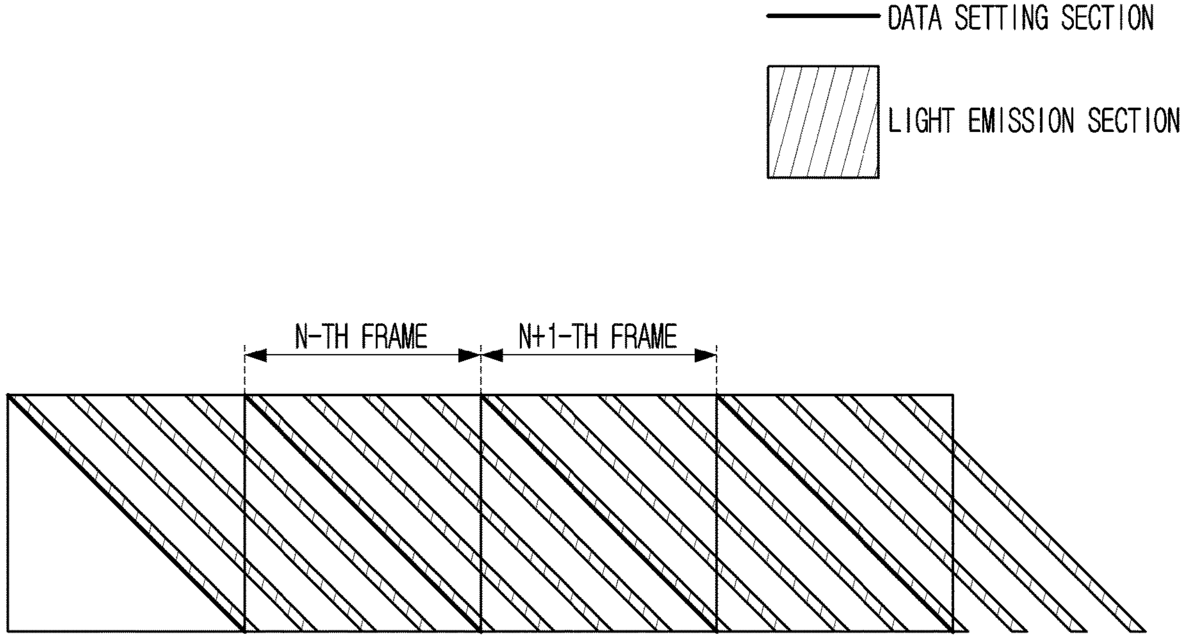
FIG. 3B is a conceptual diagram showing a method of driving a display panel according to an embodiment.

FIG. 3A is a conceptual diagram showing a method of driving a conventional display panel; and FIG. 3B is a conceptual diagram showing a method of driving a display panel according to an embodiment of the present disclosure.

In FIGS. 3A and 3B, a vertical axis represents a row-line of the display panel, and a horizontal axis represents time.

In addition, an n-th frame and an n+1-th frame may respectively represent two consecutive image frame periods among the plurality of image frames.

In addition, a data setting section may represent a driving section of the display panel 100, in which the PWM data voltage may be applied to the sub-pixels included in each row-line and set, and a light emission section may represent a driving section of the display panel 100, in which the sub-pixels emit light for time corresponding to the PWM data voltage in the section.

Referring to FIG. 3A, in the related art, the PWM data voltage settings for all row-lines of the display panel are first completed, and the light emission sections for all the row-lines are then collectively performed.

In this case, all the row-lines of the display panel may emit light simultaneously during the light emission section, thus requiring a high peak current. Accordingly, as peak power consumption required for a product may be increased, a power supply such as a switched mode power supply (SMPS) mounted on the product may require more capacity, which results in an increased cost and a larger volume, thereby also causing a design restriction.

Alternatively, as shown in FIG. 3B, according to various embodiments of the present disclosure, the PWM data voltage setting and light emission sections (in detail, light emission sections) for each row-line are sequentially performed in a row-line order.

In this way, the light emission section for each row-line may be sequentially driven in the row-line order, which may reduce the number of row-lines that simultaneously emit light. Accordingly, an amount of a required peak current may be less than that of the related art, thereby reducing the peak power consumption.

As described above, according to various embodiments of the present disclosure, the inorganic light emitting device may be driven in an active matrix (AM) type by using the PWM driving method, thereby preventing a wavelength of light emitted from the inorganic light emitting device from being changed based on its grayscale. In addition, the display panel 100 may be driven so that the sub-pixels sequentially emit light in the row-line order, thereby reducing instantaneous peak power consumption.

Meanwhile, FIG. 2 exemplifies that the sub-pixels 20-1 to 20-3 are arranged in an L-shape having reversed left and right during one pixel region. However, an embodiment may not be limited thereto, and the R, G, and B sub-pixels 20-1 to 20-3 may be arranged in a line in the pixel region, or may be arranged in any of various shapes according to an embodiment.

In addition, FIG. 2 exemplifies that three types of sub-pixels are included in one pixel. However, in some embodiments, four types of sub-pixels such as R, G, B, and W (white) may be included in one pixel, and any number of different sub-pixels may be included in one pixel.

Figure 4:
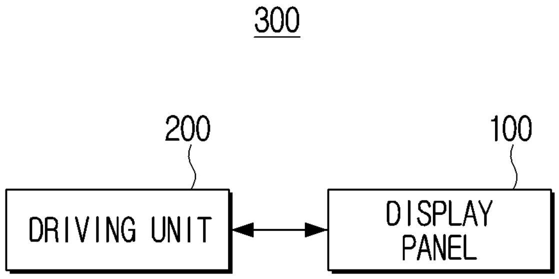
FIG. 4 is a block diagram showing a configuration of a display module according to an embodiment.

FIG. 4 is a block diagram showing a configuration of a display module according to an embodiment of the present disclosure. According to FIG. 4, a display module 300 may include the display panel 100 and a driving unit 200.

The driving unit 200 may drive the display panel 100. In detail, the driving unit 200 may drive the display panel 100 by providing the display panel 100 with various control signals, data signals, driving voltages, and the like.

The driving unit 200 may include a gate driver for providing a control signal for driving the pixels of the display panel 100 in row-line units.

The driving unit 200 may further include a source driver (or data driver) for providing the PWM data voltage to each pixel (or each sub-pixel) of the display panel 100.

The driving unit 200 may further include a DeMUX circuit for selecting each of the plurality of sub-pixels 20-1 to 20-3 included in one pixel 10.

The driving unit 200 may further include a driving voltage supply circuit for providing each sub-pixel circuit included in the display panel 100 with various driving voltages (e.g., first driving voltage, second driving voltage, ground voltage, test voltage, Vset voltage, described below) and a constant current source voltage described below.

The driving unit 200 may further include a clock signal supply circuit for providing the gate driver or the data driver with various clock signals, and a sweep signal supply circuit for providing the sub-pixel circuit with a sweep signal (or sweep voltage) described below.

Meanwhile, at least some of the above-described various circuits of the driving unit 200 may be implemented in separate chips, mounted on an external printed circuit board (PCB) together with a timing controller (TCON), and connected to sub-pixel circuits positioned in a thin film transistor (TFT) layer of the display panel 100 through film on glass (FOG) wiring.

Alternatively, at least some of the above-described various circuits of the driving unit 200 may be implemented in the separate chips, disposed on a film in the form of a chip on film (COF), and connected to the sub-pixel circuits positioned in the thin film transistor (TFT) layer of the display panel 100 through the film on glass (FOG) wiring.

Alternatively, at least some of the above-described various circuits of the driving unit 200 may be implemented in the separate chips, disposed in the form of a chip on glass (COG) (that is, disposed on a rear surface (or a surface of a glass substrate, opposite to its surface on which the TFT layer may be positioned) of the glass substrate (described below) of the display panel 100, and connected to the sub-pixel circuits positioned in the thin film transistor (TFT) layer of the display panel 100 through connection wiring.

Alternatively, at least some of the above-described various circuits of the driving unit 200 may be positioned on the TFT layer together with the sub-pixel circuits positioned in the TFT layer in the display panel 100, and connected to the sub-pixel circuits.

For example, among the above-described various circuits of the driving unit 200, the gate driver, the sweep signal supply circuit, and the DeMUX circuit may be arranged in the TFT layer of the display panel 100, the data driver may be disposed on the rear surface of the glass substrate included in the display panel 100, and the driving voltage supply circuit, the clock signal supply circuit, and the timing controller (TCON) may be arranged on the external printed circuit board (PCB). However, the present disclosure may not be limited thereto.

In particular, according to an embodiment of the present disclosure, the driving unit 200 may apply a first control signal for setting the PWM data voltage of the sub-pixels included in each row-line of the display panel 100 to the sub-pixels included in all the row-lines of the display panel 100 in the row-line order.

Here, the first control signal may be one of scan signals applied to the data setting section, and may be a control signal SP(n). A detailed description thereof is provided below.

For example, the display panel 100 may include 270 row-lines. In this case, the driving unit 200 may sequentially apply the first control signal to the sub-pixels included in each row-line from a first row-line to 270-th row-line.

Accordingly, the PWM data voltage corresponding to the image frame may be set to the sub-pixels included in each row-line of the display panel 100 in the row-line order.

Meanwhile, the driving unit 200 may apply a second control signal for controlling the light emission of the sub-pixels included in each row-line of the display panel 100 to the sub-pixels included in all the row-lines of the display panel 100 in the row-line order.

Here, the second control signal may be one of emission signals applied to the light emission section, and may be a control signal Emi_PAM(n). A detailed description thereof is provided below.

In the above example, the driving unit 200 may sequentially apply the second control signal to the sub-pixels included in each row-line from the first row-line to the 270-th row-line.

Accordingly, the light emission operation of the sub-pixels included in each row-line may be controlled in the row-line order.

In detail, the sub-pixels included in each row-line may emit light for time corresponding to the PWM data voltage set based on the first control signal, based on the second control signal applied to the light emission section corresponding to the image frame.

In addition, the sub-pixels included in each row-line may emit no light for a predetermined time based on the second control signal applied to a period between the consecutive image frame periods. Here, the period between the consecutive image frame periods may be a blanking period in which valid image data may not be applied to the display panel 100.

That is, according to an embodiment of the present disclosure, the blanking period may include a no-light emission section in which none of the sub-pixels included in each row-line emits light, and this no-light emission section may be implemented by the second control signal of a specific level, applied for the predetermined time in the blanking period. A more detailed description thereof is provided below.

Meanwhile, a problem such as a fire may occur when the display panel 100 may be driven during its malfunction, such as a thin film transistor (TFT) substrate being damaged. Therefore, it may be necessary to take measures such as stopping the driving of the display panel or cutting off power supply thereto when the malfunction of the display panel 100 may be detected.

According to an embodiment of the present disclosure, the malfunction of the display panel 100 may be detected based on power supplied to the display panel 100 in the no-light emission section during the blanking period.

For example, whether the display panel 100 malfunctions may be determined based on whether a current flows from the driving voltage supply circuit to the display panel 100 during the no-light emission section. Any sub-pixel of the display panel 100 may emit no light in the no-light emission section, and no current may flow from the driving voltage supply circuit to the display panel 100. However, the display panel 100 may malfunction, such as a short circuit occurring in the sub-pixel circuit, the current may flow from the driving voltage supply circuit to the display panel 100 in the no-light emission section. Accordingly, a processor or the TCON may determine that the display panel 100 malfunctions when the current flows from the driving voltage supply circuit to the display panel 100 during the no-light emission section.

Figure 5:
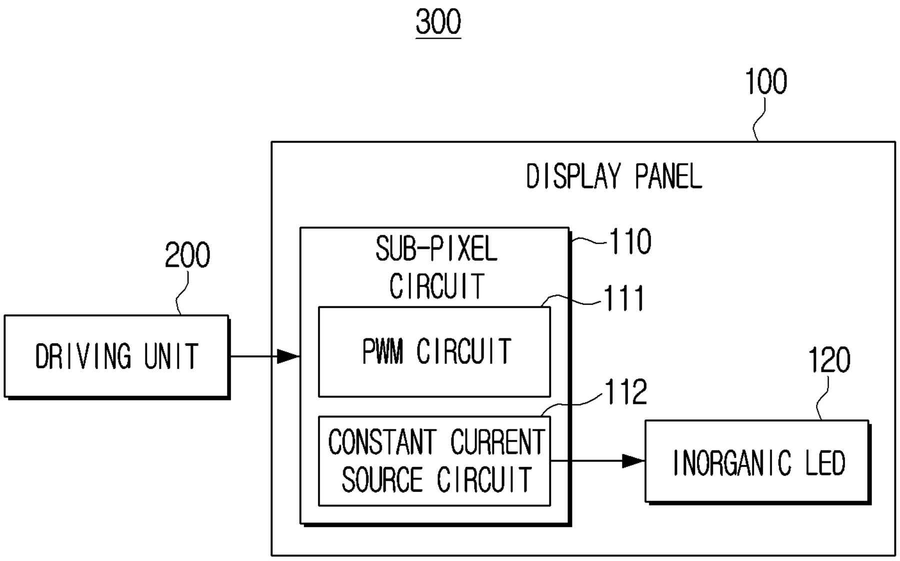
FIG. 5 is a block diagram showing a detailed configuration of the display module according to an embodiment.

FIG. 5 is a block diagram showing a detailed configuration of the display module 300 according to an embodiment of the present disclosure. The description with reference to FIG. 5 omits a description of a content overlapping the above description provided with reference to FIG. 4.

Referring to FIG. 5, the display module 300 may include the display panel 100 including a sub-pixel circuit 110 and an inorganic light emitting device 120, and the driving unit 200.

As described below, the display panel 100 may have the sub-pixel circuit 110 disposed on glasses and the inorganic light emitting device 120 disposed on the sub-pixel circuit 110. Meanwhile, FIG. 5 only shows a configuration of one sub-pixel included in the display panel 100 for convenience of explanation. However, each sub-pixel of the display panel 100 may include the sub-pixel circuit 110 and the inorganic light emitting device 120.

The inorganic light emitting device 120 may be mounted on the sub-pixel circuit 110 to be electrically connected to the sub-pixel circuit 110, and may emit light based on a driving current provided from the sub-pixel circuit 110.

The inorganic light emitting device 120 may include the sub-pixels 20-1 to 20-3 of the display panel 100, and include a plurality of types based on a color of emitted light. For example, the inorganic light emitting device 120 may include the red (R) inorganic light emitting device that emits light of a red color, the green (G) inorganic light emitting device that emits light of a green color, and the blue (B) inorganic light emitting device that emits light of a blue color.

Accordingly, a type of the above-mentioned sub-pixel may depend on a type of the inorganic light emitting device 120. That is, the R inorganic light emitting device may be the R sub-pixel 20-1, the G inorganic light emitting device may be the G sub-pixel 20-2, and the B inorganic light emitting device may be the B sub-pixel 20-3.

Here, the inorganic light emitting device 120 may refer to a light emitting device manufactured using an inorganic material, which may be different from an organic light emitting diode (OLED) manufactured using an organic material.

In particular, according to an embodiment of the present disclosure, the inorganic light emitting device 120 may be a micro light emitting diode (micro LED or μLED) having a size of 100 micrometers (μm) or less.

A display panel in which each sub-pixel may be implemented as the micro LED and may be referred to as a micro LED display panel. The micro LED display panel may be one of flat panel display panels, and may include a plurality of inorganic light emitting diodes (inorganic LEDs) each having the size of 100 micrometers or less. The micro LED display panel may provide better contrast, response time and energy efficiency compared to a liquid crystal display (LCD) panel that requires a backlight. Meanwhile, both the organic light emitting diode (OLED) and the micro LED may have good energy efficiency. However, the micro LED may provide better performance than the OLED in terms of brightness, luminous efficiency, and lifespan.

The inorganic light emitting device 120 may express a grayscale value of different brightness based on a magnitude of the driving current provided from the sub-pixel circuit 110 or a pulse width of the driving current. Here, the pulse width of the driving current may be referred to as a duty ratio of the driving current or a driving time (or duration) of the driving current.

For example, the inorganic light emitting device 120 may express a brighter grayscale value as the driving current has a greater magnitude. In addition, the inorganic light emitting device 120 may express a brighter grayscale value as the driving current has a larger pulse width (i.e., higher duty ratio or longer driving time).

The sub-pixel circuit 110 may provide the driving current to the inorganic light emitting device 120. In detail, the sub-pixel circuit 110 may provide the inorganic light emitting device 120 with the driving current whose magnitude and driving time are controlled, based on the data voltage (e.g., constant current source voltage or PWM data voltage), the driving voltage (e.g., first driving voltage, second driving voltage, or ground voltage), and the various control signals, applied from the driving unit 200.

That is, the sub-pixel circuit 110 may drive the inorganic light emitting device 120 by using the pulse amplified modulation (PAM) driving method and/or the pulse width modulation (PWM) driving method to thus control the brightness of light emitted from the inorganic light emitting device 120.

To this end, the sub-pixel circuit 110 may include a constant current source (or constant current generator) circuit 112 for providing the inorganic light emitting device 120 with a constant current having a magnitude corresponding to that of the applied constant current source voltage, and a PWM circuit 111 for providing the inorganic light emitting device 120 with the constant current provided by the constant current source circuit 112 for the time corresponding to the PWM data voltage. Here, the above-mentioned driving current may be a constant current provided to the inorganic light emitting device 120.

Meanwhile, according to an embodiment of the present disclosure, the driving unit 200 may apply the same constant current source voltage to all the constant current source circuits 112 of the display panel 100. Therefore, the driving current (i.e., constant current) having the same magnitude may be provided to each inorganic light emitting device 120 through each constant current source circuit 112, thereby solving the problem of the change in a wavelength of the LED, occurring due to a change in the magnitude of the driving current.

In addition, the driving unit 200 may apply the PWM data voltage corresponding to the grayscale value of each sub-pixel to each PWM circuit 111 of the display panel 100. Accordingly, the driving time of the driving current (i.e., constant current) provided to the inorganic light emitting device 120 of each sub-pixel may be controlled by the PWM circuit 111. Accordingly, the grayscale of an image may be expressed.

Meanwhile, the same constant current source voltage may be applied to one display module 300, whereas a different constant current source voltage may be applied to another display module 300. Accordingly, the plurality of display modules may be connected with each other to implement one large display device, and a brightness deviation or a color deviation between the display modules that may occur may here be compensated for by adjusting the constant current source voltage.

The above-described display module 300 according to the various embodiments of the present disclosure may be applied to a wearable device, a portable device, a handheld device, or any of various electronic or electrical products that requires a display, as a single unit.

In addition, the display module 300 according to the various embodiments of the present disclosure may be applied to a small display device such as a monitor for a personal computer (PC), a television (TV), or the like, and a large display device such as a digital signage, an electronic display, or the like, through assembly arrangement of the plurality of display modules 300.

Hereinafter, a method of driving the display panel 100 as shown in FIG. 3B is described in detail with reference to FIGS. 6A to 6E.

Figure 6A:
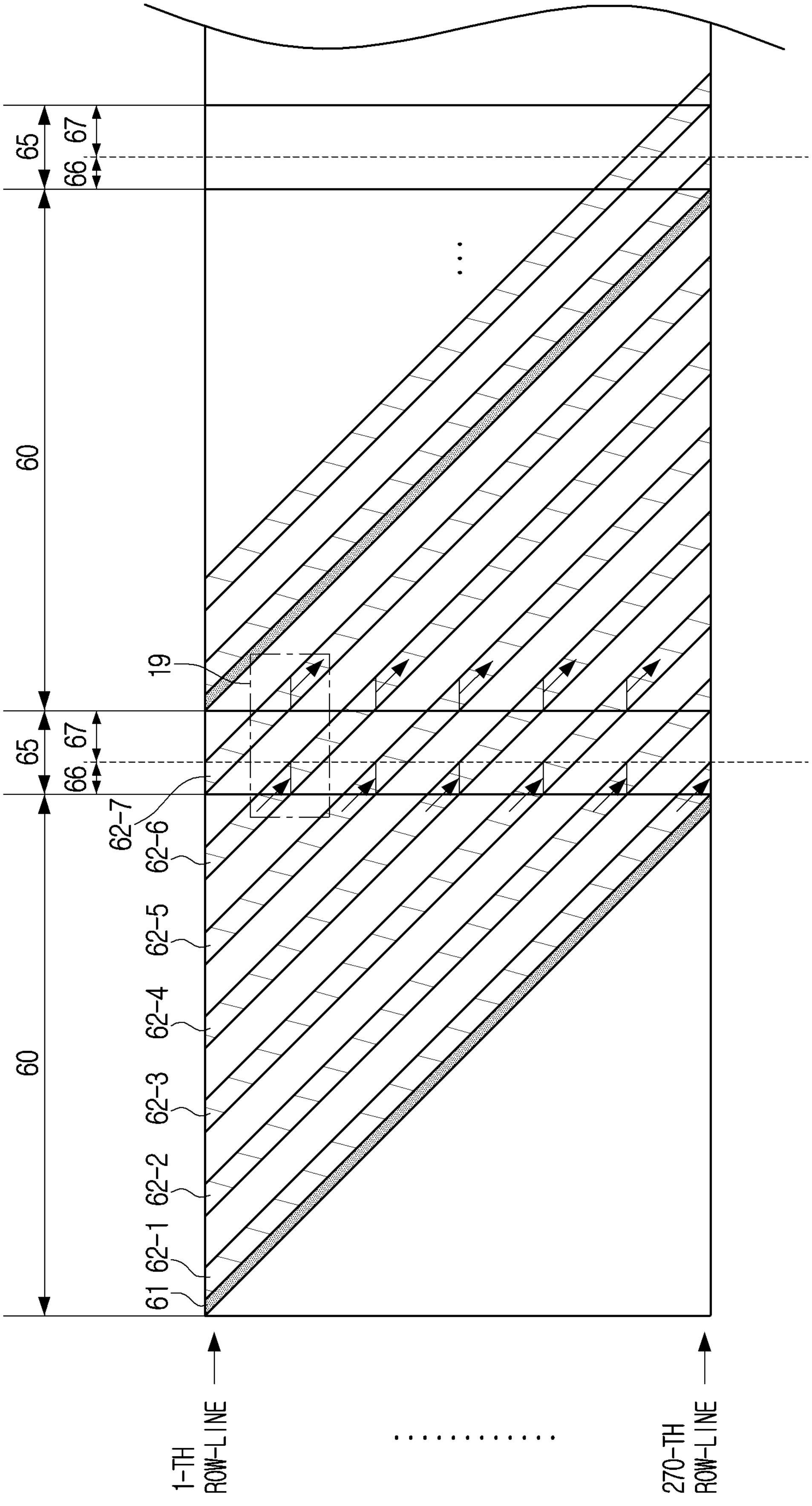
FIG. 6A is a view for explaining a method of driving the display panel according to an embodiment.

FIG. 6A is a view for explaining the method of driving the display panel 100 according to an embodiment of the present disclosure.

FIG. 6A shows a concept of the method of driving the display panel 100 with respect to three consecutive image frames. In FIG. 6A, a vertical axis represents a row-line, and the horizontal axis represents time.

Meanwhile, FIG. 6A exemplifies that the display panel 100 includes 270 row-lines, and seven light emission sections are performed for one image frame. However, the number of row-lines or the number of light emission sections may not be limited thereto.

Referring to FIG. 6A, it may be seen that, for one image frame, one data setting section 61 and a plurality of light emission sections 62-1 to 62-7 are performed for each row-line.

The PWM data voltage may be set for the sub-pixels included in each row-line during the data setting section. In addition, the sub-pixels included in each row-line may emit light for time corresponding to the PWM data voltage set in the data setting section 61 during each of the plurality of light emission sections.

To this end, the driving unit 200 may apply the sub-pixels included in the corresponding row-line with scan signals (e.g., VST or SP, described below) for setting the PWM data voltage during the data setting section 61 for each row-line.

In addition, the driving unit 200 may apply the sub-pixels included in the corresponding row-line with emission signals (SET, Emi_PWM, Sweep, or Emi_PAM, described below) for controlling the light emission operation of the sub-pixels during each of the plurality of light emission sections 62-1 to 62-7 for each row-line.

Meanwhile, referring to FIG. 6A, it may be seen that the data setting section 61 and the plurality of light emission sections 62-1 to 62-7 are sequentially performed respectively for all the row-lines of the display panel 100 in the row-line order.

To this end, the driving unit 200 may sequentially apply the scan signals from the first row-line to last row-line of the display panel 100. In addition, the driving unit 200 may sequentially apply the emission signals from the first row-line to last row-line of the display panel 100.

Here, the plurality of light emission sections 62-1 to 62-7 may be distinguished from each other based on a start signal input to the driving unit 200. To this end, the driving unit 200 may sequentially apply the emission signals to the sub-pixels included in each row-line from the first row-line to the last row-line whenever the start signal is input. Accordingly, the input number of the start signal may correspond to the number of light emission sections.

For example, a first start signal may be input after the data voltage setting section 61 may be performed. Here, the driving unit 200 may sequentially apply the emission signals to the sub-pixels included in each row-line from the first row-line to the last row-line. Accordingly, the first light emission section 62-1 of each row-line may be sequentially performed from the first row-line to the last row-line, based on the PWM data voltage applied during the data setting section 61.

Meanwhile, a second start signal may be input after a predetermined time after the first start signal may input. Here, the driving unit 200 may sequentially apply the emission signals again to the sub-pixels included in each row-line from the first row-line to the last row-line. Accordingly, the second light emission section 62-2 of each row-line may be sequentially performed from the first row-line to the last row-line, based on the PWM data voltage applied during the data setting section 61.

Third to seventh start signals may be applied to the driving unit 200 at a predetermined time interval after the second start signal. Here, the driving unit 200 may sequentially apply the emission signals to the sub-pixels included in each row-line from the first row-line to the last row-line, as described above, whenever the start signal may input. Accordingly, the third to seventh light emission sections 62-3 to 62-7 of each row-line may be sequentially performed from the first row-line to the last row-line based on the PWM data voltage applied during the data setting section 61.

Meanwhile, as shown in FIG. 6A, it may be seen that the first light emission section 62-1 of each row-line may temporally consecutive with the data setting section 61 of the corresponding row-line, and each of the plurality of light emission sections 62-1 to 62-7 has a predetermined time interval.

Here, according to an embodiment of the present disclosure, the number of light emission sections performed in each row-line for one image frame and the predetermined time interval between the light emission sections may be set based on a size of the display panel 100 and/or a shutter speed of a camera, etc. However, the present disclosure is not limited thereto.

In general, the shutter speed of a camera may be several times faster than one image frame time. Therefore, an image captured by the camera and displayed on the display panel 100 may be distorted when the display panel 100 may be driven so that one light emission section may be performed in the row-line order over one image frame time.

Therefore, the display panel 100 may be driven so that the plurality of light emission sections are performed at the predetermined time interval during one image frame time. However, the predetermined time interval may be set based on the camera speed, thereby preventing the image captured by the camera and displayed on the display panel 100 from being distorted even though the display panel 100 may be captured at any moment.

Meanwhile, a blanking period (or blanking interval) 65 in FIG. 6A may represent a time section between consecutive image frame periods 60 in which the valid image data may not be applied. Referring to FIG. 6A, it may be seen that the data setting section 61 may not be included in the blanking period 65. Therefore, the PWM data voltage may not be applied to the display panel 100 during the blanking period 65.

The sub-pixels may emit light even in the blanking period 65 apart from that no data voltage may be applied to the blanking period 65 as described above. Referring to arrows included in the time section and indicated by reference numeral 66 in FIG. 6A, it may be seen that the light emission sections of some row-lines are performed even during the blanking period 65.

In addition, according to an embodiment of the present disclosure, there may be a no-light emission section 67 in which the sub-pixels included in all the row-lines of the display panel 100 emit no light in the blanking section 65.

In detail, the driving unit 200 may apply the emission signals to the sub-pixels included in each row-line in the row-line order as described above. This configuration may also be the same for the blanking period 65.

However, the driving unit 200 in the no-light emission section 67 may apply the second control signal of a different level from that in the light emission section to the sub-pixels in the row-line order. Accordingly, the sub-pixels may emit no light even when the emission signals are applied to the no-light emission section 67. A more detailed description thereof is provided below.

Meanwhile, as described above, the malfunction of the display panel 100 may be detected based on the power supplied to the display panel 100 in the no-light emission section 67.

Figure 6B:
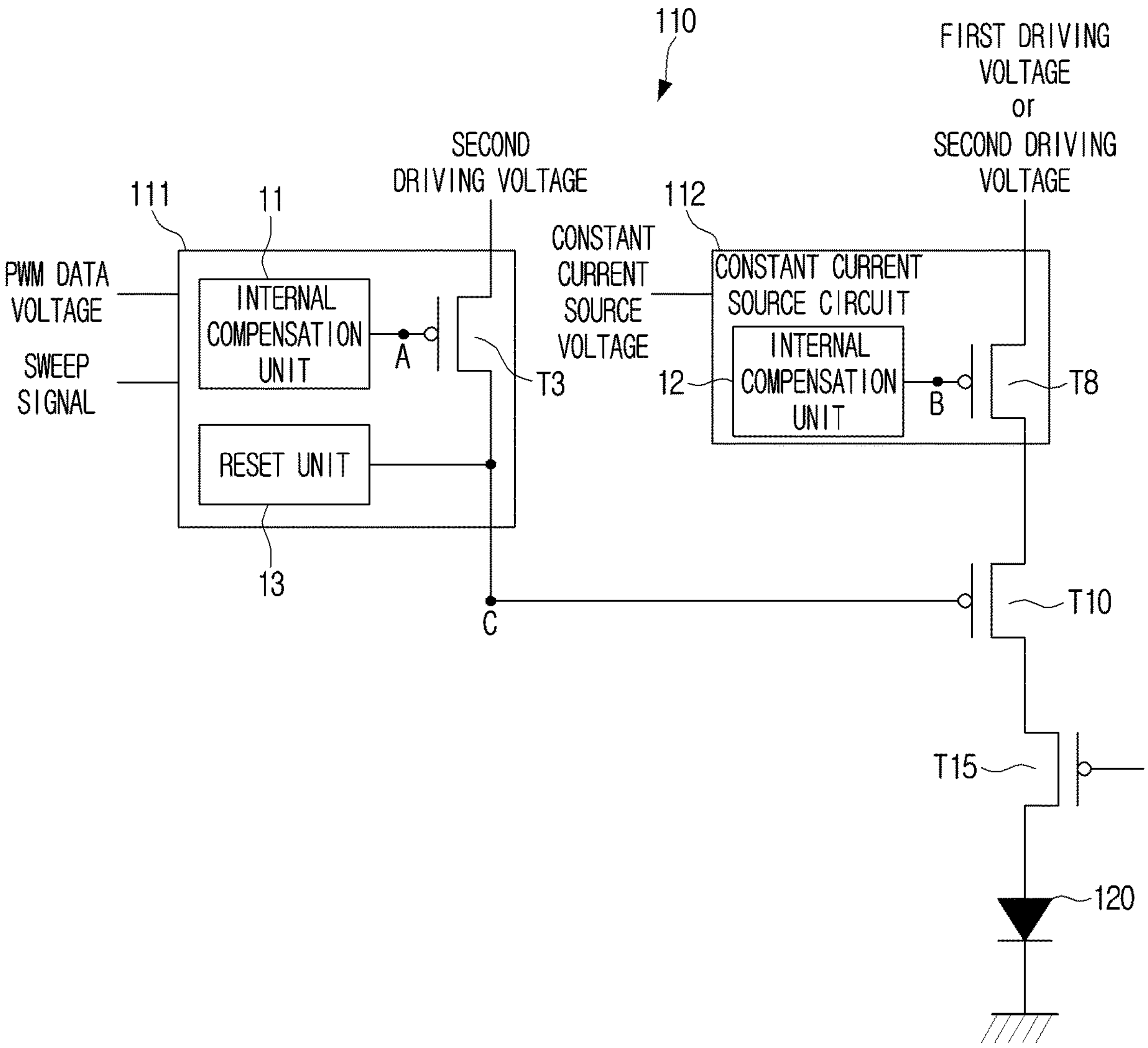
FIG. 6B is a block diagram of a sub-pixel circuit according to an embodiment.

FIG. 6B is a block diagram of the sub-pixel circuit 110 according to an embodiment of the present disclosure. Referring to FIG. 6B, the sub-pixel circuit 110 may include the PWM circuit 111, the constant current source circuit 112, a first switching transistor T10, and a second switching transistor T15.

The constant current source circuit 112 may include a first driving transistor T8, and provide the inorganic light emitting device 120 with the constant current having a constant magnitude based on a voltage applied between the source terminal and gate terminal of the first driving transistor T8.

In detail, the constant current source voltage may be applied from the driving unit 200 in the data setting section. Here, the constant current source circuit 112 may apply a constant current source voltage for which a threshold voltage of the first driving transistors T8 may be compensated to a gate terminal B of the first driving transistor T8.

A threshold voltage difference may occur between the first driving transistors T8 included in the sub-pixels of the display panel 100. In this case, the constant current source circuit 112 of each sub-pixel may provide the inorganic light emitting device 120 with driving currents of the first driving transistors T8, having different magnitudes by the threshold voltage difference even when the same constant current source voltages are applied thereto, which may appear as a blotch or the like in the image. It is thus necessary to compensate for the threshold voltage deviations between the first driving transistors T8 included in the display panel 100.

To this end, the constant current source circuit 112 may include an internal compensation unit 12. In detail, the constant current source voltage may be applied, and here, the constant current source circuit 112 may apply a first voltage based on the constant current source voltage and the threshold voltage of the first driving transistor T8 to the gate terminal B of the first driving transistor T8 through the internal compensation unit 12.

The constant current source circuit 112 in the light emission section may then provide the inorganic light emitting device 120 with the constant current having a magnitude based on the first driving voltage applied to the source terminal of the first driving transistor T8 and the first voltage applied to the gate terminal of the first driving transistor T8 through the turned-on first driving transistor T8.

Accordingly, the constant current source circuit 112 may provide the inorganic light emitting device 120 with the driving current having the magnitude corresponding to that of the applied constant current source voltage regardless of the threshold voltage of the first driving transistor T8.

Meanwhile, as shown in FIG. 6B, a source terminal of the first switching transistor T10 may be connected to a drain terminal of the first driving transistor T8, and a drain terminal thereof may be connected to a source terminal of the second switching transistor T15. In addition, the source terminal of the second switching transistor T15 may be connected to the drain terminal of the first switching transistor T10, and a drain terminal thereof may be connected to an anode terminal of the inorganic light emitting device 120. Accordingly, the constant current may be provided to the inorganic light emitting device 120 while the first switching transistor T10 and the second switching transistor T15 are turned on.

The PWM circuit 111 may include a second driving transistor T3, and control the on/off operation of the first switching transistor T10 to thus control time when the constant current flows through the inorganic light emitting device 120.

In detail, the PWM data voltage may be applied from the driving unit 200 in the data setting section. Here, the PWM circuit 111 may set a PWM data voltage for which a threshold voltage of the second driving transistor T3 may be compensated to a gate terminal A of the second driving transistor T3.

It may be seen that the above-described problem due to the deviation in the threshold voltages of the first driving transistors T8 also occurs in the second driving transistor T3, and the PWM circuit 111 also includes the internal compensation unit 11.

Accordingly, the PWM data voltage may be applied, and the PWM circuit 111 may here set a second voltage based on the PWM data voltage and the threshold voltage of the second driving transistor T3 to the gate terminal A of the second driving transistor T3 through the internal compensation unit 11.

The second driving transistor T3 may be turned on based on the sweep signal applied to the light emission section. Here, the PWM circuit 111 may apply the second driving voltage to a gate terminal of the first switching transistor T10 to thus turn off the first switching transistor T10, thereby controlling the time when the constant current flows through the inorganic light emitting device 120.

Here, the second driving transistor T3 may be turned on when the second voltage set to the gate terminal may be changed based on the sweep signal applied to the PWM circuit 111 and a voltage between the gate terminal and the source terminal thus reaches the threshold voltage of the second driving transistor T3.

Here, the sweep signal may refer to a voltage applied from the driving unit 200 to change a voltage of the gate terminal of the second driving transistor T3, and may be a voltage signal sweeping between two different voltages. For example, the sweep signal may be a signal that may be linearly changed such as a triangular wave, and is not limited thereto.

Accordingly, the PWM circuit 111 may allow the constant current to flow through the inorganic light emitting device 120 only for the time corresponding to the applied PWM data voltage, regardless of the threshold voltage of the second driving transistor T3.

Meanwhile, the PWM circuit 111 may include a reset unit 13. The reset unit 13 may forcibly turn on the first switching transistor T10. As described above, the first switching transistor T10 may need to be turned on for the constant current to flow through the inorganic light emitting device 120 and for the inorganic light emitting device 120 to emit light. Accordingly, the first switching transistor T10 may be turned on through an operation of the reset unit 13 at timing when each of the plurality of light emission sections starts.

The second switching transistor T15 may be turned on/off based on the second control signal (Emi_PAM) of the driving unit 200. The on/off timing of the second switching transistor T15 in the light emission section may be related to the implementation of black grayscale, and details thereof will be described below.

Meanwhile, a resistance component may exist in the display panel 100. Therefore, an IR drop may occur when the driving current flows in the light emission section, which may cause a drop in the driving voltage. As described below, the driving voltage may be applied to the constant current source circuit 111 during the data setting section and represent a reference for setting the constant current source data voltage, and the drop in the driving voltage may thus interfere with setting of the accurate constant current source data voltage.

In detail, as described above, in the various embodiments of the present disclosure, the data setting section and the light emission section may be performed in the row-line order. Therefore, the sub-pixel circuits of the other row-lines of the display panel 100 may be operated in the data setting section while the sub-pixel circuits of some row-lines of the display panel are operated in the light emission section.

The same driving voltage may be applied to the constant current source circuit 111 through one wiring regardless of the driving section of the display panel 100. Here, the drop in the driving voltage due to the sub-pixel circuits operated in the light emission section may affect the constant current source data voltage-setting operation of the sub-pixel circuits operated in the data setting section.

In order to overcome such a problem, in the various embodiments of the present disclosure, separate driving voltages may each be applied to the constant current source circuit 111 through separate wirings in the data setting section or the light emission section.

As shown in FIG. 6B, a second driving voltage (VDD_PWM) may be applied to the constant current source circuit 111 in the data setting section, and a first driving voltage (VDD_PAM) may be applied to the constant current source circuit 111 in the light emission section. Therefore, the separate second driving voltage independent of the driving current may be applied to the sub-pixel circuits operated in the data setting section even if a voltage drop occurs in the first driving voltage due to the sub-pixel circuits operated in the light emission section, thus enabling stable setting of the constant current source data voltage.

Meanwhile, as shown in FIG. 6B, the second driving voltage may be applied to the PWM circuit 112 during the light emission section to be also used as a voltage to turn off the first switching transistor T17.

Figure 6C:
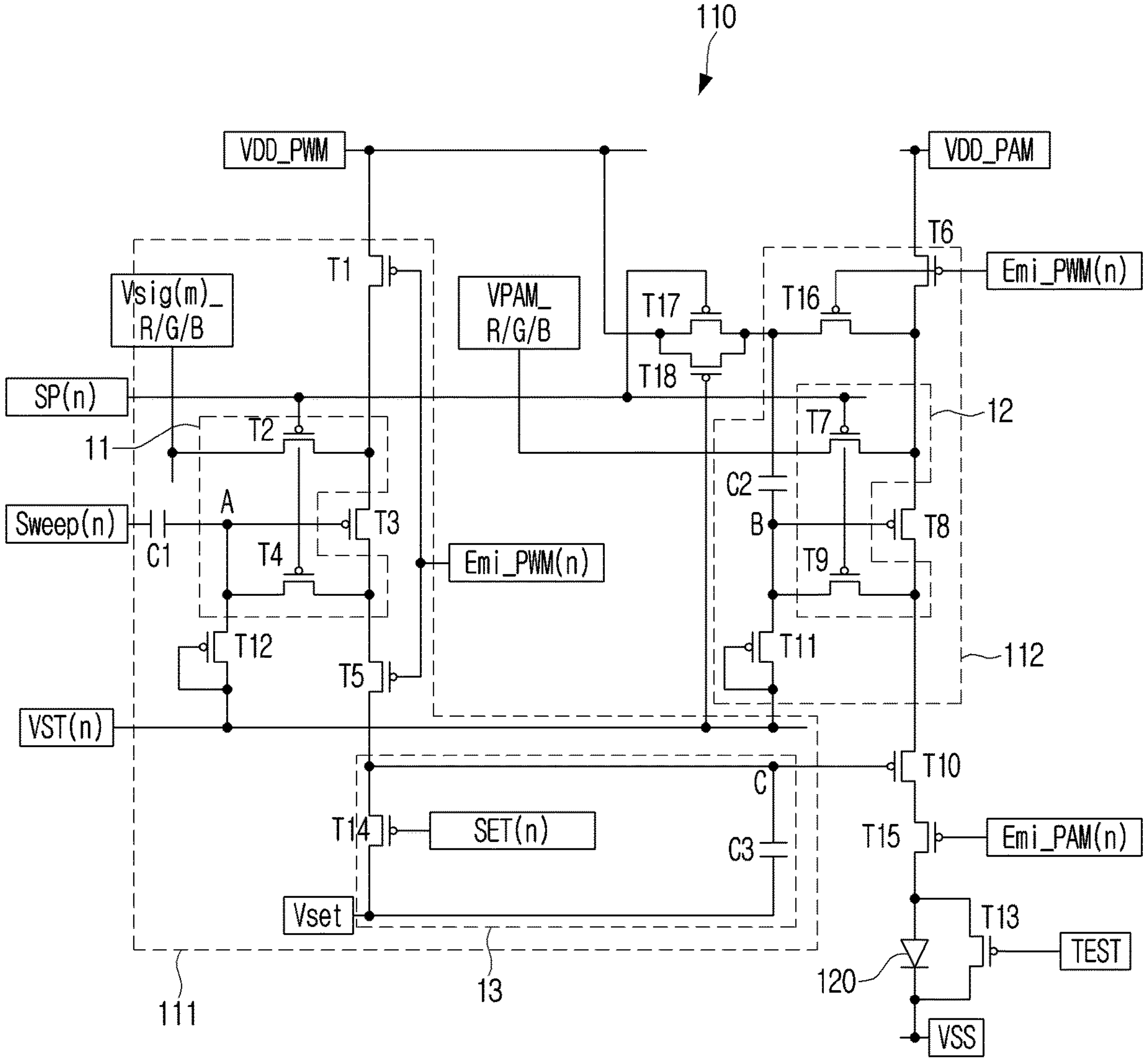
FIG. 6C is a detailed circuit diagram of the sub-pixel circuit according to an embodiment.

FIG. 6C is a detailed circuit diagram of the sub-pixel circuit 110 according to an embodiment of the present disclosure. Referring to FIG. 6C, the sub-pixel circuit 110 may include the PWM circuit 111, the constant current source circuit 112, the first switching transistor T10, and the second switching transistor T15. Here, as described above with reference to FIG. 6B, the PWM circuit 111 may include the internal compensation unit 11 and the reset unit 13, and the constant current source circuit 1120 may include an internal compensation unit 12.

Meanwhile, a transistor T17 and a transistor T18 may be circuit components for applying a second driving voltage VDD_PWM to the constant current source circuit 112 in the data setting section.

The transistor T13 may be a circuit component turned on based on a TEST signal and used to check whether the sub-pixel circuit 110 may be abnormal before the inorganic light emitting device 120 may be mounted on the TFT layer described below and electrically connected to the sub-pixel circuit 110.

In FIG. 6C, VDD_PAM may represent the first driving voltage (e.g., +10 [V]), VDD_PWM may represent the second driving voltage (e.g., +10 [V]), VSS may represent the ground voltage (e.g., 0 [V]), and Vset may represent a low voltage (e.g., −3 [V]) for turning on the first switching transistor T10. VDD_PAM, VDD_PWM, VSS, Vset and Test voltages may be applied from the above-described driving voltage supply circuit.

VST(n) may represent a signal applied to the sub-pixel circuit 110 to initialize voltages of a node A (or the gate terminal of the second driving transistor T3) and a node B (or the gate terminal of the first driving transistor T8).

SP(n) may represent a signal applied to the sub-pixel circuit 110 to set the data voltage (i.e., PWM data voltage or constant current source voltage).

SET(n) may represent a signal applied to the reset unit 13 of the PWM circuit 111 to turn on the first switching transistor T10.

Emi_PWM(n) may represent a signal for turning on a transistor T1 and a transistor T5 to apply the second driving voltage VDD_PWM to the PWM circuit 111, or a signal for turning on a transistor T6 and a transistor T16 to apply the first driving voltage VDD_PAM to the constant current source circuit 112.

Sweep(n) may represent the sweep signal. According to an embodiment of the present disclosure, the sweep signal may be a voltage that may be linearly decreased, and is not limited thereto. For example, the transistor included in the sub-pixel circuit 110 may be implemented as a negative-type metal oxide semiconductor field effect (NMOSFE) transistor, and a voltage that may be linearly increased may here be used as the sweep signal. Meanwhile, the sweep signal may be applied repeatedly in the same form for each light emission section.

Emi_PAM(n) may represent a signal for turning on the second switching transistor T15.

Figure 6D:
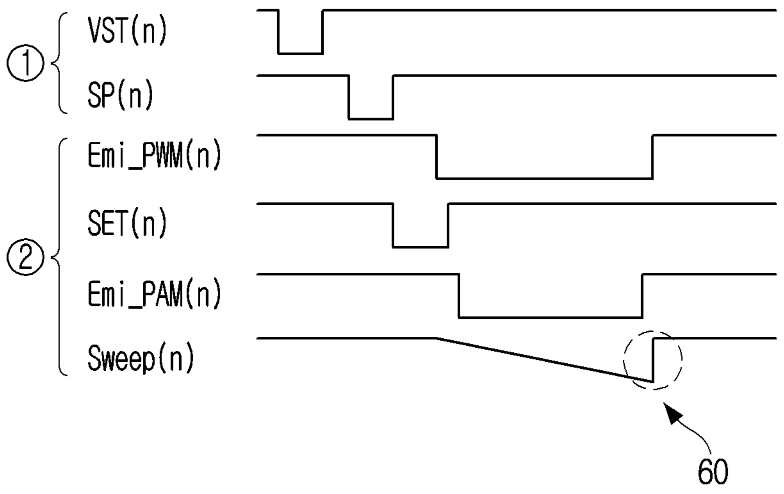
FIG. 6D is a timing diagram of gate signals shown above in FIG. 6C.

In the above signals, (n) may represent an n-th row-line. As described above, the driving unit 200 may drive the display panel 110 for each row-line (, each scan line or each gate line), and the above-mentioned control signals VST(n), SP(n), SET(n), Emi_PWM(n), Sweep(n), and Emi_PAM(n) may be applied to all the sub-pixel circuits 110 included in the n-th row-line in the same order described below as shown in FIG. 6D.

Meanwhile, the above-mentioned control signals may be applied from the gate driver and may be referred to as the gate signals.

Vsig(m)_R/G/B may represent a PWM data voltage for each of R, G, and B sub-pixels of a pixel included in an m-th column-line. In detail, the above-mentioned gate signals may be the signals for the n-th row-line, and Vsig(m)_R/G/B shown in FIG. 6C may represent that a PWM data voltage for each of R, G, and B sub-pixels of a pixel disposed at an intersection of the n-th row-line and the m-th column-line may be time-division multiplexed and applied.

Here, Vsig(m)_R/G/B may be applied from the data driver. In addition, Vsig(m)_R/G/B may be, for example, a voltage between +10 [V] (black) and +15 [V] (full white), and is not limited thereto.

Meanwhile, the sub-pixel circuit 110 shown in FIG. 6C may be the sub-pixel circuit 110 corresponding to any one of R, G, and B sub-pixels (e.g., R sub-pixel), and only the PWM data voltage for the R sub-pixel may be selected from the time-division multiplexed PWM data voltages through the DeMUX circuit (not shown) and applied to the sub-pixel circuit 110.

VPAM_R/G/B may represent a constant current source voltage for each of R, G, and B sub-pixels included in the display panel 100. As described above, the same constant current source voltage may be applied to the display panel 100.

However, application of the same constant current source voltage represents that the same constant current source voltage may be applied to the same type of sub-pixels included in the display panel 100, and does not represent that the same constant current source voltage may be applied to even all the sub-pixels of different types such as R, G, and B. The reason is that R, G, and B sub-pixels have different characteristics based on the type of sub-pixel. Therefore, the constant current source voltage may depend on the type of sub-pixel.

Meanwhile, even in this case, the same constant current source voltage may be applied to the same type of sub-pixel regardless of the column-line or row-line. Accordingly, according to an embodiment of the present disclosure, the constant current source voltage may be applied for each type of sub-pixel directly from the driving voltage supply circuit without using the data driver, unlike the PWM data voltage.

That is, the same voltage may be applied to the same type of sub-pixel regardless of the column-line or row-line, and a direct current (DC) voltage may thus be used as the constant current source voltage. Therefore, for example, three types of DC voltages (e.g., +5.1 [V], +4.8 [V], and +5.0 [V]) respectively corresponding to the R, G, and B sub-pixels may be individually and directly applied from a driving voltage circuit to each of the R, G, and B sub-pixel circuits of the display panel 100. This case may not require the DeMUX circuit either.

Meanwhile, in some embodiments, it may be better to use the same constant current source voltage for different types of sub-pixels. In this case, the same constant current source voltage may be applied to the different types of sub-pixels.

FIG. 6D is a timing diagram of the gate signals shown above in FIG. 6C.

VST(n) and SP(n)(①) among the gate signals shown in FIG. 6D may be related to a data setting operation of the sub-pixel circuit 110, distinguished from the emission signal, and referred to as the scan signal. In addition, Emi_PWM(n), SET(n), Emi_PAM(n) and Sweep(n)(②) among the gate signals shown in FIG. 6*d* may be related to a light emission operation of the sub-pixel circuit 110, and referred to as the emission signal.

As described above, according to an embodiment of the present disclosure, for one image frame, the data setting section may be performed once, and the light emission section may be performed several times. Accordingly, for one image frame, the driving unit 200 may apply a scan signal ① to each row-line of the display panel 100 once in the row-line order, and apply an emission signal ② to each row-line of the display panel 100 several times in the row-line order.

Figure 6E:
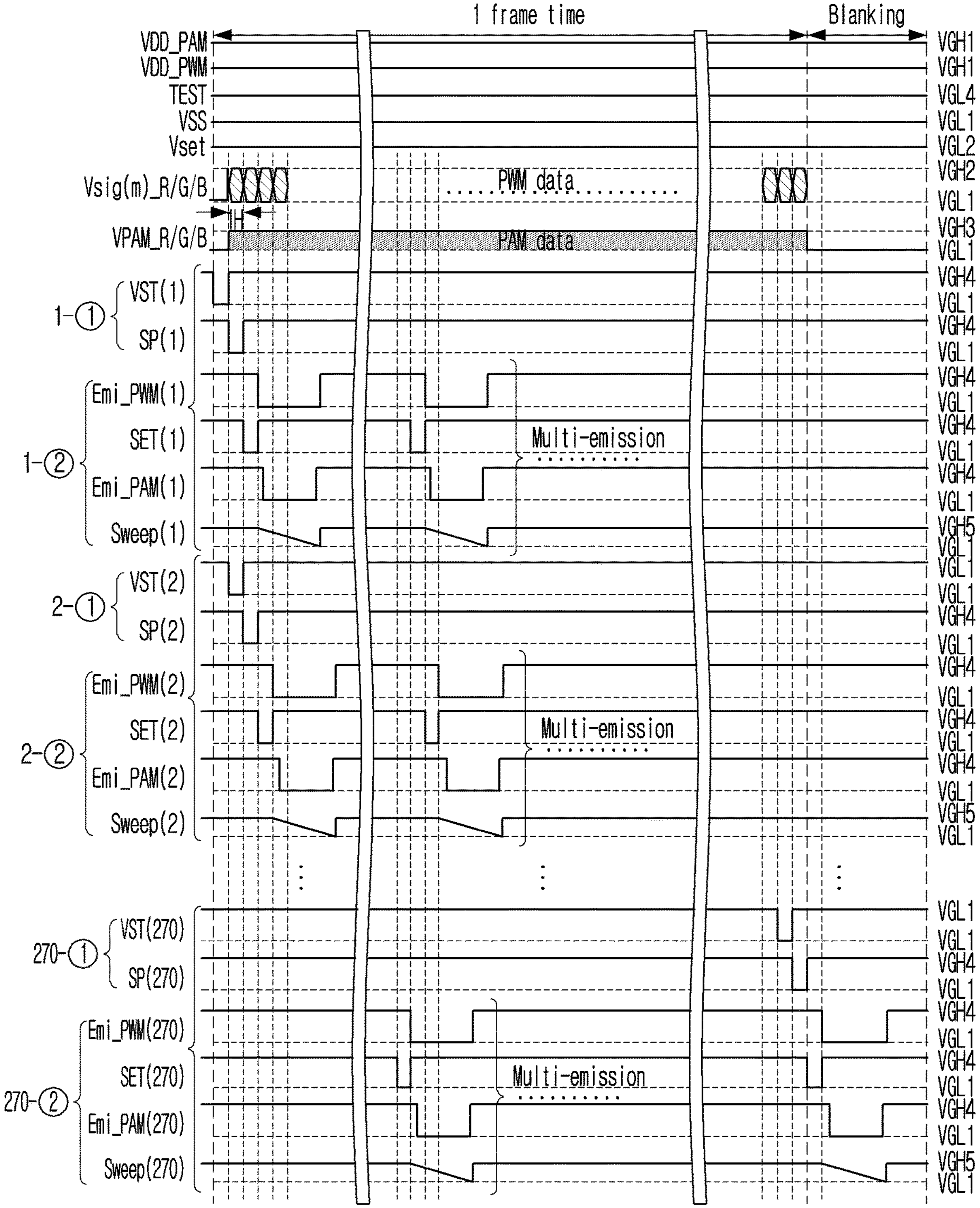
FIG. 6E is a timing diagram of various signals for driving the display panel during one image frame period according to an embodiment.

FIG. 6E is a timing diagram of various signals for driving the display panel during one image frame period according to an embodiment of the present disclosure. FIG. 6E exemplifies that the display panel 100 includes 270 row-lines.

As shown in reference numbers 1-①, 2-②to 270-①, the scan signals VST(n) and SP(n) for the data setting operation may be applied once to each row-line in the row-line order during one frame time.

In addition, as shown in reference numbers 1-②, 2-② to 270-②, the emission signals Emi_PWM(n), SET(n), Emi_PAM(n), and Sweep(n) for the light emission operation may be applied to each row-line several times.

Hereinafter, a detailed operation of the sub-pixel circuit 110 is described with reference to FIG. 6C.

The data setting section may start at each row-line. Here, the driving unit 200 may first turn on the first driving transistor T8 included in the constant current source circuit 112 and the second driving transistor T3 included in the PWM circuit 111. To this end, the driving unit 200 may apply the low voltage (e.g., −3 [V]) to the sub-pixel circuit 110 through the VST(n) signal.

Referring to FIG. 6C, the second driving transistor T3 may be turned on when the low voltage may be applied to the gate terminal (hereinafter, referred to as the node A) of the second driving transistor T3 through the transistor T12 turned on based on the VST(n) signal. In addition, the first driving transistor T8 may be turned on when the low voltage may be applied to the gate terminal (hereinafter, referred to as the node B) of the first driving transistor T8 through the transistor T11 turned on based on the VST(n) signal.

Meanwhile, the transistor T18 may also be turned on when the low voltage (e.g., −3 [V]) may be applied to the sub-pixel circuit 110 through the VST(n) signal, and VDD_PWM (hereinafter, referred to as the second driving voltage (e.g., +10 [V])) may be applied to the other end of a capacitor C2 whose one end may be connected to the node B through the turned-on transistor T18. Here, the second driving voltage may represent a reference potential for setting the data voltage to be performed based on the SP(n) signal.

The driving unit 200 may input the data voltages to each of the nodes A and B when the first and second driving transistors T8 and T3 are turned on through the VST(n) signal in the data setting section. To this end, the driving unit 200 may apply the low voltage to the sub-pixel circuit 110 through the SP(n) signal.

The transistors T2 and T4 of the PWM circuit 111 may be turned on when the low voltage may be applied to the sub-pixel circuit 110 through the SP(n) signal. Accordingly, the PWM data voltage Vsig(m)_R/G/B may be applied to the node A through the turned-on transistor T2, the turned-on second driving transistor T3, and the turned-on transistor T4.

Here, the PWM data voltage applied from the driving unit 200 may not be set to the node A as it is, and the PWM data voltage for which the threshold voltage of the second driving transistor T3 may be compensated (i.e., voltage corresponding to a sum of the PWM data voltage and the threshold voltage of the second driving transistor T3) may be set thereto.

In detail, the PWM data voltage applied to a source terminal of the transistor T2 may be input to the internal compensation unit 11 when the transistors T2 and T4 are turned on based on the SP(n) signal. Here, the second driving transistor T3 may be fully turned on through the VST(n) signal, and the input PWM data voltage may start to be input to the node A while sequentially passing through the transistor T2, the second driving transistor T3, and the transistor T4. That is, the voltage at the node A may start to rise from the low voltage.

However, the voltage of the node A may not rise to the input PWM data voltage, and rise only to the voltage corresponding to the sum of the PWM data voltage and the threshold voltage of the second driving transistor T3. The reason is that the voltage at the node A may be sufficiently low (e.g., −3 [V]) at timing when the PWM data voltage starts to be input to the internal compensation circuit 11; therefore, the second driving transistor T3 may be fully turned on, a sufficient current may thus flow, and the voltage at node A may thus smoothly rise; however, a voltage difference between the gate terminal (or the node A) and source terminal of the second driving transistor T3 may be decreased as the voltage at the node A rises, and the flow of current may be decreased; and as a result, the second driving transistor T3 may be turned off to stop the flow of current when the voltage difference between the gate terminal and source terminal of the second driving transistor T3 reaches the threshold voltage of the second driving transistor T3.

That is, the PWM data voltage may be applied to the source terminal of the second driving transistor T3 through the turned-on transistor T2, and the voltage at the node A may rise only to the sum of the PWM data voltage and the threshold voltage of the second driving transistor T3.

Meanwhile, the transistors T7 and T9 of the constant current source circuit 111 may also be turned on when the low voltage may be applied to the sub-pixel circuit 110 through the SP(n) signal. Accordingly, the constant current source voltage VPAM_R/G/B may be applied to the node B through the turned-on transistor T7, the turned-on first driving transistor T8, and the turned-on transistor T9.

Here, the constant current source voltage applied from the driving unit 200 may not be set to the node B as it is, and a PWM data voltage for which the threshold voltage of the first driving transistor T8 may be compensated (i.e., voltage corresponding to a sum of the constant current source voltage and the threshold voltage of the first driving transistor T8) may be set thereto for the same reason as described above in the description of the node A.

Meanwhile, the transistor T17 may also be turned on when the low voltage may be applied to the sub-pixel circuit 110 through the SP(n) signal. Here, the second driving voltage VDD_PWM may be applied to the other end of the capacitor C through the turned-on transistor T17, thus maintaining the reference potential of each data voltage applied to the node A and the node B.

Meanwhile, the PWM data voltage described above may be higher than the second driving voltage VDD_PWM. Accordingly, the second driving transistor T3 may remain OFF in a state where the PWM data voltage may be set to the node A. In addition, the constant current source voltage may be lower than the second driving voltage VDD_PWM. Accordingly, the first driving transistor T8 may remain ON in a state where the constant current source data voltage may be set to a node C.

The driving unit 200 may first turn on the first switching transistor T10 to emit the inorganic light emitting device when the data voltage may be completely set to each of the constant current source circuit 112 and the PWM circuit 111. To this end, the driving unit 200 may apply the low voltage to the sub-pixel circuit 110 (in detail, the reset unit 13 of the PWM circuit 111) through the SET(n) signal.

The Vset voltage may be charged in a capacitor C3 through a turned-on transistor T14 when the low voltage may be applied to the transistor T14 based on a SET(n) signal. As described above, Vset may represent the low voltage (e.g., −3 [V]), and the low voltage may be applied to the gate terminal (hereinafter, referred to as a node C) of the first switching transistor T10 to turn on the first switching transistor T10 when the Vset voltage may be charged in the capacitor C3.

Meanwhile, the reset unit 13 may be operated independently from the rest circuit components until the Emi_PWM(n) signal may be applied thereto, and the low voltage applied thereto through the SET(n) signal may thus be applied earlier than a timing shown in FIG. 6D or FIG. 6E according to an embodiment.

The driving unit 200 may allow the inorganic light emitting device 120 to emit light based on the voltage set to the node A and the node B when the low voltage may be applied to the node C through the SET(n) signal to turn on the first switching transistor T10. To this end, the driving unit 200 may apply the low voltage to the sub-pixel circuit 110 through the Emi_PWM(n) and Emi_PAM(n) signals, and apply the sweep voltage to the sub-pixel circuit 110 through the Sweep(n) signal.

First, the following description describes an operation of the constant current source circuit 112 based on the signals applied from the driving unit 200.

The constant current source circuit 112 may provide the constant current to the inorganic light emitting device 120 based on the voltage set to the node B.

In detail, the low voltage may be applied to the gate terminal through the Emi_PWM(n) and Emi_PAM(n) signals, thereby turning on the transistor T6 and the second switching transistor T15. Meanwhile, as described above, the first switching transistor T10 may be turned on based on the SET(n) signal. In addition, as described above, VDD_PAM (hereinafter, referred to as the first driving voltage (e.g., +10 [V])) may be applied to the source terminal of the first driving transistor T8 through the transistor T6 turned on based on the Emi_PWM(n) signal in the state where the voltage corresponding to the sum of the constant current source voltage (e.g., +5 [V]) and the threshold voltage of the first driving transistor T8 may be applied to the node B. Therefore, a voltage less than the threshold voltage of the first driving transistor T8 may be applied between the gate terminal and source terminal of the first driving transistor T8, and the first driving transistor T8 may thus also be turned on (for reference, a positive-type metal oxide semiconductor field effect transistor (PMOSFET) may have the threshold voltage of a negative value, turned on when a voltage less than the threshold voltage may be applied between the gate terminal and source terminal thereof, and turned off when a voltage more than the threshold voltage may be applied therebetween).

Accordingly, the first driving voltage may be applied to the anode terminal of the inorganic light emitting device 120 through the turned-on transistor T6, the turned-on first driving transistor T8, the turned-on first switching transistor T10, and the turned-on second switching transistor T15, and a potential difference more than a forward voltage Vf may occur in both ends of the inorganic light emitting device 120. Accordingly, the driving current (i.e., constant current) may flow through the inorganic light emitting device 120 and the inorganic light emitting device 120 may start to emit light. Here, the driving current (i.e., constant current) for emitting the inorganic light emitting device 120 may have a magnitude corresponding to that of the constant current source voltage.

Meanwhile, the driving current may need to be provided to the inorganic light emitting device 120 in the light emission section, and the driving voltage applied to the constant current source circuit 112 may thus be changed from the second driving voltage VDD_PWM to the first driving voltage VDD_PAM. In detail, referring to FIG. 6C, the first driving voltage may be applied to the other end of the capacitor C2 through the turned-on transistor T6 or the turned-on transistor T16 when the low voltage may be applied to the transistor T6 or the transistor T16 based on the Emi_PWM(n) signal.

Here, as described above, the voltage drop may occur in the first driving voltage due to the IR drop occurring while the driving current flows to the inorganic light emitting device 120. However, a voltage between the gate terminal and source terminal of the first driving transistor T8 may remain the same as the voltage set in the data setting section regardless of a voltage drop amount (i.e., IR drop amount) of the first driving voltage even when the voltage drop occurs in the first driving voltage. The reason is that the voltage at the node B may also be changed by being coupled through the capacitor C2 by a change amount of any voltage even when the voltage applied to the other end of the capacitor C2 may be changed to the any voltage.

Therefore, according to embodiments of the present disclosure, the second driving voltage having no voltage drop may be applied to the constant current source circuit 111 in the data setting section, and the accurate constant current source data voltage may thus be set to the constant current source circuit 111 regardless of the voltage drop of the first driving voltage. In addition, it may be seen that the first driving voltage having the voltage drop may be applied to the constant current source circuit 111 in the light emission section, and the constant current source circuit 111 may be normally operated still in the light emission section regardless of the voltage drop of the first driving voltage for the same reason as described above.

Next, the following description describes an operation of the PWM circuit 111 based on the signals applied from the driving unit 200.

The PWM circuit 111 may control light emission time of the inorganic light emitting device 120 based on the voltage set to the node A. In detail, the PWM circuit 111 may control the off operation of the first switching transistor T10 based on the voltage set to the node A, and the constant current source circuit 112 may thus control a driving time of the constant current provided to the inorganic light emitting device 120, thus controlling the light emission time of the inorganic light emitting device 120.

As described above, the inorganic light emitting device 120 may start to emit light when the constant current source circuit 112 provides the constant current to the inorganic light emitting device 120.

Here, referring to FIG. 6C, the transistor T1 and the transistor T5 may be turned on based on the Emi_PWM(n) signal. However, even in this case, the second driving voltage may not be applied to the node C because the second driving transistor T3 may be turned off. Accordingly, the first switching transistor T10 may remain ON, and the constant current may flow through the inorganic light emitting device 120.

In detail, the second driving voltage (e.g., +10[V]) may be applied to the source terminal of the second driving transistor T3 through the transistor T1 based on the turned-on Emi_PWM(n) signal when the transistor T1 may be turned on based on the Emi_PWM(n) signal.

Here, as described above, it may be assumed that −1 [V] may be the threshold voltage of the second driving transistor T3 when the PWM data voltage may be a voltage between +10 [V] (black) and +15 [V] (full white). Here, a voltage between +9 [V] (black) and +14 [V] (full white) may be set to the node A, and a voltage (−1 [V] to +4 [V]) greater than or equal to the threshold voltage (−1 [V]) of the second driving transistor T3 may thus be applied between the gate terminal and source terminal of the second driving transistor T3.

Accordingly, the second driving voltage may be applied to the source terminal of the second driving transistor T3 (i.e., the low voltage may be applied to the sub-pixel circuit 110 based on the Emi_PWM(n) signal). In this case, the second driving transistor T3 may be turned off unless a PWM data voltage corresponding to a black grayscale may be set to the node A, the first switching transistor T10 may remain ON as long as the second driving transistor T3 remains OFF, and the inorganic light emitting device 120 may thus maintain the light emission. (Meanwhile, the PWM data voltage corresponding to the black grayscale may be set to the node A. In this case, the second driving transistor T3 may be immediately turned on when the second driving voltage may be applied to the source terminal of the second driving transistor T3).

However, the voltage at the node A may be changed and a voltage less than or equal to the threshold voltage (−1 [V])

of the second driving transistor T3 may be applied between the gate terminal and source terminal of the second driving transistor T3. In this case, the second driving transistor T3 may be turned on, and the second driving voltage may be applied to the node C to thus turn off the first switching transistor T10. Accordingly, the constant current may no longer flow through the inorganic light emitting device 120, and the inorganic light emitting device 120 may stop the light emission.

In detail, referring to FIG. 6D or 6E, it may be seen that the sweep voltage may be also applied to the sub-pixel circuit 110 through the Sweep(n) signal when the low voltage may be applied thereto based on the Emi_PWM(n) signal. Here, the sweep voltage may be the voltage that may be linearly decreased from +15 [V] to +10 [V], and is not limited thereto.

A change in the sweep voltage may be coupled to the node A through a capacitor C1, and the voltage at the node A may thus be changed based on a change in the sweep voltage.

The second driving transistor T3 may be turned on when the voltage at the node A may be decreased based on the change in the sweep voltage and reaches the voltage corresponding to the sum of the second driving voltage and the threshold voltage of the second driving transistor T3 (i.e., when the voltage less than or equal to the threshold voltage of the second driving transistor T3 may be applied between the gate terminal and source terminal of the second driving transistor T3).

Accordingly, the second driving voltage, which may be a high voltage, may be applied to the node C through the turned-on first transistor T1, the turned-on second driving transistor T3, and the turned-on transistor T5, and the first switching transistor T10 may thus be turned off.

In this way, the PWM circuit 111 may control the light emission time of the inorganic light emitting device 120 based on the voltage set to the node A.

Meanwhile, the corresponding light emission section may end when the application of the low voltage to the sub-pixel circuit 110 through the Emi_PWM(n) and Emi_PAM(n) signals may be completed, and the application of the sweep voltage may be completed based on the Sweep(n) signal.

Here, as indicated by reference numeral 60 of FIG. 6D, it may be seen that the sweep voltage may be restored a voltage before its linear change when the light emission section ends (in detail, when the application of the low voltage through the Emi_PWM(n) signal may be completed).

As described above, the change in the sweep voltage may be coupled to the node A through the capacitor C1, and the voltage at the node A, which may be linearly changed already based on the sweep voltage, may be also restored when the sweep voltage may be restored as described above.

Therefore, according to an embodiment of the present disclosure, the voltage at the node A, which may be linearly changed already based on the sweep voltage during the first light emission section among the plurality of light emission sections may be restored based on the sweep voltage before the second light emission section, which may be a next light emission section, begins.

In detail, the voltage at the node A may represent the voltage corresponding to the sum of the PWM data voltage and the threshold voltage of the second driving transistor T3 during the data setting section, may be linearly changed based on the change in the sweep voltage during the light emission section, and may be restored to the voltage corresponding to the sum of the PWM data voltage and the threshold voltage of the second driving transistor T3 based on the restoration of the sweep voltage when the light emission section ends. Accordingly, the same light emission operation may be performed in the next light emission section.

In addition, as described above, the first switching transistor T10 may need to first be turned on in order for the inorganic light emitting device 120 to emit light during the light emission section. However, as described above, the second driving voltage may be applied to the node C to turn off the first switching transistor T10 while one light emission section among the plurality of light emission sections may be performed. Therefore, the voltage at the node C may need to be reset to the low voltage in order for the next light emission section to be performed.

To this end, the driving unit 200 may again apply the low voltage to the reset unit 13 of the PWM circuit 111 through the SET(n) signal when the next light emission section starts, and the first switching transistor T10 may thus be turned on again.

The first switching transistor T10 may be turned on through the SET(n) signal, and the driving unit 200 may then apply the low voltage to the sub-pixel circuit 110 through the Emi_PWM(n) and Emi_PAM(n) signals, and apply the sweep voltage to the sub-pixel circuit 110 through the Sweep(n) signal, thereby controlling the light emission operation of the inorganic light emitting device 120 in the next light emission section by using the same way as described above.

Meanwhile, referring to the timing diagrams of FIGS. 6D and 6E, it may be seen that there may be a difference between timing when the low voltage starts to be applied to the Emi_PWM(n) signal and timing when the low voltage may be applied to the Emi_PAM(n) signal. As such, the timing when the low voltage starts to be applied to the Emi_PWM(n) signal and the timing when the low voltage may be applied to the Emi_PAM(n) signal may have the difference for implementing the black grayscale.

In detail, the first switching transistor T10 may need to be turned off as soon as the light emission section starts when the data voltage corresponding to the black grayscale may be set to the node A. Therefore, the second driving transistor T3 may need to be turned on immediately at timing when the low voltage may be applied thereto through the Emi_PWM(n) signal (i.e., at the timing when the second driving voltage may be applied to the source terminal of the second driving transistor T3).

Therefore, in theory, the second driving voltage may be applied to the node C through the turned-on transistor T1, the turned-on second driving transistor T3, and the turned-on transistor T5, and the first switching transistor T10 may thus need to be turned off immediately at the timing when the low voltage may be applied thereto through the Emi_PWM(n) signal. (No driving current (i.e., no constant current) may flow through the inorganic light emitting device 120 to thus express the black grayscale when the first switching transistor T10 may be immediately turned off).

However, in reality, a charging time of the second driving voltage VDD_PWM may be required for the node C, and thus making it impossible to turn off the first switching transistor T10 immediately. In detail, the second driving voltage may be applied to the node C to start its charging, the first switching transistor T10 may thus remain ON until a voltage at the first switching transistor T10 turned off may be charged to the node C, and the constant current may thus be leaked from the first switching transistor T10.

As a result, the constant current leaked from the first switching transistor T10 may flow through the inorganic light emitting device 120 for a certain time, and thus making it impossible to implement an accurate black grayscale even though the data voltage corresponding to the black grayscale may be set to the node A when the first switching transistor T10 and the inorganic light emitting device 120 are directly connected with each other without the second switching transistor T15.

Therefore, according to an embodiment of the present disclosure, the second switching transistor T15 may be disposed between the first switching transistor T10 and the inorganic light emitting device 120. In addition, the driving unit 200 may control the second switching transistor T15 so that the second switching transistor T15 may be turned on after a predetermined time elapses from timing when the second driving voltage may be applied to the source terminal of the second driving transistor T3. Here, the predetermined time may be time longer than or equal to time when the voltage of the node C may be charged from the Vset voltage to the voltage at the first switching transistor T10 turned off.

In this case, the second switching transistor T15 may block the leakage current occurring because the first switching transistor T10 may be not turned off immediately even though the data voltage corresponding to the black grayscale may be set to the node A. Accordingly, the accurate black grayscale may be implemented.

Hereinafter, the description describes implementation examples of the driving unit 200 according to various embodiments of the present disclosure for providing the gate signals shown in FIG. 6D with reference to FIGS. 7A to 13E.

Figure 7A:
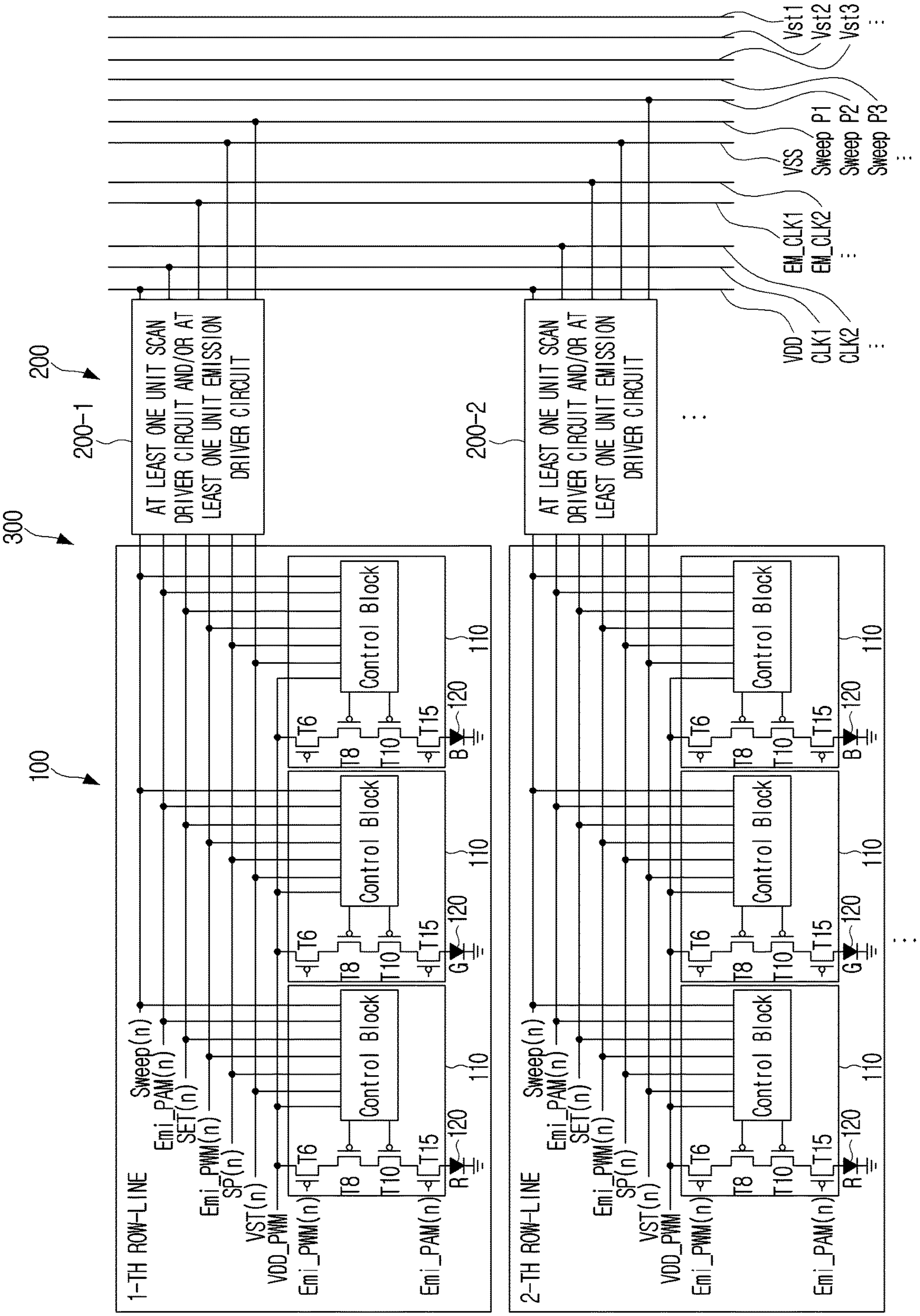
FIG. 7A is a block diagram of the display module according to an embodiment.

FIG. 7A is a block diagram of the display module 300 according to an embodiment of the present disclosure. As shown in FIG. 7A, the display module 300 may include the display panel 100 and the driving unit 200.

In detail, the driving unit 200 may include the gate drivers for providing the sub-pixels included in each row-line of the display panel 100 with the gate signals VST(n), SP(n), Emi_PWM(n), SET(n), Emi_PAM(n), and Sweep(n).

Here, the gate drivers may include at least one scan driver for providing the scan signals to the sub-pixels included in each row-line and at least one emission driver for providing the emission signals to the sub-pixels included in each row-line. Here, each gate driver may include a unit gate driver circuit provided for each row-line.

For example, the driving unit 200 may include a first scan driver for applying the scan signal VST(n) to the sub-pixels included in each row-line in the row-line order, and the first scan driver may include a first unit scan driver circuit provided for each row-line.

In addition, the driving unit 200 may include a second scan driver for applying the scan signal SP(n) to the sub-pixels included in each row-line in the row-line order, and the second scan driver may include a second unit scan driver circuit provided for each row-line.

In addition, the driving unit 200 may include a first emission driver for applying the emission signal Emi_PWM(n) to the sub-pixels included in each row-line in the row-line order, and the first emission driver may include a first unit emission driver circuit provided for each row-line.

In addition, the driving unit 200 may include a second emission driver for applying the emission signal SET(n) to the sub-pixels included in each row-line in the row-line order, and the second emission driver may include a second unit emission driver circuit provided for each row-line.

In addition, the driving unit 200 may include a third emission driver for applying the emission signal Emi_PAM(n) to the sub-pixels included in each row-line in the row-line order, and the third emission driver may include a third unit emission driver circuit provided for each row-line.

In addition, the driving unit 200 may include a fourth emission driver for applying the emission signal Sweep(n) to the sub-pixels included in each row-line in the row-line order, and the fourth emission driver may include a fourth unit emission driver circuit provided for each row-line.

Here, the first and second scan drivers and the first to fourth emission drivers, described above, may be implemented in separate components, or may be implemented in such a way that some drivers are combined with each other.

FIG. 7A shows the gate drivers in row-line units. That is, as shown in FIG. 7A, a first gate driving unit 200-1 corresponding to the first row-line and a second gate driving unit 200-2 corresponding to the second row-line may respectively include at least one unit scan driver circuit and at least one unit emission driver circuit.

Referring to FIG. 7A, the gate driving units 200-1 and 200-2 may respectively receive the following signals to generate the gate signals, and provide the generated gate signals to the corresponding row-line (in detail, the sub-pixel circuits included in the corresponding row-line): the driving voltage signal VDD or VSS, at least two scan clock signals CLK1, CLK2 and the like for generating the scan signals, at least two emission clock signals EM_CLK1, EM_CLK2 and the like for generating the emission signal, at least two input sweep signals Sweep P1, Sweep P2, Sweep P3 and the like, and at least one start signal Vst1, Vst2, Vst3 or the like.

Figure 7B:
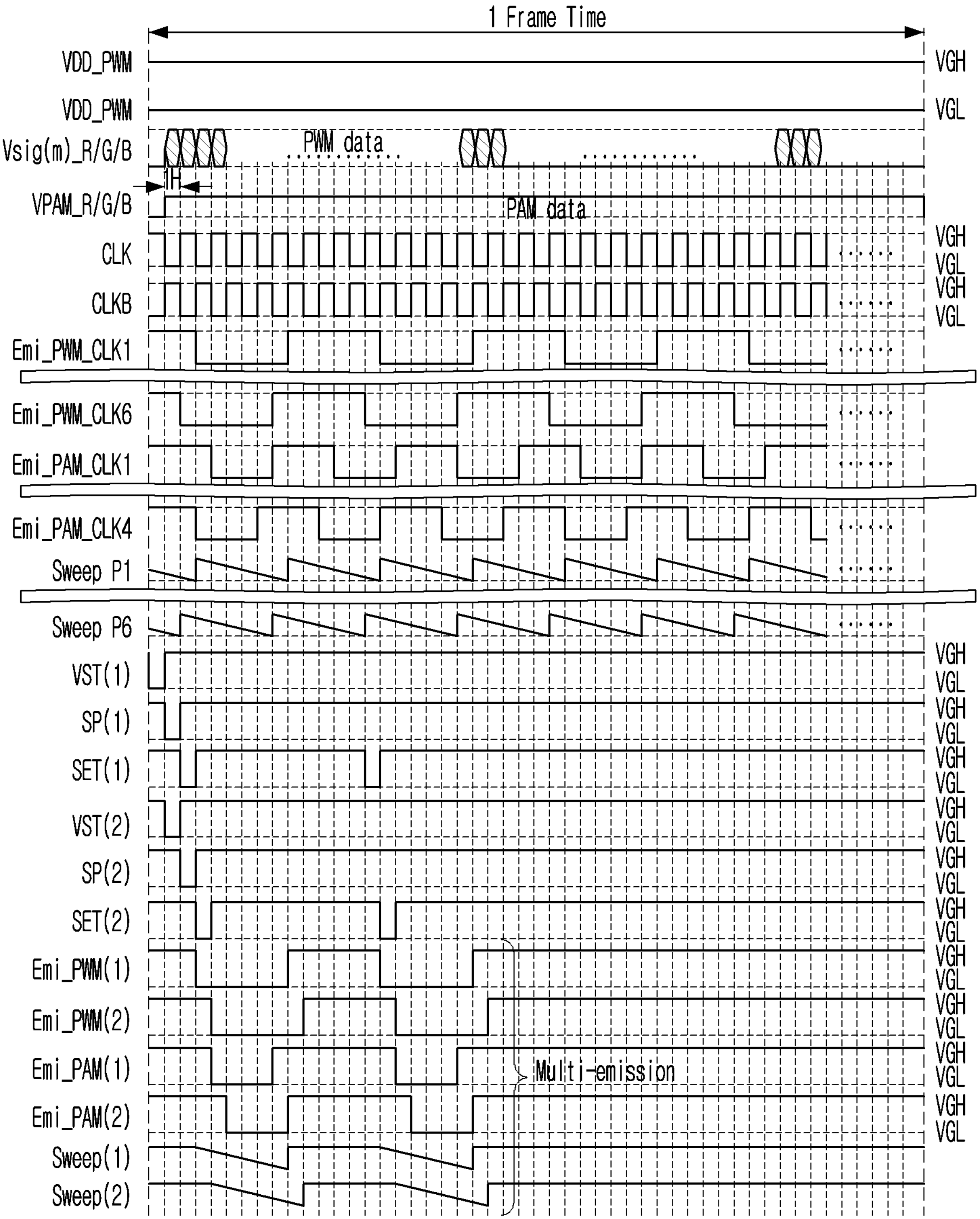
FIG. 7B is a timing diagram of gate signals output from a gate driver when an input sweep signal and various clock signals are input during one image frame period, according to an embodiment.

FIG. 7B is a timing diagram of the gate signals output from the gate driver when the input sweep signal and the various clock signals are input during one image frame period, according to an embodiment of the present disclosure.

As shown in FIG. 7B, each of the gate driving units 200-1 and 200-2 may receive two-phase clock signals CLK and CLKB to generate the scan signals VST(n) and SP(n).

In addition, each of the gate driving units 200-1 and 200-2 may receive six-phase Emi_PWM clock signals Emi_PWM_CLK1 to Emi_PWM_CLK6, four-phase Emi_PAM clock signals Emi_PAM_CLK1 to Emi_PAM_CLK4, and six-phase input sweep signals Sweep P1 to Sweep P6 to generate the emission signals Emi_PWM(n), SET(n), Emi_PAM(n), and Sweep(n).

Accordingly, each of the gate driving units 200-1 and 200-2 may apply the scan signals and the emission signals to each row-line in the row-line order, as shown in FIG. 7B.

Meanwhile, the number of input sweep signals having different phases or the number of various clock signals having different phases, exemplified in FIG. 7B, is only an example, may be changed according to an embodiment, and is not limited to the example shown in FIG. 7B. In addition, the types of signals input to each of the gate driving units 200-1 and 200-2 are not limited to the ones shown in FIG. 7B.

Meanwhile, the different phase may here represent that the same type of signal may be shifted by a predetermined time on a time axis. Here, the shifted predetermined time may depend on the number of signals having different phases. This configuration may be also the same for another description of the phase described below.

Figure 8A:
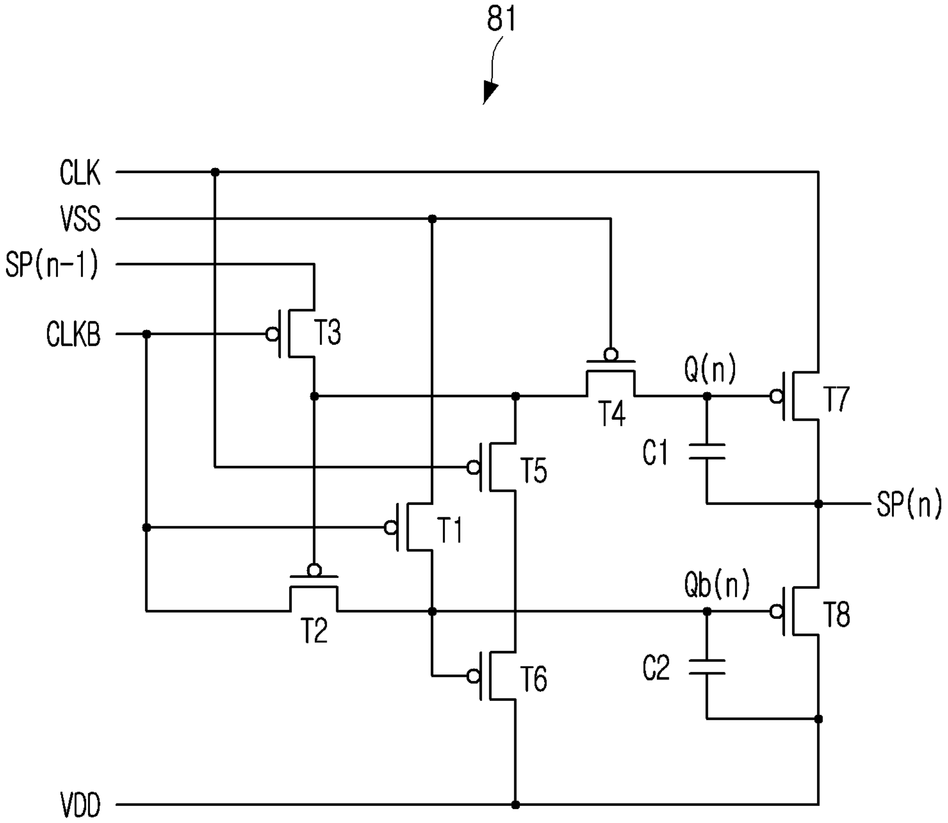
FIG. 8A is a circuit diagram of a unit scan driver circuit according to an embodiment.
Figure 8B:
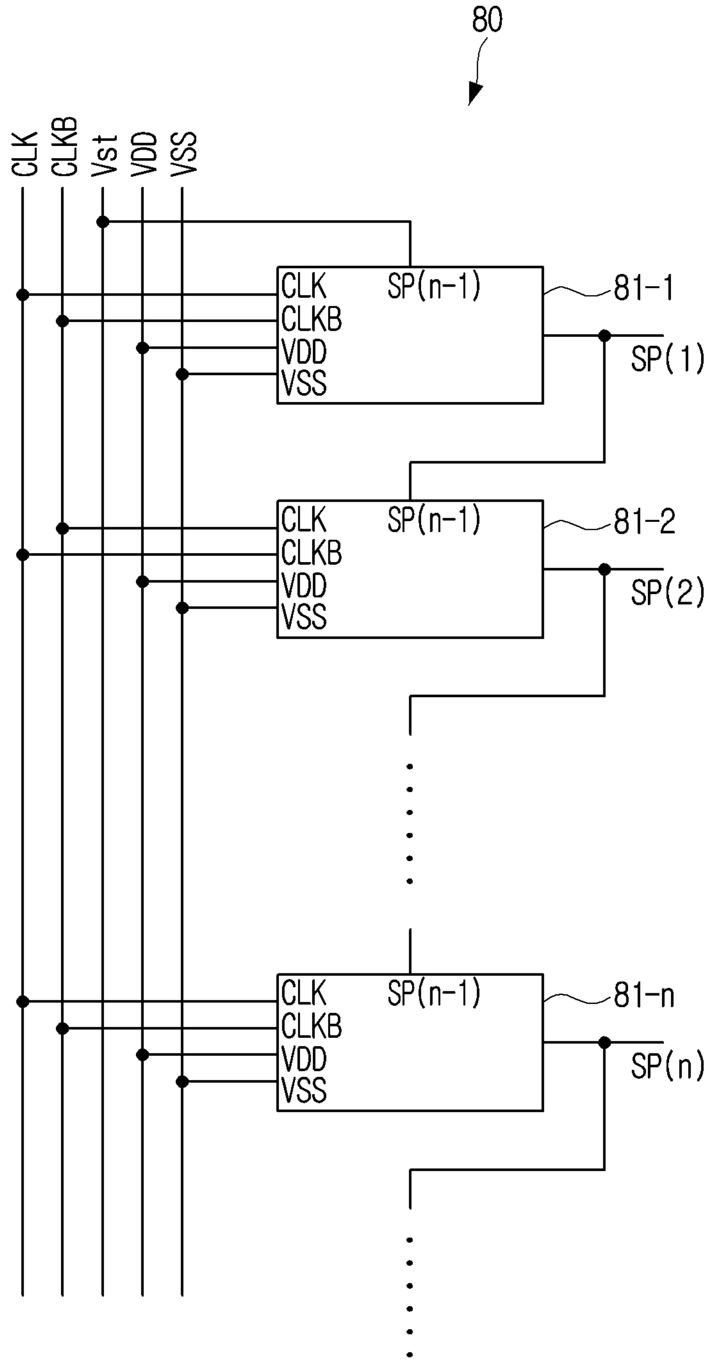
FIG. 8B is a block diagram of a scan driver according to an embodiment.
Figure 8C:
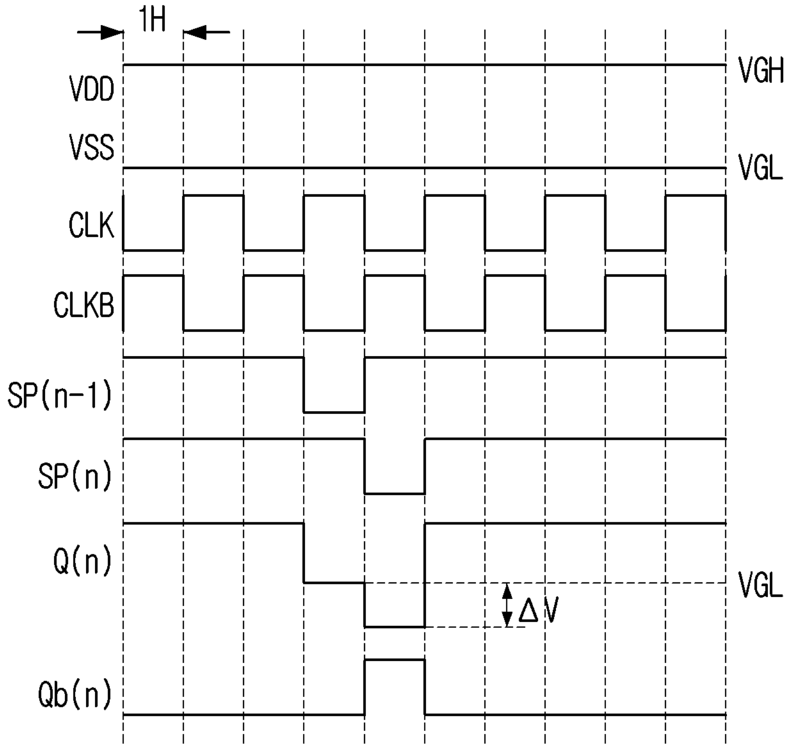
FIG. 8C is a timing diagram of various signals for driving the unit scan driver circuit according to an embodiment.

FIGS. 8A to 8C are views for explaining the unit scan driver circuit according to an embodiment of the present disclosure.

FIG. 8A is a circuit diagram of the unit scan driver circuit 81 according to an embodiment of the present disclosure. As shown in FIG. 8A, a unit scan driver circuit 81 may generate the scan signal SP(n).

In detail, the unit scan driver circuit 81 may receive the clock signals CLK and CLKB having phases opposite to each other, the driving voltage signals VDD and VSS, and a scan signal SP(n−1) applied to a previous row-line to output the scan signal SP(n).

FIG. 8B is a block diagram of a scan driver 80 according to an embodiment of the present disclosure. As described above, the scan signal SP(n) may be applied to the display panel 100 in the row-line order. To this end, each of unit scan driver circuits 81-1 to 81-*n* provided one for each row-line may be connected to each other as shown in FIG. 8B to configure the scan driver 80.

Referring to FIG. 8B, an output signal SP(1) of the unit scan driver circuit 81-1 for the first row-line may be input as a start signal of the unit scan driver circuit 81-2 for the second row-line, which may be the next row-line. This configuration may also be the same up to the unit scan driver circuit 81-*n* for an nth row-line. Meanwhile, it may be seen that the separate start signal Vst may be applied to the unit scan driver circuit 81-1 for the first row-line. Accordingly, the scan signal SP(n) may be applied from the first to last row-lines of the display panel 100 in the row-line order when the start signal Vst may be input thereto.

Meanwhile, referring to FIG. 8B, it may be seen that the clock signals CLK and CLKB having different phases are input to the unit scan driver circuits 81-1 to 81-*n* for each row-line in an order reversed from that of the previous row-line.

That is, the signal CLK may be input to an input terminal CLK of the unit scan driver circuit 81-1, and the signal CLKB may be input to an input terminal CLKB thereof. However, it may be seen that the signal CLKB may be input to the input terminal CLK of the unit scan driver circuit 81-2 for the next row-line, and the signal CLK may be input to the input terminal CLKB thereof. This configuration may also be the same up to the unit scan driver circuit 81-*n* for the n-th row-line.

FIG. 8C is a timing diagram of the various signals for driving the unit scan driver circuit 81 according to an embodiment of the present disclosure.

A process of outputting the scan signal SP(n) is described with reference to FIGS. 8A and 8C. First, a Q(n) node voltage may become low when the scan signal SP(n−1) may input to the unit scan driver circuit 81. The Q(n) node voltage may then be bootstrapped as the signal CLK has a low level, the transistor T7 may thus be fully turned on, and SP(n), i.e. output signal, may thus be output. The other operations may be readily understood by those skilled in the art from the circuit configuration and a relationship between the applied signals, and the description below thus omits a more detailed description thereof.

Meanwhile, the above description exemplifies the generation of the scan signal SP(n) by using the unit scan driver circuit 81. However, the same circuit and the same driving method described above with reference to FIGS. 8A to 8C may be applied even to the generation of the scan signal VST(n) or the emission signal SET(n).

Figure 9A:
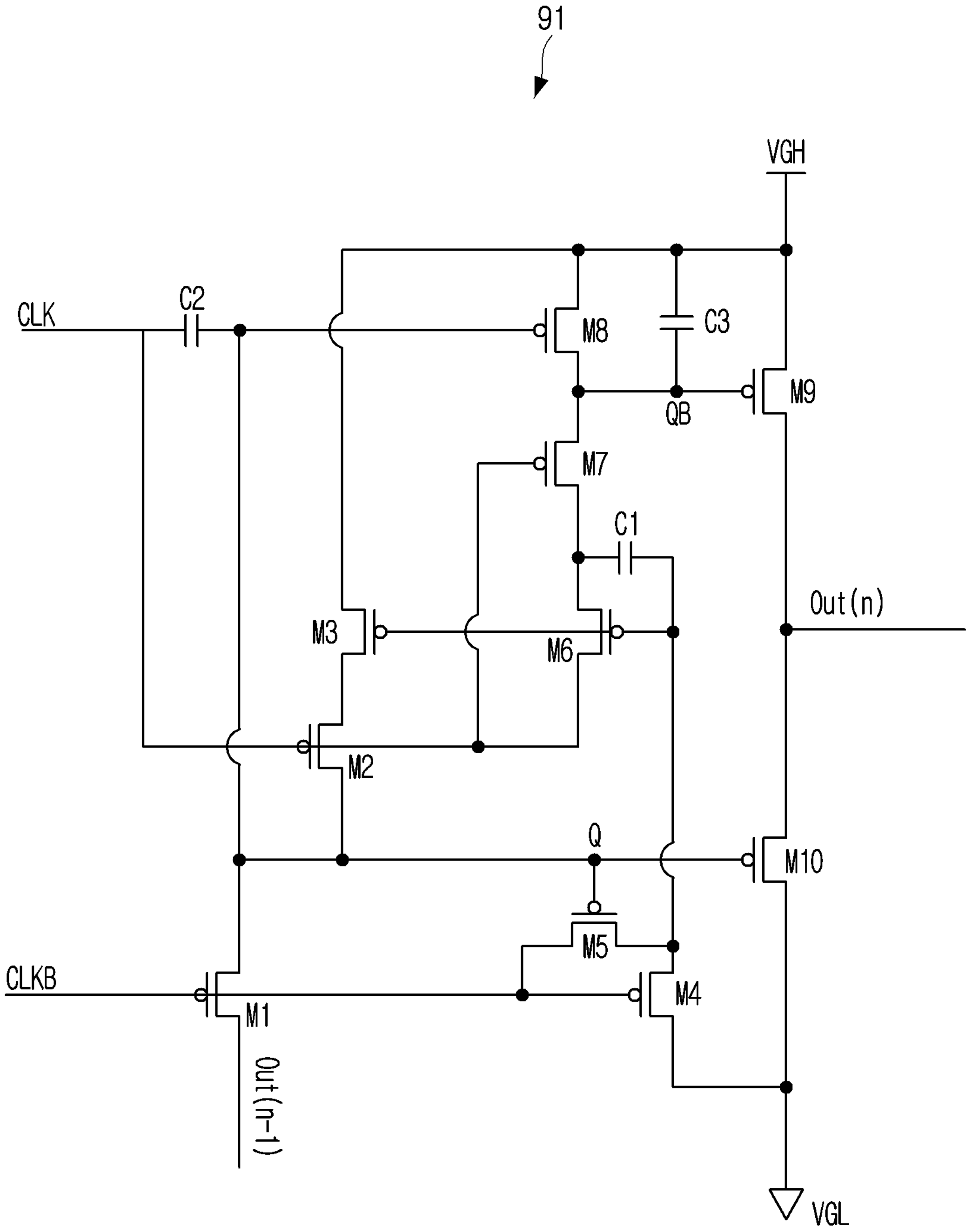
FIG. 9A is a circuit diagram of a unit emission driver circuit according to an embodiment.
Figure 9B:
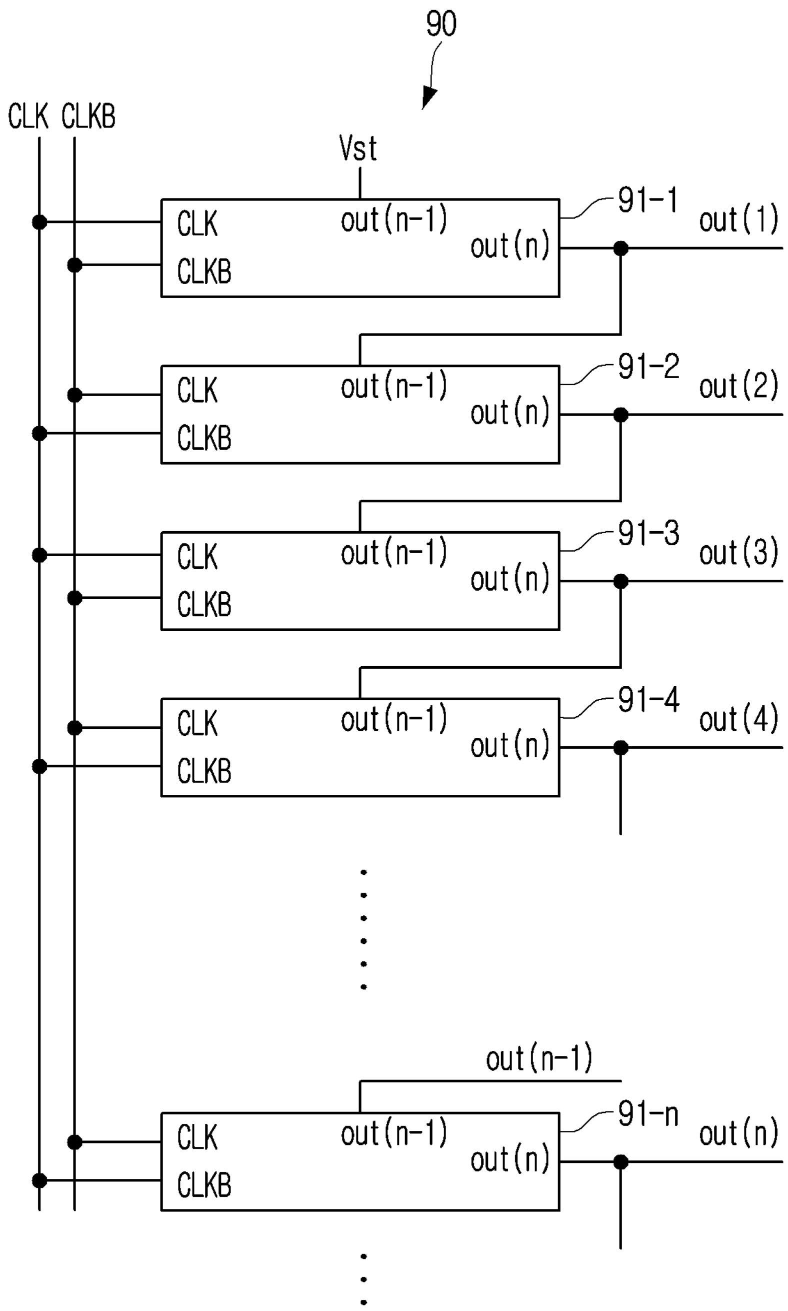
FIG. 9B is a block diagram of an emission driver according to an embodiment.
Figure 9C:
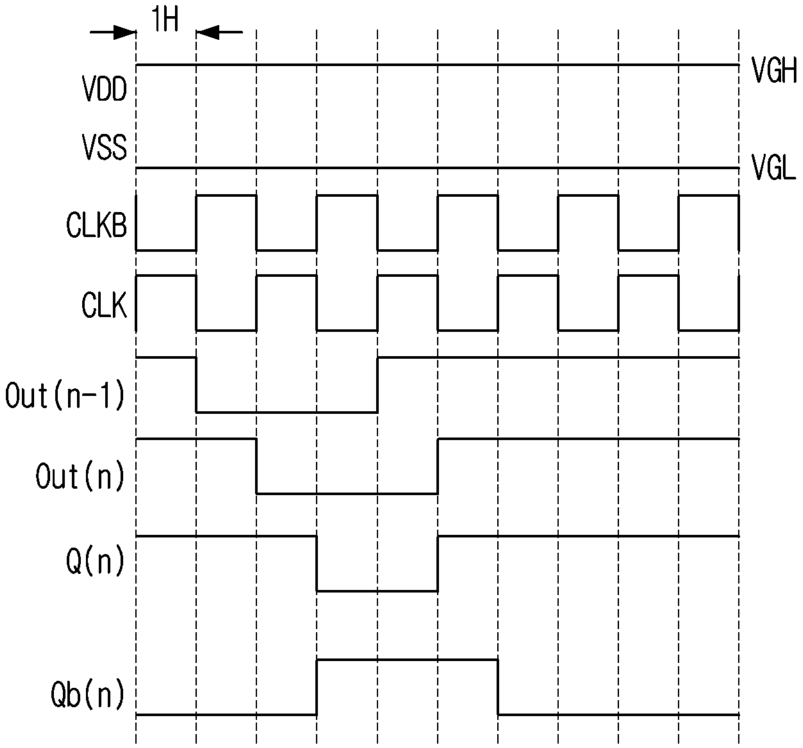
FIG. 9C is a timing diagram of various signals for driving the unit emission driver circuit according to an embodiment.

FIGS. 9A to 9C are views for explaining the emission driver according to an embodiment of the present disclosure. In some embodiments, an output signal Out(n) shown in FIGS. 9A to 9C may correspond to either the emission signal Emi_PWM(n) or the emission signal SET(n).

FIG. 9A is a circuit diagram of the unit emission driver circuit 91 according to an embodiment of the present disclosure. As shown in FIG. 9A, the unit emission driver circuit 91 may generate the output signal Out(n). In detail, the unit emission driver circuit 91 may receive the clock signals CLK and CLKB having the phases opposite to each other, driving voltage signals VGH and VGL, and an output signal Out(n−1) applied to the previous row-line, and output the output signal Out(n).

FIG. 9B is a block diagram of an emission driver 90 according to an embodiment of the present disclosure. As described above, the light emission section may be performed in the row-line order, and the emission signals may thus also be applied to the display panel 100 in the row-line order. To this end, unit emission driver circuits 91-1 to 91-*n* provided one for each row-line may be connected to each other as shown in FIG. 9B to configure the emission driver 90.

Referring to FIG. 9B, an output signal Out(1) of the unit emission driver circuit 91-1 for the first row-line may be input as a start signal of the unit emission driver circuit 91-2 for the second row-line, which may be the next row-line. This configuration may also be the same up to the unit emission driver circuit (91-*n*) for the n-th row-line. Meanwhile, it may be seen that the separate start signal Vst may be applied to the unit emission driver circuit 91-1 for the first row-line. Accordingly, the output signal Out(n) may be applied from the first to last row-lines of the display panel 100 in the row-line order when the start signal Vst may input thereto.

Meanwhile, referring to FIG. 9B, it may be seen that the clock signals CLK and CLKB having different phases are input to the unit emission driver circuits 91-1 to 91-*n* for each row-line in an order reversed from that of the previous row-line.

That is, the signal CLK may be input to an input terminal CLK of the unit emission driver circuit 91-1, and the signal CLKB may be input to an input terminal CLKB thereof. However, it may be seen that the signal CLKB may input to the input terminal CLK of the unit emission driver circuit 91-2 for the next row-line, and the signal CLK may input to the input terminal CLKB thereof. This configuration may also be the same up to the unit emission driver circuit 91-*n* for the n-th row-line.

FIG. 9C is a timing diagram of the various signals for driving the unit emission driver circuit 91 according to an embodiment of the present disclosure. As shown in FIG. 9C, it may be seen that the output signal Out(n−1) for the n−1-th row-line and the output signal Out(n) for the n-th row-line are sequentially generated in the row-line order.

A more detailed operation of the unit emission driver circuit 91 may be clearly understood by those skilled in the art through the circuit configuration shown in FIG. 9A, a connection relationship between the unit emission driver circuits 91-1 to 91-*n* shown in FIG. 9B, and the timing diagram shown in FIG. 9C. Therefore, the description below omits a more detailed description thereof.

Meanwhile, according to an embodiment of the present disclosure, an additional circuit configuration may be added to the above-described unit scan driver circuit 81 of FIG. 8A or the unit emission driver circuit 91 of FIG. 9A to implement the emission driver that applies the sweep signal Sweep(n) to the display panel 100 in the row-line order. A detailed content thereof may be out of the gist of the present disclosure, and the description below thus omits a description of the content.

Figure 10A:
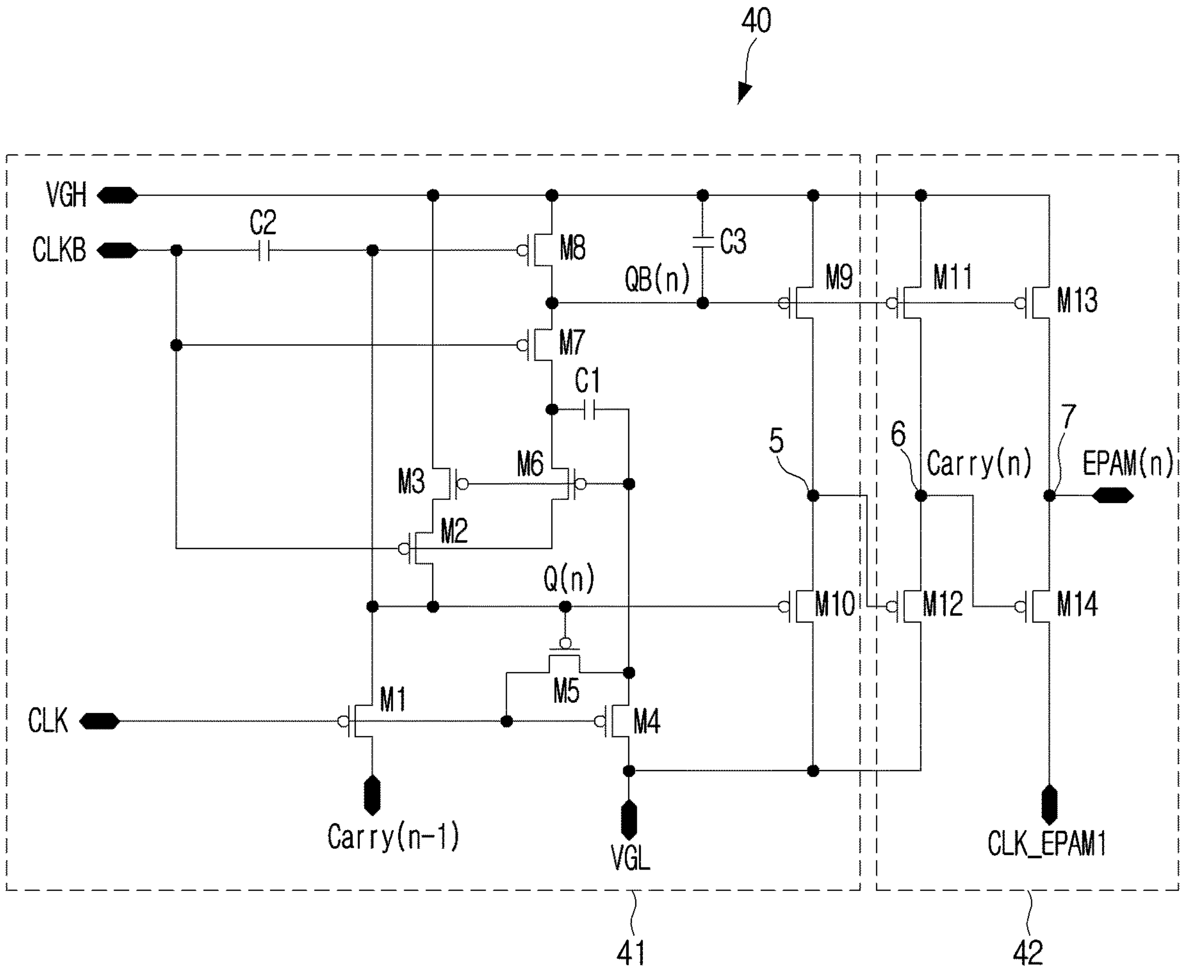
FIG. 10A is a circuit diagram of a unit emission driver circuit according to an embodiment.
Figure 10B:
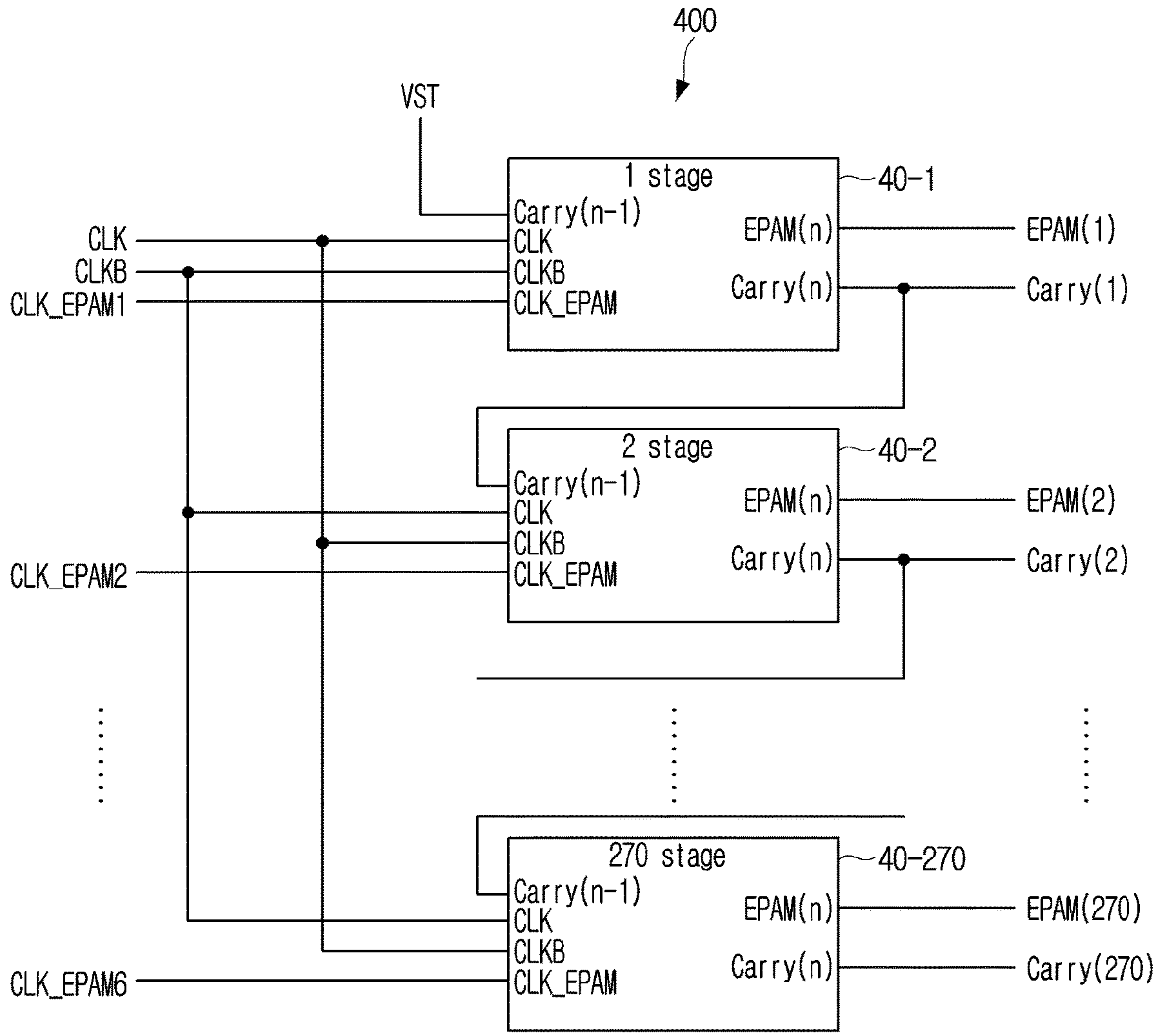
FIG. 10B is a block diagram of an emission driver according to an embodiment.
Figure 10C:
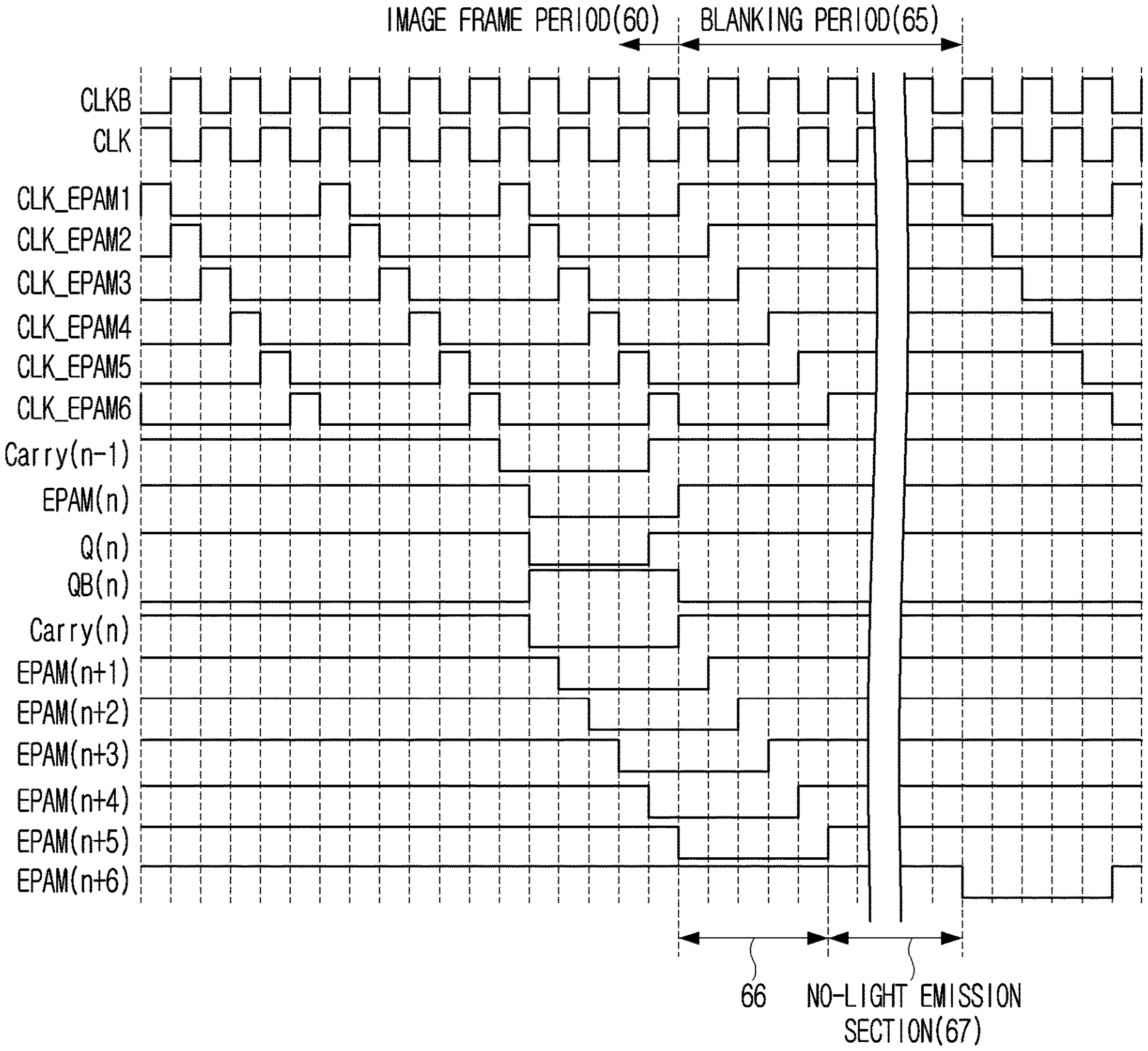
FIG. 10C is a timing diagram of various signals for driving the unit emission driver circuit according to an embodiment.

FIGS. 10A to 10C are views for explaining an emission driver according to another embodiment of the present disclosure. The emission driver described in FIGS. 10A to 10C may be a gate driver for applying an emission signal Emi_PAM(n) to the sub-pixels included in each row-line of the display panel 100 in the row-line order. FIGS. 10A to 10C show the emission signal Emi_PAM(n) as EPAM(n).

FIG. 10A is a circuit diagram of a unit emission driver circuit 40 according to another embodiment of the present disclosure. According to another embodiment of the present disclosure, an additional circuit configuration may be added to the unit emission driver circuit 91 of FIG. 9A to implement the emission driver that applies the emission signal Emi_PAM(n) to the display panel 100 in the row-line order.

In detail, as shown in FIG. 10A, the unit emission driver circuit 40 may include first and second circuit parts 41 and 42 which are connected to each other and included in one circuit, and generate the emission signal EPAM (n).

Here, it may be seen that the first circuit part 41 has the same circuit configuration as the unit emission driver circuit 91 of FIG. 9A.

Meanwhile, the second circuit part 42 may include four transistors M11 to M14.

In detail, the transistor M11 and the transistor M12 may be connected in series to each other, and a carry signal Carry(n) may be output at a node 6 where the two series-connected transistors M11 and M12 are connected to each other. In addition, the transistor M13 and the transistor M14 may be connected in series to each other, and the emission signal EPAM(n) may be output at a node 7 where the two series-connected transistors M13 and M14 are connected to each other.

Here, gate terminals of the transistors M11 and M13 may be commonly connected to a gate terminal of a transistor M9 of the first circuit part 41. In addition, source terminals of the transistors M11 and M13 may be commonly connected to a source terminal of the transistor M9, and receive the high-level driving voltage VGH.

A gate terminal of the transistor M12 may be connected to an output node 5 of the first circuit unit 41 to receive an output signal of the first circuit unit 41. In addition, a drain terminal of the transistor M12 may be commonly connected to a drain terminal of a transistor M10 of the first circuit unit 41 and receive the low-level driving voltage VGL.

The transistor M14 may have a gate terminal connected to the node 6 to receive the carry signal Carry(n), a drain terminal receiving an input signal CLK_EPAM1, and a source terminal connected to the transistor M13. Here, the input signal CLK_EPAM1 may be one of the plurality of input signals CLK_EPAM1 to CLK_EPAM6 having different phases, as shown in FIG. 10C.

Meanwhile, referring to FIG. 10A, it may be seen that the EPAM(n) signal represents the input signal CLK_EPAM1 output through the node 7 while the transistor M14 may be turned on based on the carry signal Carry(n). That is, it may be seen that the emission signal EPAM(n) may be a signal selectively output from the input signal CLK_EPAM1 based on the carry signal Carry(n).

In addition, it may be seen that the carry signal Carry (n) represents the low-level driving voltage VGL output through the node 6 while the transistor M12 may be turned on based on the signal output through the output node 5. Here, the transistor M12 may be turned on when the low-level signal may be applied to the gate terminal, and it may thus be seen that the output signal of the output node 5 and the carry signal Carry(n) have the same type of signal.

Meanwhile, the first circuit part 41 may have the same circuit configuration as that of the unit emission driver circuit 90 of FIG. 9A, and the signal input to the first circuit part 41 may also be similar to the signal CLK, CLKB or Out(n−1) input to the unit emission driver circuit 90 of FIG. 9A. It may thus be expected that a signal whose type may be similar to that of the output signal Out(n) shown in FIG. 9C (or a signal maintaining the low level for a predetermined time) may output through the output node 5.

Accordingly, the low-level carry signal Carry(n) may be output through the node 6 while the low-level output signal may output through the output node 5, and the input signal CLK_EPAM1 may be selectively output through the node 7 while the low-level carry signal Carry(n) may output through the node 6. Here, the emission signal EPAM(n) may represent the input signal CLK_EPAM1 that may selectively output.

Meanwhile, the transistor M11 and transistor M12 may serve as a sort of buffer. In detail, the carry(n) signal output through the node 6 may be theoretically the same as the output signal output through the output node 5 of the first circuit unit 41. However, during an actual circuit operation, the output signal of the output node 5 may be slightly excited in an operation section in which both the transistor M9 and the transistor M10 are turned off.

Therefore, the transistor M11 and the transistor M12 may be connected to each other between the output node 5 and the gate terminal of the transistor M14, as shown in FIG. 10A, instead of connecting the output node 5 directly to the gate terminal of the transistor M14, thereby implementing a clear signal applied to the gate terminal of the transistor M14.

FIG. 10B is a block diagram of an emission driver 400 according to another embodiment of the present disclosure. FIG. 10B shows an example of the emission driver 400 for applying the emission signal EPAM(n) to the display panel 100 including 270 row-lines.

As described above, the emission signal EPAM(n) may be sequentially applied to each row-line of the display panel 100 in the row-line order like other gate signals. To this end, according to another embodiment of the present disclosure, unit emission driver circuits 40-1 to 40-270 provided one for each row-line may be connected to each other as shown in FIG. 10B to configure the emission driver 400.

Referring to FIG. 10B, each of the unit emission driver circuits 40-1 to 40-270 may receive one of a carry signal Carry(n−1) of the previous row-line, the clock signals CLK and CLKB having different phases, and the six input signals CLK_EPAM1 to CLK_EPAM6 having different phases, and output the carry signal Carry(n) and the emission signal EPAM(n).

In detail, the unit emission driver circuit 40-2 for the second row-line may receive an output carry signal Carry(l) of the unit emission driver circuit 40-1 for the first row-line, which may be the previous row-line, through a terminal of the carry signal Carry(n−1). This configuration may also be the same up to the unit emission driver circuit 40-270 for the 270-th row-line. Meanwhile, the first row-line has no previous row-line, and the separate start signal VST may be input to the unit emission driver circuit 40-1 for the first row-line.

Accordingly, the emission driver 400 may sequentially output the carry signal Carry(n) and the emission signal EPAM(n) from Carry(l) and EPAM(1) to Carry(270) and the EPAM (270) in the row-line order when the start signal VST may input to the emission driver circuit 40-1 for the first row-line.

Meanwhile, referring to FIG. 10B, it may be seen that the clock signals CLK and CLKB having different phases are input to the unit emission driver circuits 40-1 to 40-270 for each row-line in an order reversed from that of the previous row-line.

That is, the signal CLK may be input to an input terminal CLK of the unit emission driver circuit 40-1 for the first low-line, and the signal CLKB may be input to an input terminal CLKB thereof. However, it may be seen that the signal CLKB may input to the input terminal CLK of the unit emission driver circuit 40-2 for the next row-line, and the signal CLK may input to the input terminal CLKB thereof. This configuration may also be the same up to the unit emission driver circuit 40-270 for the 270-th row-line.

In addition, the six input signals CLK_EPAM1 to CLK_EPAM6, which are same signals having different phases, may be cyclically input to the unit emission driver circuits 40-1 to 40-270 for each row-line, one by one in the row-line order.

That is, referring to FIG. 10B, the input signal CLK_EPAM1 may be input to the unit emission driver circuit 40-1 for the first row-line, and the input signal CLK_EPAM2 may be input to the unit emission driver circuit 40-2 for the second row-line.

In addition, although not shown in the drawings, the input signals CLK_EPAM3 to CLK_EPAM6 may be sequentially input to the unit emission driver circuits for the third to sixth row-lines, respectively, and the input signal CLK_EPAM1 may be input again to the unit emission driver circuit for the seventh row-line.

In this way, the six input signals CLK_EPAM1 to CLK_EPAM6 may be cyclically input one by one in the row-line order, and the input signal CLK_EPAM6 may be input to the unit emission driver circuit 40-270 for the 270-th row-line, as shown in FIG. 10B.

FIG. 10C is a timing diagram of the various signals for driving the unit emission driver circuit 40 according to another embodiment of the present disclosure.

Referring to FIG. 10C, it may be seen that the six input signals CLK_EPAM1 to CLK_EPAM6 are same signals only having different phases.

In detail, the input signal CLK_EPAM1 may be obtained by repeating a high level of a first time and a low level of a second time during the image frame period, and maintaining the high level during the blanking period.

The input signal CLK_EPAM2 may be obtained by shifting the input signal CLK_EPAM1 by the first time. Similarly, the input signals CLK_EPAM3, CLK_EPAM4, CLK_EPAM5, and CLK_EPAM6 may respectively be obtained by shifting the input signals CLK_EPAM2, CLK_EPAM3, CLK_EPAM4, and CLK_EPAM5 by the first time.

Here, the illustrated example uses the six input signals, and the second time may be five times the first time. However, another embodiment is not limited thereto.

Meanwhile, as described above, these six input signals CLK_EPAM1 to CLK_EPAM6 may be cyclically input one by one in the row-line order, and FIG. 10C shows that the input signal CLK_EPAM1 may input to the emission driver circuit for the n-th row-line. Accordingly, it may be seen that the input signals CLK_EPAM2 to CLK_EPAM6 are respectively applied to the unit emission driver circuits for n+1-th to n+5-th row-lines.

Meanwhile, as described above, the unit emission driver circuit 40 for the n-th row-line may receive the output carry signal Carry(n−1) of the unit emission driver circuit for an n−1-th row-line, and output the carry signal Carry(n). Here, referring to FIG. 10C, the unit emission driver circuit 40 for the n-th row-line may output the carry signal Carry(n) obtained by shifting the carry signal Carry(n−1) by the first time.

Meanwhile, as described above, the unit emission driver circuit 40 for the n-th row-line may selectively output the input signal CLK_EPAM1 while the low-level carry signal Carry(n) may output. Referring to FIG. 10C, the input signal CLK_EPAM1 may have the low level in a section where the carry signal Carry(n) has the low level, and the unit emission driver circuit 40 for the n-th row-line may output the emission signal EPAM(n) having the low level while the carry signal Carry(n) has the low level.

Similarly, although not shown in the drawing, each of the unit emission driver circuits for the n+1-th to n+5-th row-lines may receive the output carry signal of the unit emission driver circuit for the previous row-line and output carry signals Carry(n+1) to Carry(n+5). Here, it may be sufficiently expected that the carry signals Carry(n+1) to Carry (n+5) are respectively obtained by shifting the carry signals Carry(n) to Carry(n+4) by the first time.

Accordingly, the input signals CLK_EPAM2 to CLK_EPAM6 may have the low level in a section where the carry signals Carry(n+1) to Carry(n+5) have the low level, and the unit emission driver circuits for the n+1-th to n+5-th row-lines may thus respectively output emission signals EPAM(n+1) to EPAM(n+5) having the low level, as shown in FIG. 10C.

As shown in FIGS. 6A to 6E, the second switching transistor T15 may need to be turned on in the light emission section. Accordingly, the emission driver 400 may turn on the second switching transistor T15 by applying the low-level emission signal EPAM to the sub-pixel circuit 110 as described above during the light emission section.

Meanwhile, as described above, the input signals may be cyclically input one by one in the row-line order, and the input signal CLK_EPAM1 may thus be again input to the unit emission driver circuit for the n+6-th row-line.

Here, although not shown in FIG. 10C, it may be expected that the unit emission driver circuit for the n+6-th row-line receives the carry signal Carry(n+5), and output the carry signal Carry(n+6) obtained by shifting the carry signal Carry(n+5) by the first time.

However, in this case, the input signal CLK_EPAM1 may have the high level in the section where the carry signal Carry(n+6) has the low level. Therefore, the unit emission driver circuit for the n+6-th row-line may output EPAM(n+6) having the high level while the carry signal Carry(n+6) has the low level.

Meanwhile, the unit emission driver circuit for the n+7-th row-line may receive the carry signal Carry (n+6), and output the carry signal Carry(n+7) obtained by shifting the carry signal Carry (n+6) by the first time. However, also in this case, the input signal CLK_EPAM2 may also have the high level in the section where the carry signal Carry(n+7) has the low level, and the unit emission driver circuit for the n+7-th row-line may thus output EPAM(n+7) having the high level while the carry signal Carry(n+7) has the low level.

As described above, referring to FIG. 10C, the unit emission driver circuits for the n+6-th row-line up to a predetermined number of row-lines may respectively output the low-level carry signals Carry and the high-level emission signals EPAM, shifted in the row-line units.

Meanwhile, as described above, the driving unit 200 in the no-light emission section 67 may apply the second control signal (i.e., emission signal Emi_PAM) of a different level from that in the light emission section to the sub-pixels in the row-line order, thereby implementing the no-light emission section 67.

In detail, the emission driver 400 may apply the high-level emission signal EPAM to the sub-pixel circuit 110 in the no-light emission section 67 to turn off the second switching transistor T15, thereby implementing the no-light emission section 67 regardless of another emission signal Emi_PWM(n), SET(n), or Sweep(n).

As described above, according to another embodiment of the present disclosure, the emission driver 400 may select and output a specific section of the input signals CLK_E-PAM1 to CLK_EPAM6 based on the carry signal Carry(n).

Here, the input signal may have the low level while the carry signal Carry(n) have the low level in the image frame period 60 and a portion of a section 66 of the blanking period 65. Therefore, the emission driver 400 may apply the low-level emission signal Emi_PAM(n) to the display panel 100, thereby implementing the light emission section.

In addition, the input signal may have the high level while the carry signal Carry(n) have the low level in the no-light emission section 67 of the blanking period 65. Therefore, the emission driver 400 may apply the high-level emission signal Emi_PAM(n) to the display panel 100, thereby implementing the no-light emission section.

That is, as described above, the start signal VST may be input, and the emission driver 400 may then unconditionally apply the emission signal Emi_PAM(n) for the first to last row-lines of the display panel 100.

Here, there may be no time when the current does not flow in the display panel 100 if the low-level emission signal Emi_PAM(n) may be applied to the display panel 100. As a result, there may be no time for detecting malfunction of the TFT substrate.

Therefore, the emission driver 400 may be designed to apply the high-level emission signal Emi_PAM(n) to the display panel 100 in the no-light emission section even though the low-level carry signals Carry(n) are sequentially generated for the first to last row-lines based on the start signal, thereby securing time for detecting the malfunction of the display panel 100 while the display panel may be driven.

FIGS. 11A to 11D are views for explaining an operation of the unit emission driver circuit 40 according to another embodiment of the present disclosure.

Figure 11A:
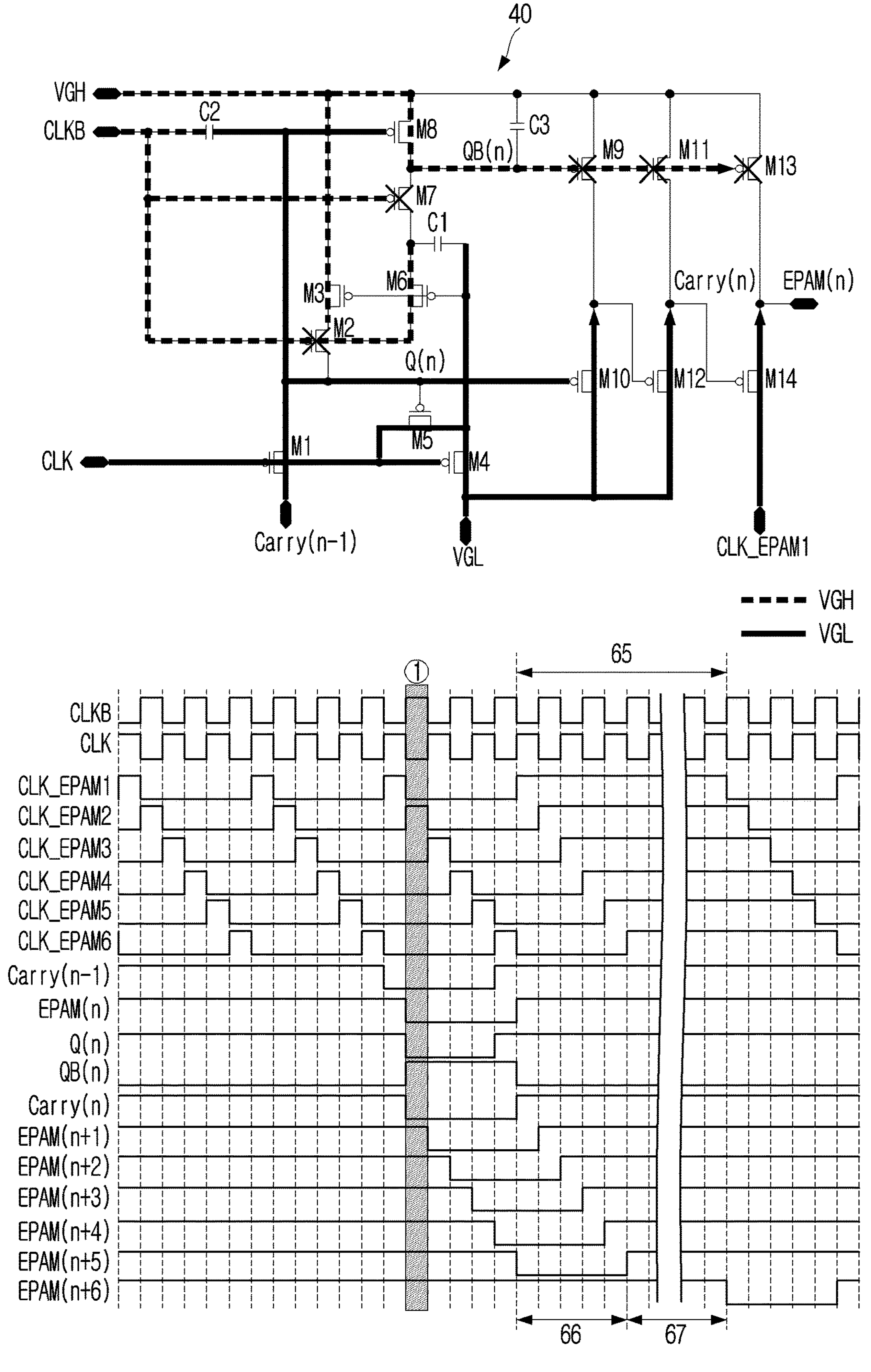
FIG. 11A is a view for explaining an operation of a unit emission driver circuit according to an embodiment.

FIG. 11A shows an operation of the unit emission driver circuit 40 during time ①. Referring to FIG. 11A, the transistor M1 may be turned on based on CLK, the voltage VGL of the carry signal Carry(n−1) may be pre-charged to a node Q(n), and Carry(n) and EPAM(n) may thus each have the low voltage VGL.

Figure 11B:
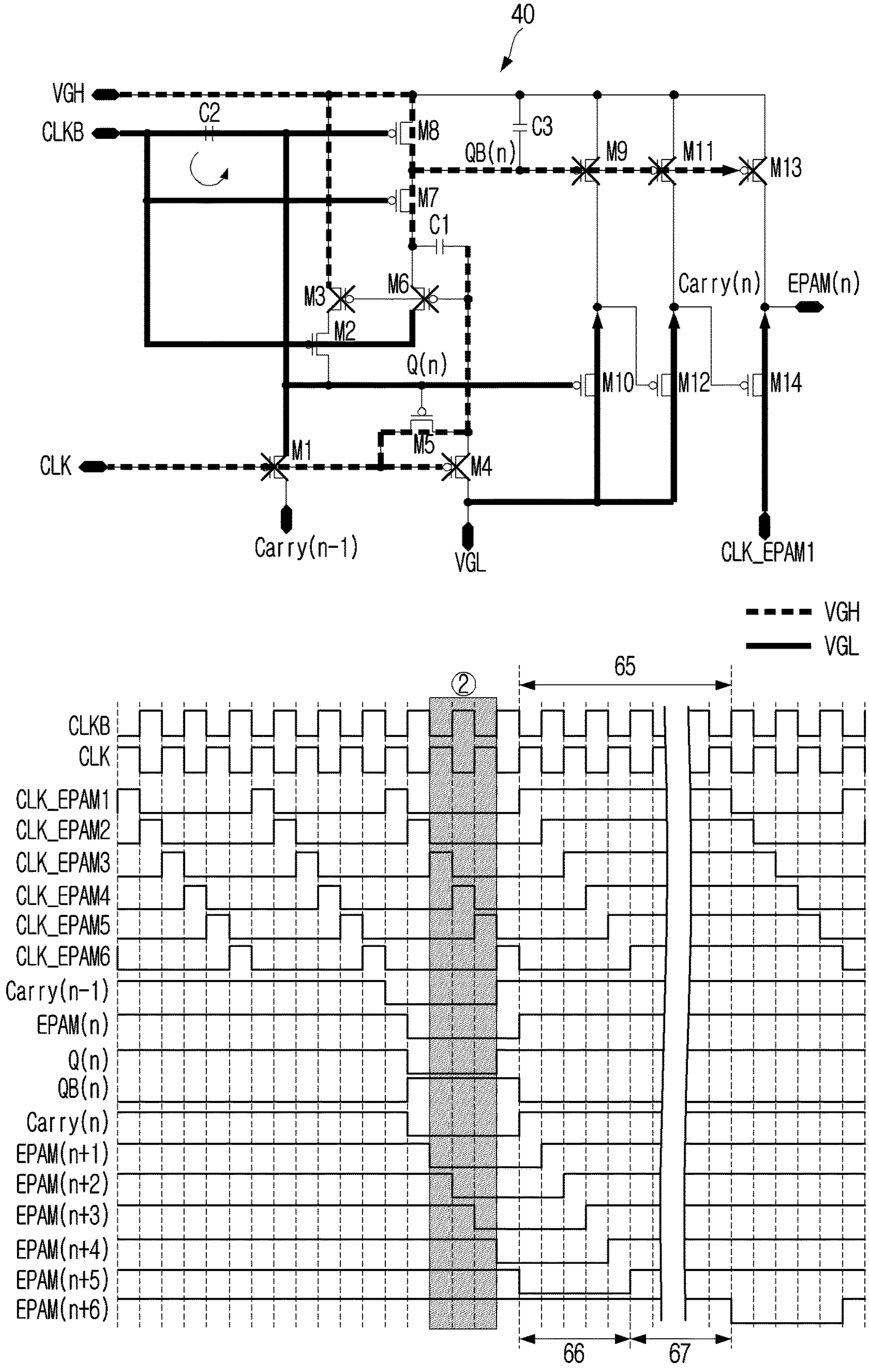
FIG. 11B is a view for explaining the operation of the unit emission driver circuit according to an embodiment.

FIG. 11B shows an operation of the unit emission driver circuit 40 during time ②. Referring to FIG. 11B, the node Q(n) may maintain the voltage VGL or below based on the clock signal CLKB and the capacitor C2, and Carry(n) and EPAM(n) may maintain the voltage VGL.

Figure 11C:
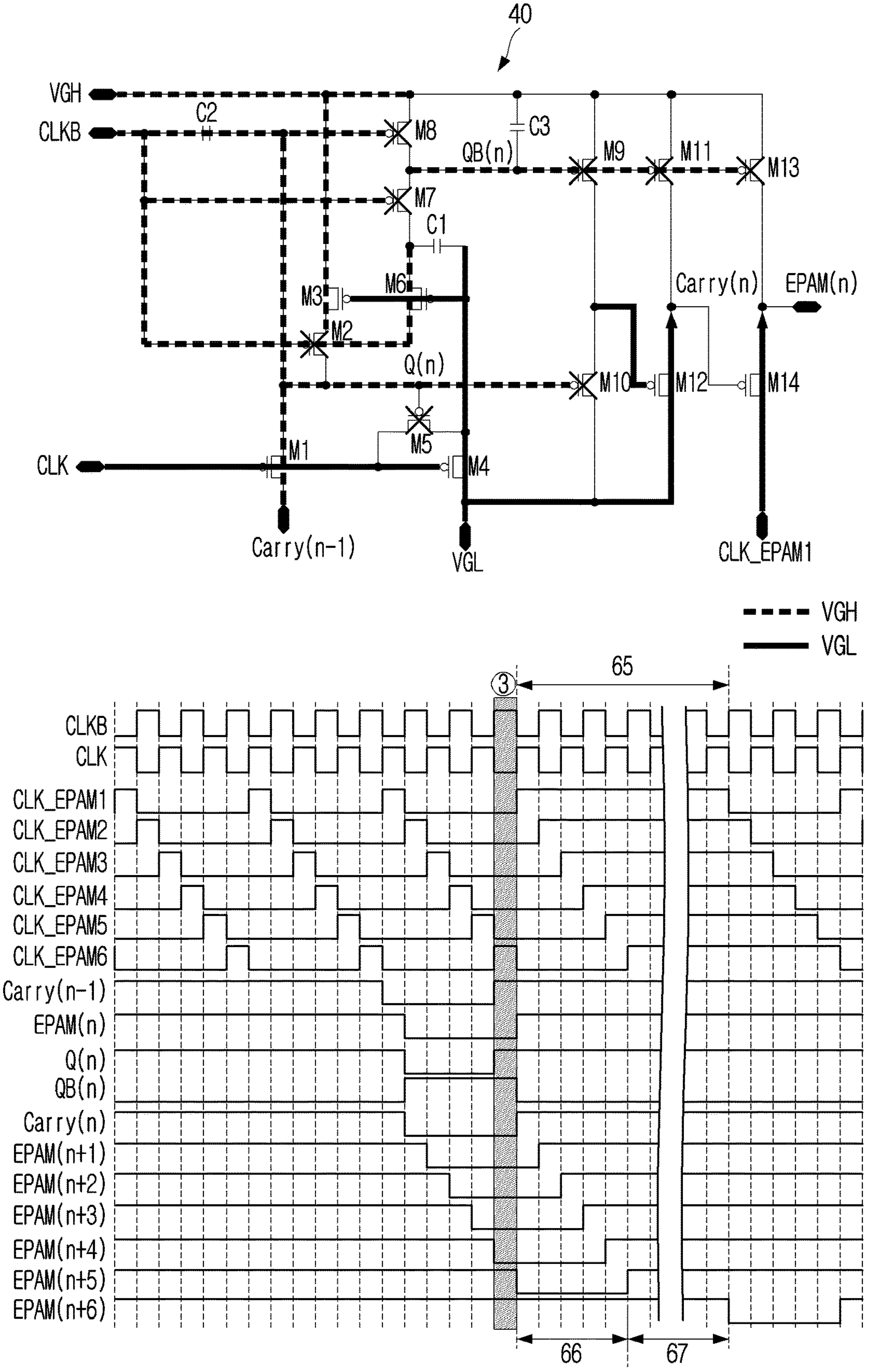
FIG. 11C is a view for explaining the operation of the unit emission driver circuit according to an embodiment.

FIG. 11C shows an operation of the unit emission driver circuit 40 during time ③. Referring to FIG. 11C, the node Q(n) may have the high voltage VGH, and the node 5 positioned between the transistors M9 and M10 may float to maintain the voltage VGL. Accordingly, Carry(n) and EPAM(n) may maintain the voltage VGL.

Figure 11D:
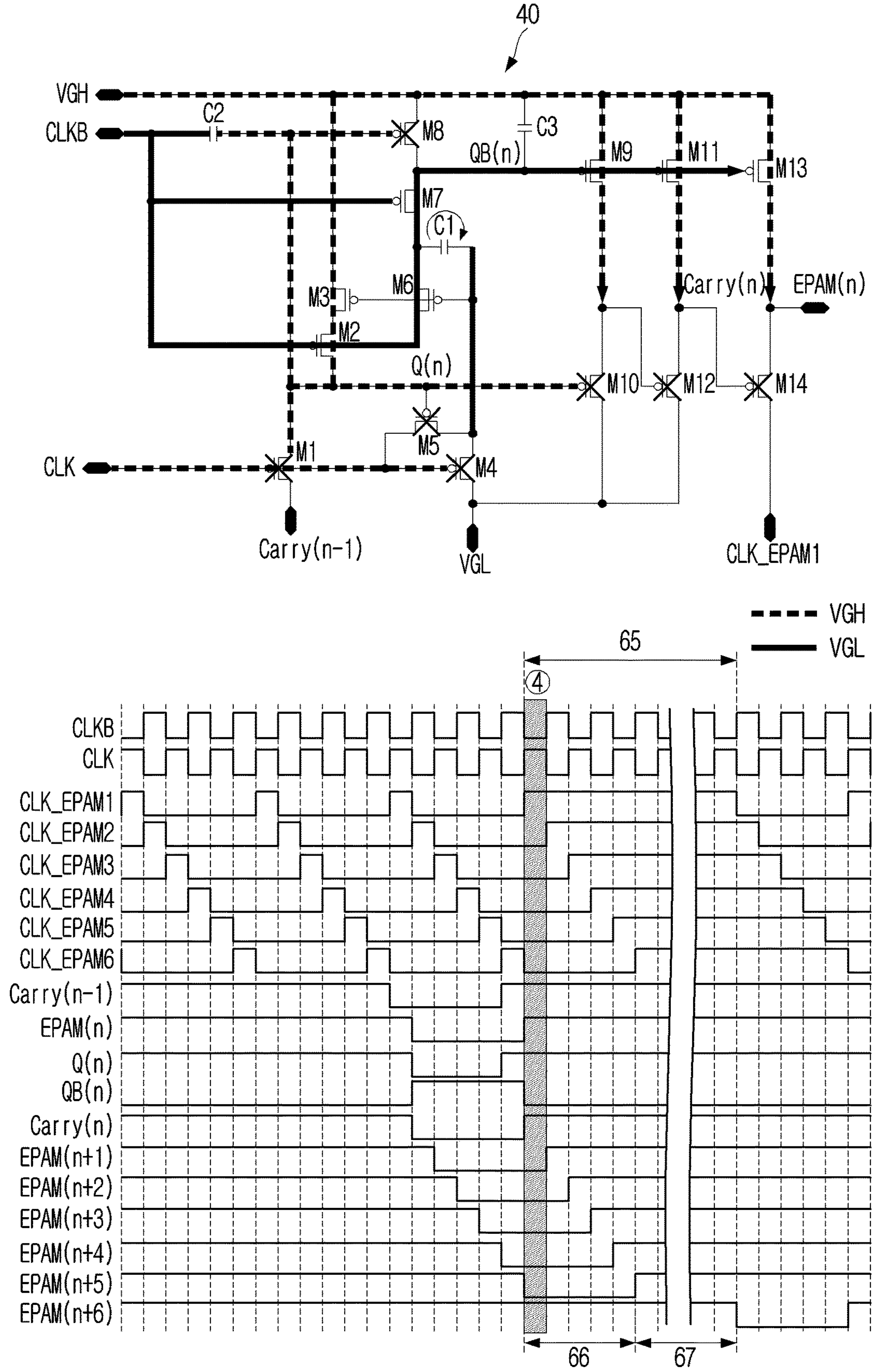
FIG. 11D is a view for explaining the operation of the unit emission driver circuit according to an embodiment.

FIG. 11D shows an operation of the unit emission driver circuit 40 during time ④. Referring to FIG. 11D, a node QB(n) may have the low voltage VGL CLKB(VGL) as the transistors M6 and M7 are turned on, the transistors M11 and M13 may thus be turned on, and Carry(n) and EPAM(n) may have the high voltage VGH.

Figure 12:
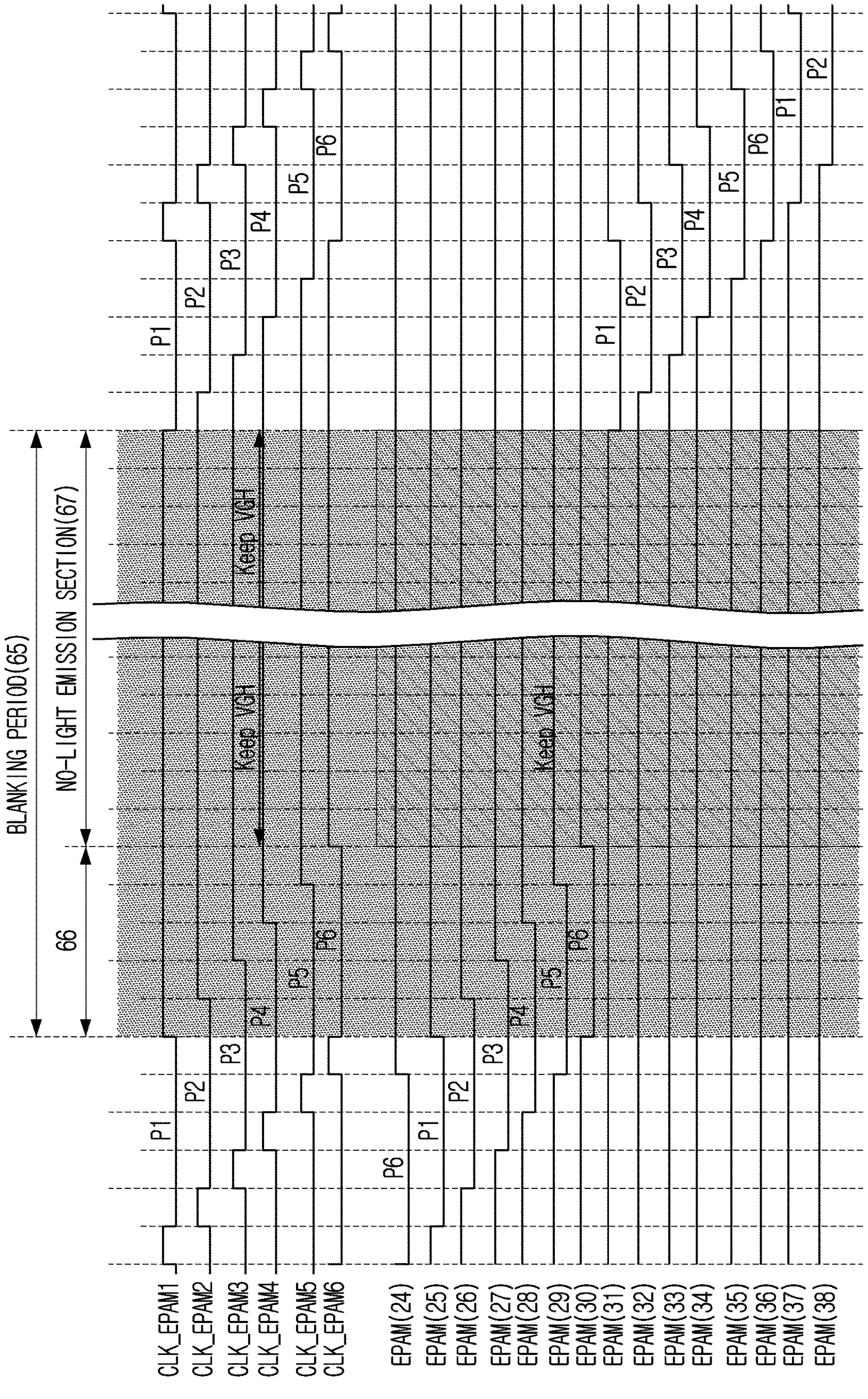
FIG. 12 is an exemplary view showing an emission signal applied to a part of the display panel according to an embodiment.

FIG. 12 is an exemplary view showing an emission signal applied to a part of the display panel 100 according to an embodiment of the present disclosure.

In detail, FIG. 12 exemplifies that the emission signal EPAM(n) described above with reference to FIGS. 10A to 10C may be applied to the 24-th row-line up to 38-th row-line in a section corresponding to reference numeral 19 of FIG. 6A.

Referring to FIG. 12, the six input signals CLK_EPAM1 to CLK_EPAM6 are used, and the CLK_EPAM6 may thus be input to the unit emission driver circuit for the 24-th row-line when assuming that CLK_EPAM1 may input to the unit emission driver circuit for the first row-line. Accordingly, it may be seen that a low-level emission signal EPAM 24 selectively output from CLK_EPAM6 by the low-level carry signal Carry 24 may be applied to the 24-th row-line as shown in FIG. 12.

Similarly, it may be seen that low-level emission signals EPAM(25) to EPAM(30) selectively output from CLK_E-PAM1 to CLK_EPAM6 by low-level carry signals Carry(25) to Carry(30) are respectively applied to the 25-th row-line up to the 30-th row-line as shown in FIG. 12.

Meanwhile, CLK_EPAM1 may be input to the unit emission driver circuit for the 31-th row-line, and the low-level carry signal Carry(31) may be present in the blanking period. Accordingly, it may be seen that CLK_EPAM1 has the high level while the carry signal Carry(31) has the low level, and the high-level emission signal EPAM 31 may be applied to the 31-th row-line as shown in FIG. 12. This configuration may be the same for the 32-th row-line up to the 38-th row-line.

Meanwhile, the low-level emission signals applied to the 31-th to 38-th row-lines after the blanking period may be driven in the light emission section 62-7 of FIG. 6A rather than the following light emission section 62-6.

FIGS. 13A to 13E are views for explaining an emission driver according to still another embodiment of the present disclosure. The emission driver described in FIGS. 13A to 13E may be a gate driver for applying an emission signal Emi_PAM(n) to the sub-pixels included in each row-line of the display panel 100 in the row-line order. FIGS. 13A to 13E show the emission signal Emi_PAM(n) as EMI(n).

Figure 13A:
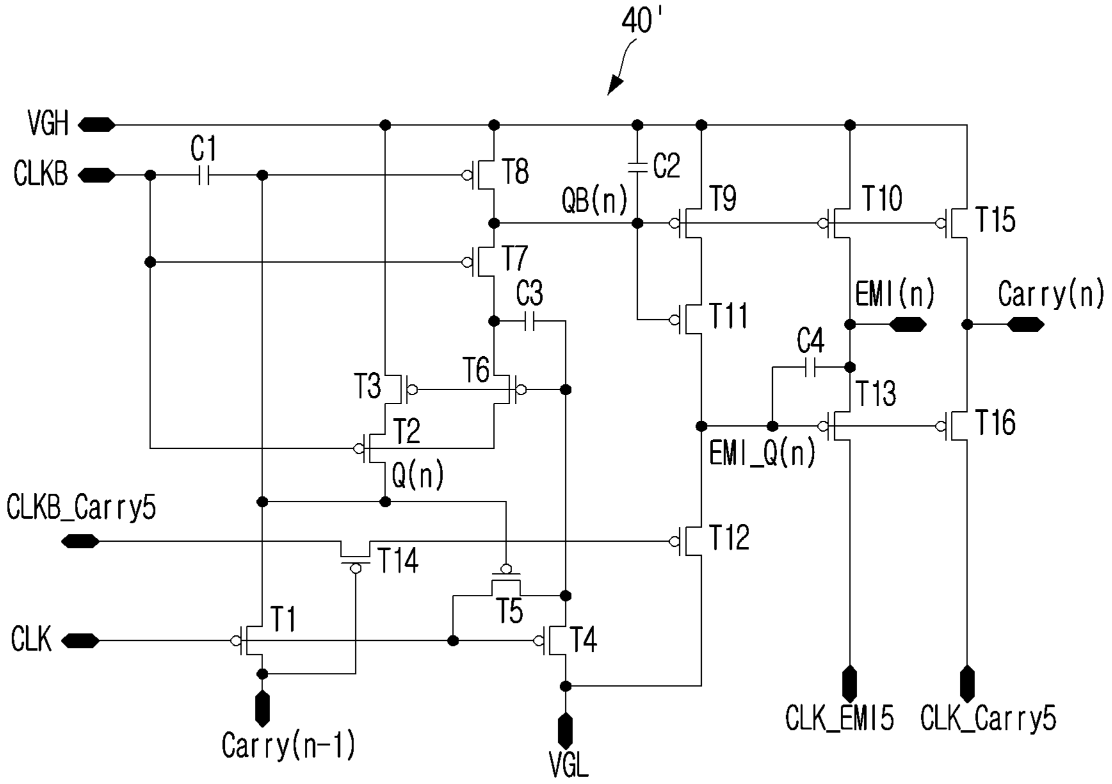
FIG. 13A is a circuit diagram of a unit emission driver circuit according to an embodiment.
Figure 13B:
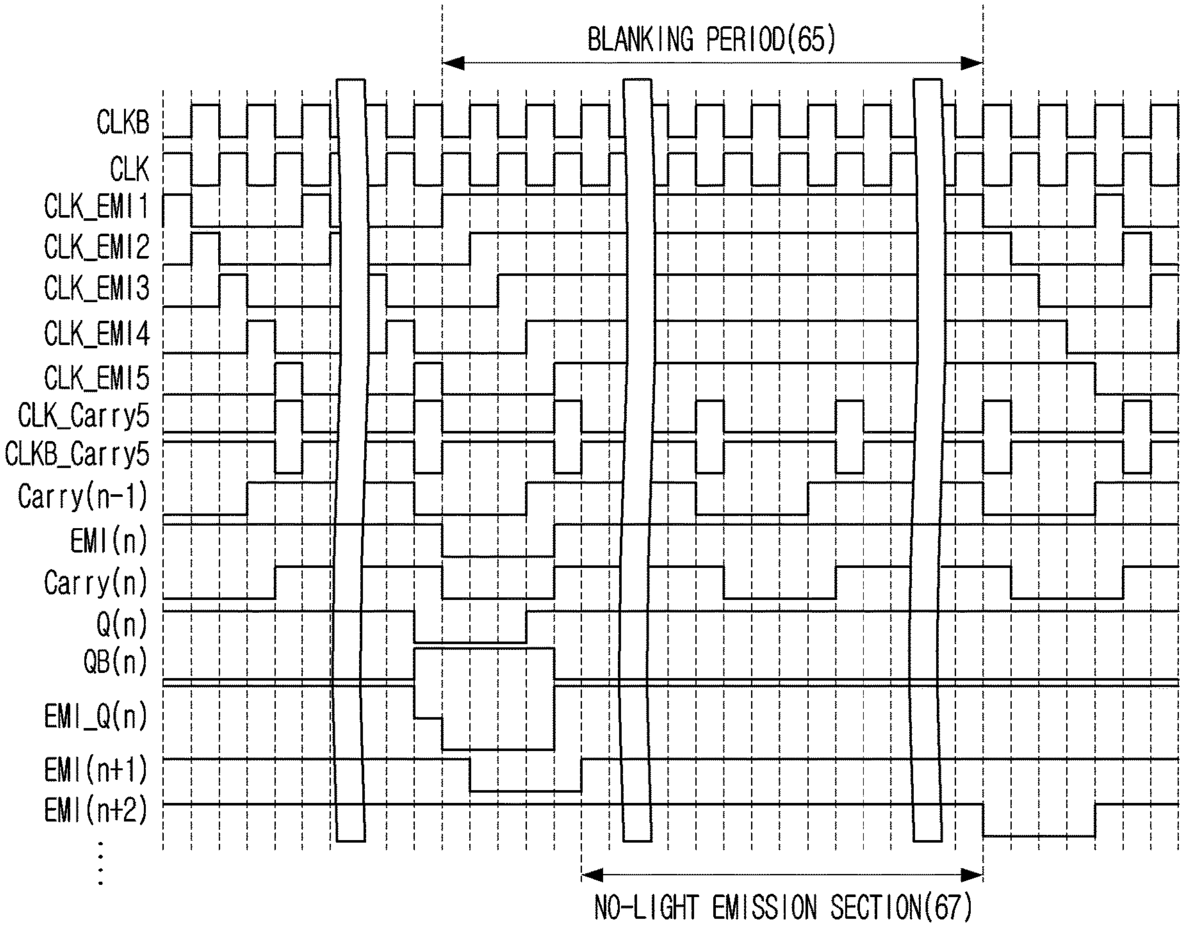
FIG. 13B is a timing diagram of various signals for driving the unit emission driver circuit of FIG. 13A.

FIG. 13A is a circuit diagram of a unit emission driver circuit 40' according to still another embodiment of the present disclosure; and FIG. 13B is a timing diagram of various signals for driving the unit emission driver circuit 40' of FIG. 13A.

Referring to FIG. 13A, the unit emission driver circuit 40' may separate the node Q(n) to pre-charge a node EMI_Q(n) through the transistor T14, and output the emission signal EMI(n) through bootstrapping (VGH→VGL).

Figure 13C:
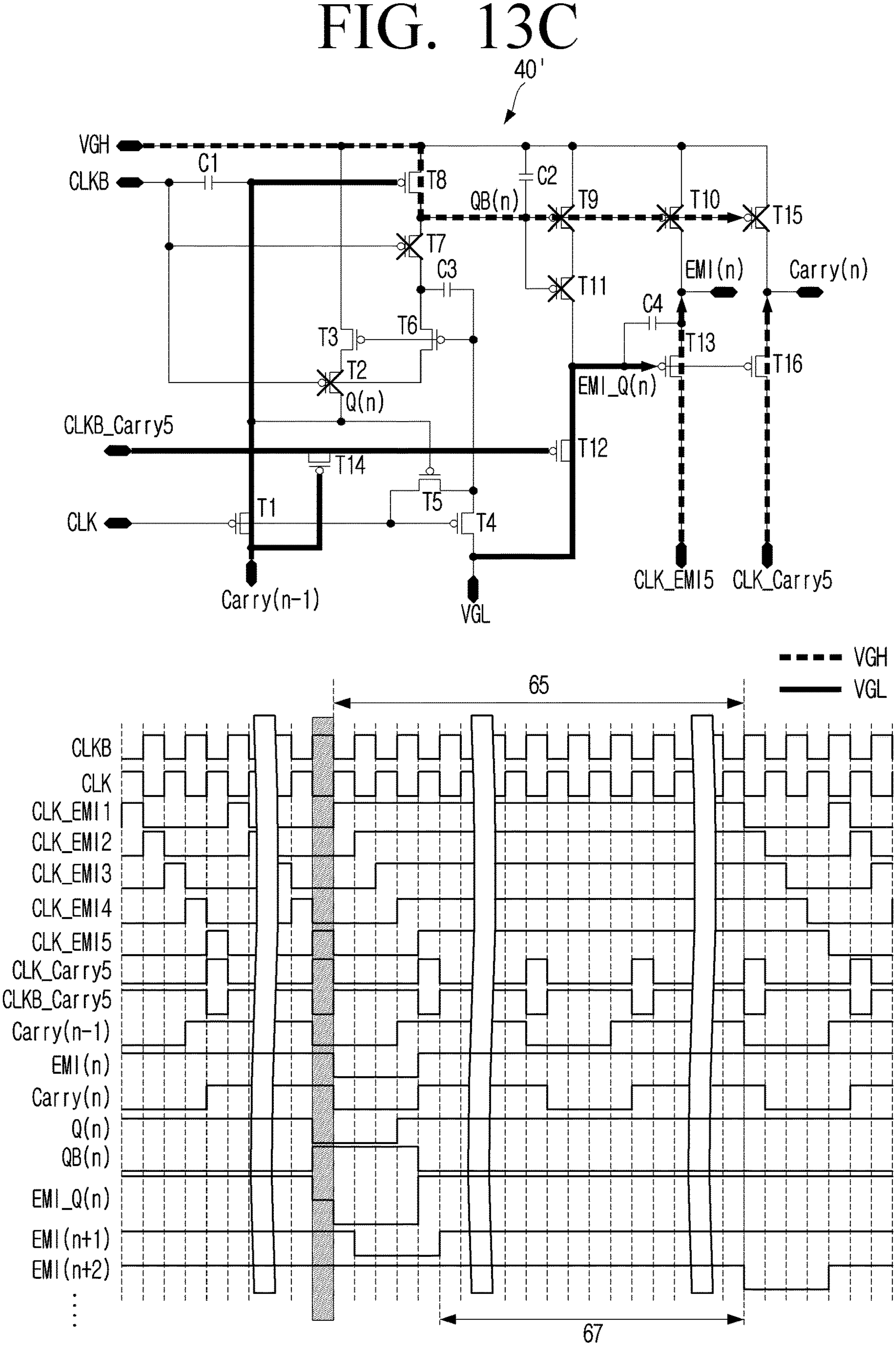
FIG. 13C is a view showing a pre-charging process of the unit emission driver circuit of FIG. 13A.
Figure 13D:
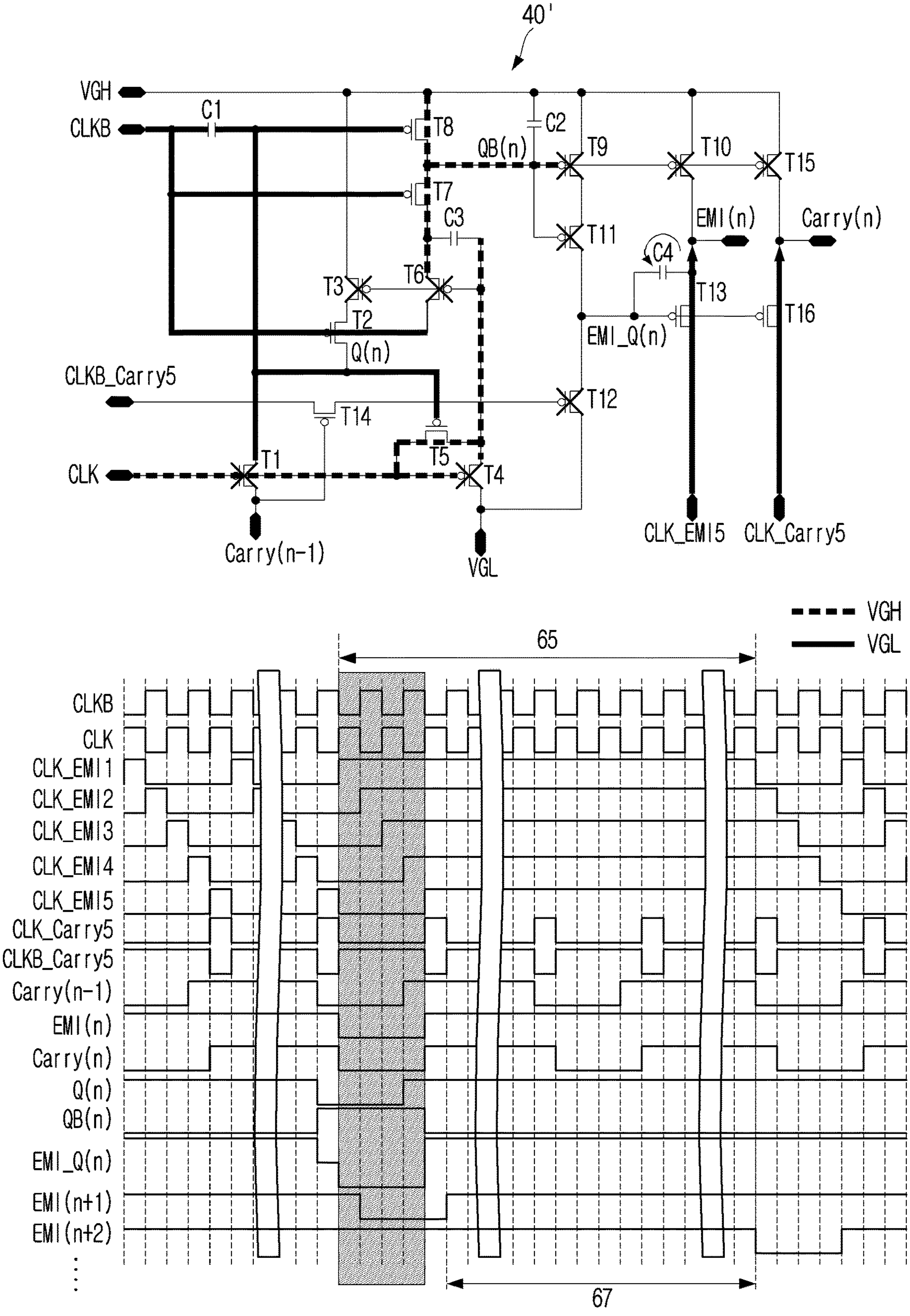
FIG. 13D is a view showing a process of bootstrapping of the unit emission driver circuit of FIG. 13A to output an emission signal EMI(n)

FIG. 13C shows in detail a pre-charging process of the unit emission driver circuit 40'; and FIG. 13D shows in detail a bootstrapping process of the unit emission driver circuit 40' and an output process of the emission signal EMI(n).

Meanwhile, referring to FIG. 13B, it may be seen that five emission clock signals CLK_EMI1 to CLK_EMI5, i.e., same signals only having different phases, are used, unlike another embodiment of FIGS. 10A to 10C. In addition, it may be seen that separate carry clock signals (CLK_Carry5 and CLKB_Carry5 in FIG. 13B) are required in addition to the clock signals CLK and CLKB.

Here, in still another embodiment of FIGS. 13A to 13E, the emission clock signals CLK_EMI1 to CLK_EMI5 may serve the same roles as the input signals CLK_EPAM1 to CLK_EPAM6 described above with reference to FIGS. 10A to 10C.

As shown in FIG. 13B, it may be seen that the emission signal EMI(n) may selectively output from the emission clock signal CLK_EMI5 while the low-level carry signal Carry(n) may output from the unit emission driver circuit 40'.

In particular, it may be seen that the emission clock signal CLK_EMI5 has the high voltage (VGH) while the low-level carry signal may output, in the no-light emission section 67, and the high-level emission signal EMI(n) may output.

Figure 13E:
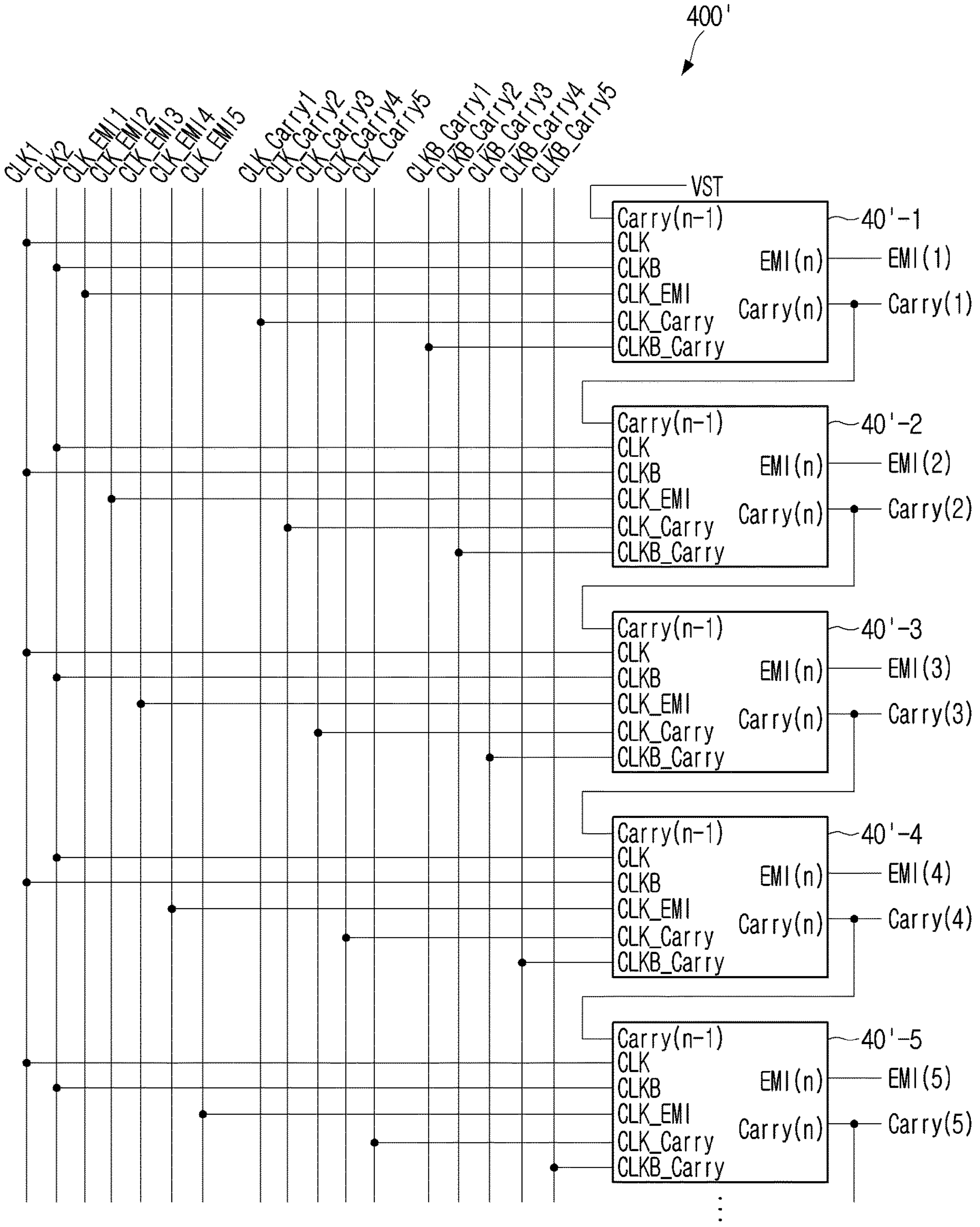
FIG. 13E is a block diagram of an emission driver according to an embodiment.

FIG. 13E is a block diagram of an emission driver 400' according to still another embodiment of the present disclosure. The emission signal EMI(n) may be sequentially applied to each row-line of the display panel 100 in the row-line order like other gate signals. To this end, unit scan driver circuits 40'-1 to 40'-5 provided one for each row-line may be connected to each other as shown in FIG. 13E to configure the emission driver 400'.

Referring to FIG. 13E, each of the unit emission driver circuits 40'-1 to 40'-5 may receive the following signals and output the carry signal Carry(n) and the emission signal EMI(n): the carry signal Carry(n−1) of the previous row-line, the clock signals CLK1 and CLK2, one of five emission clock signals CLK_EMI1 to CLK_EMI5, one of five first carry clock signals CLK_Carry1 to CLK_Carry5, and one of five second carry clock signals CLKB_Carry1 to CLKB_Carry5.

In detail, the unit emission driver circuit 40'-2 for the second row-line may receive the output carry signal Carry(1) of the unit emission driver circuit 40'-1 for the first row-line, which may be the previous row-line, through the terminal of Carry(n−1). This configuration may be also the same for the rest unit emission driver circuits. Meanwhile, the first row-line has no previous row-line, and the separate start signal VST may be input to the unit emission driver circuit 40'-1 for the first row-line.

Accordingly, the emission driver 400' may sequentially output the carry signal Carry(n) and the emission signal EMI(n) in the row-line order when the start signal VST may input to the emission driver circuit 40'-1 for the first row-line.

Meanwhile, referring to FIG. 13E, it may be seen that the clock signals CLK1 and CLK2 having different phases are input to the unit emission driver circuits 40'-1 to 40'-5 for each row-line in an order reversed from that of the previous row-line.

That is, the signal CLK1 may be input to an input terminal CLK of the unit emission driver circuit 40'-1 for the first row-line, and the signal CLK2 may be input to an input terminal CLKB thereof. However, it may be seen that the signal CLK2 may input to the input terminal CLK of the unit emission driver circuit 40'-2 for the next row-line, and the signal CLK1 may input to an input terminal CLKB thereof. This configuration may be also the same for the unit emission driver circuits for the rest row-lines.

In addition, the five emission clock signals CLK_EMI1 to CLK_EMI5 which are the same signals having different phases may be cyclically input to the unit emission driver circuits 40'-1 to 40'-5 for each row-line, one by one in the row-line order.

That is, referring to FIG. 13E, the emission clock signals CLK_EMI1 to CLK_EMI5 may be sequentially input respectively to the unit emission driver circuits 40'-1 to 40'-5 for the first to fifth row-lines. Meanwhile, although not shown in FIG. 13E, the emission clock signals CLK_EPAM1 to CLK_EPAM5 may be cyclically input to the unit emission driver circuits for the 6-th to 10-th row-lines in the row-line order. This configuration may be also the same for the unit emission driver circuits for the rest row-lines.

Meanwhile, the first carry clock signals CLK_Carry1 to CLK_Carry5 and the second carry clock signals CLKB_Carry1 to CLKB_Carry5 may be cyclically input to the unit emission driver circuits 40'-1 to 40'-5 for each row-line, one by one in the row-line order.

That is, referring to FIG. 13E, the first carry clock signals CLK_Carry1 to CLK_Carry5 may be sequentially input respectively to the unit emission driver circuits 40'-1 to 40'-5 for the first to fifth row-lines. Meanwhile, although not shown in FIG. 13E, the first carry clock signals CLK_Carry1 to CLK_Carry5 may be cyclically input again to the unit emission driver circuits for the 6-th to 10-th row-lines, in the row-line order. This configuration may be also the same for the unit emission driver circuits for the rest row-lines.

In addition, the second carry clock signals CLKB_Carry1 to CLKB_Carry5 may be sequentially input respectively to the unit emission driver circuits 40'-1 to 40'-5 for the first to fifth row-lines. Meanwhile, although not shown in FIG. 13E, the second carry clock signals CLKB_Carry1 to CLKB_Carry5 may be cyclically input again to the unit emission driver circuits for the 6-th to 10-th row-lines, in the row-line order. This configuration may be also the same for the unit emission driver circuits for the rest row-lines.

Accordingly, the emission driver 400' may apply the low-level emission signal EMI(n) to the display panel 100 in the image frame period 60 and a portion of the section 66 of the blanking period 65, thereby implementing the light emission section.

In addition, the emission driver 400 may apply the high-level emission signal EMI(n) to the display panel 100 in the no-light emission section 67 of the blanking period 65, thereby implementing the no-light emission section 67.

Figure 14A:
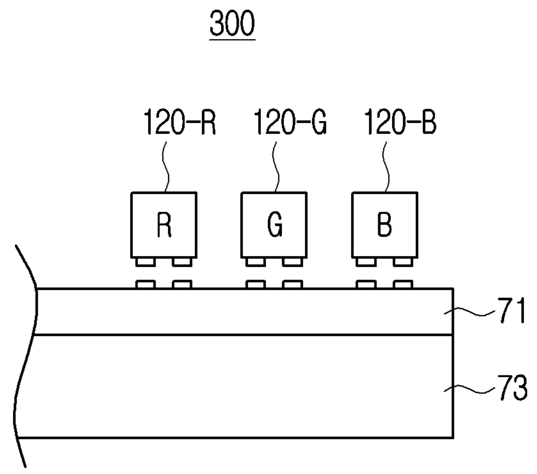
FIG. 14A is a cross-sectional view of the display module according to an embodiment.

FIG. 14A is a cross-sectional view of a display module according to another embodiment of the present disclosure. FIG. 14A shows only one pixel included in the display module 300 for convenience of explanation.

According to FIG. 14A, the display module 300 may include a glass substrate 73, a TFT layer 71, and inorganic light emitting devices R, G, and B 120-R, 120-G, and 120-B. Here, the above-mentioned sub-pixel circuit 110 may be implemented as the thin film transistor (TFT) circuit, and included in the TFT layer 71 on the glass substrate 73.

Each of the inorganic light emitting devices R, G, and B denoted by 120-R, 120-G and 120-B may be mounted on the TFT layer 71 to be electrically connected to the corresponding sub-pixel circuit 110, thereby configuring the above-mentioned sub-pixel.

Although not shown in FIG. 14A, the sub-pixel circuit 110 that provides the driving current to the inorganic light emitting devices 120-R, 120-G or 120-B for each of the inorganic light emitting device 120-R, 120-G and 120-B may exist in the TFT layer 71, and each of the organic light emitting devices 120-R, 120-G and 120-B may be mounted or disposed on the TFT layer 71 to be electrically connected to the corresponding sub-pixel circuit 110.

Meanwhile, FIG. 14A exemplifies that the inorganic light emitting devices R, G, and B denoted by 120-R, 120-G and 120-B are flip chip type micro LEDs. However, the inorganic light emitting devices R, G, and B denoted by 120-R, 120-G and 120-B are not limited thereto, and may be lateral or vertical type micro LEDs according to an embodiment.

Figure 14B:
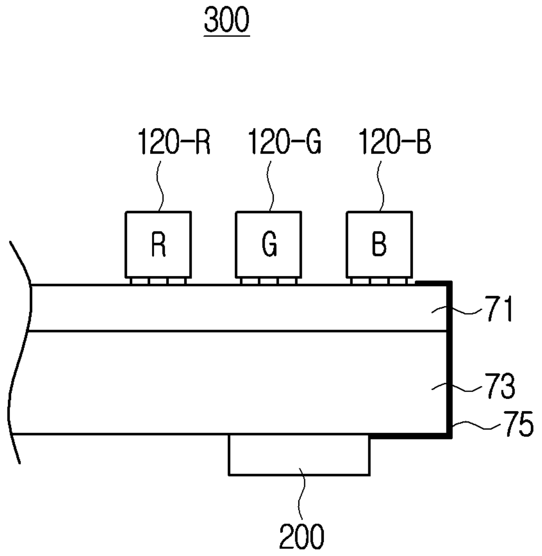
FIG. 14B is a cross-sectional view of a display module according to an embodiment.

FIG. 14B is a cross-sectional view of a display module according to still another embodiment of the present disclosure.

According to FIG. 14B, the display module 300 may include the TFT layer 71 positioned on one surface of the glass substrate 73, inorganic light emitting devices R, G and B, denoted by 120-R, 120-G and 120-B, mounted on the TFT layer 71, the driving unit 200, and connection wiring 75 for electrically connecting the sub-pixel circuit 110 positioned in the TFT layer 71 and the driving unit 200 to each other.

As described above in FIG. 4, according to still another embodiment of the present disclosure, at least some of the various circuits of the driving unit 200 may be implemented in a separate chip and disposed on a rear surface of the glass substrate 73, and connected to the sub-pixel circuits 110 positioned in the TFT layer 71 through the connection wiring 75.

In this regard, referring to FIG. 14B, it may be seen that the sub-pixel circuits 110 included in the TFT layer 71 are electrically connected to the driving unit 200 through the connection wiring 75 positioned on an edge (or side) of a TFT panel (hereinafter, the TFT layer 71 and the glass substrate 73 are collectively referred to as the TFT panel).

In this way, the sub-pixel circuits 110 included in the TFT layer 71 and the driving unit 200 may be connected to each other by positioning the connection wiring 75 in an edge region of the display panel 100. The reason is that a crack may occur in the glass substrate 73 due to a temperature difference between a manufacturing process of the TFT panels 71 and 73 and a process of filling a hole with a conductive material if the sub-pixel circuits 110 and the driving unit 200 are connected to each other by forming the hole passing through the glass substrate 73.

Figure 14C:
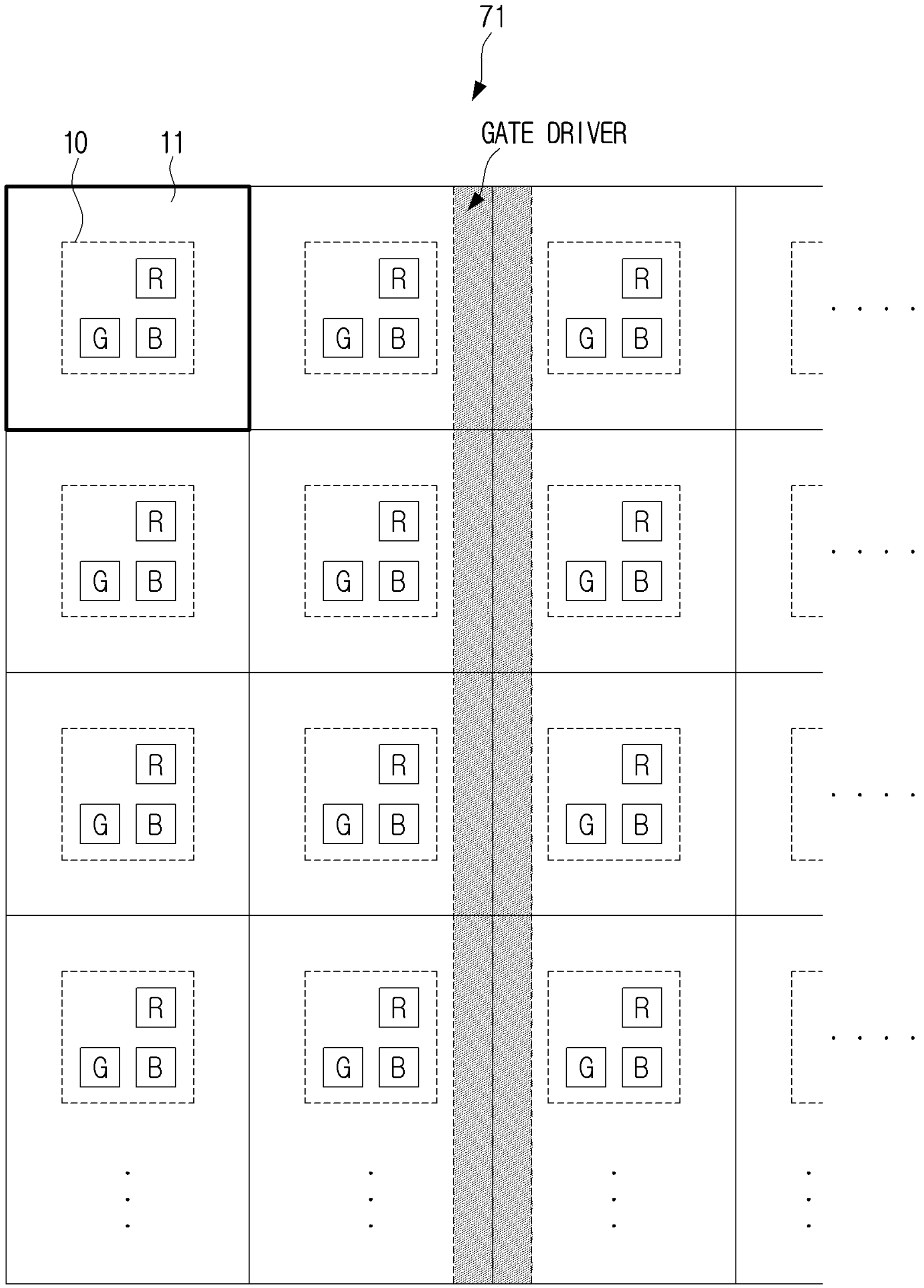
FIG. 14C is a plan view of a thin film transistor (TFT) layer according to an embodiment.

Meanwhile, according to an embodiment of the present disclosure as described above with reference to FIG. 4, at least some of the various circuits of the driving unit 200 may be positioned in the TFT layer together with the sub-pixel circuits positioned in the TFT layer in the display panel 100, and connected to the sub-pixel circuits. FIG. 14C shows this embodiment.

FIG. 14C is a plan view of a thin film transistor (TFT) layer according to an embodiment of the present disclosure. Referring to FIG. 14C, it may be seen that the TFT layer 71 has a rest region 11 in addition to a region occupied by one pixel 10 (and the sub-pixel circuit 110 corresponding to each of the R, G, and B sub-pixels included in the pixel 10 exists in this region).

As such, the TFT layer 71 may have the rest region 11, and some of the various circuits of the above-mentioned driving unit 200 may be positioned in the rest region 11.

FIG. 14C exemplifies that the above-mentioned gate drivers are positioned in the rest region 11 of the TFT layer 71. The above structure in which the gate driver may be positioned in the TFT layer 71 may be referred to as a gate-in-panel (GIP) structure, and is not limited by this name.

Meanwhile, FIG. 14C is only an example, and a circuit which may be included in the rest region 11 of the TFT layer 71 is not limited to the gate driver. In some embodiments, the TFT layer 71 may be further provided with the DeMUX circuit for selecting each of the R, G, and B sub-pixels, an electro static discharge (ESD) protection circuit for protecting the sub-pixel circuit 110 from static electricity, a sweep voltage supply circuit, etc.

Figure 15:
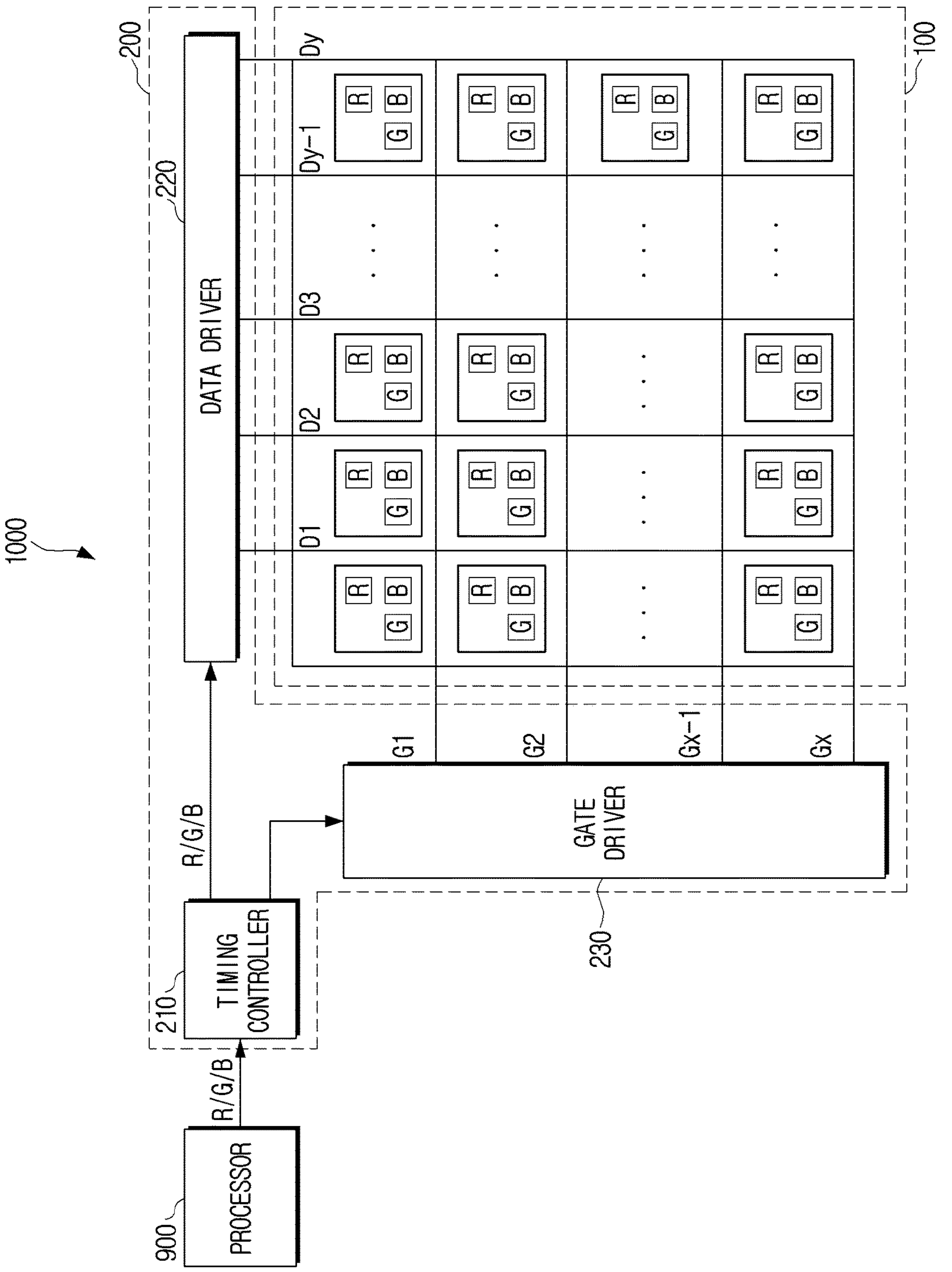
FIG. 15 is a block diagram of a display device according to an embodiment.

FIG. 15 is a block diagram of a display device 1000 according to an embodiment of the present disclosure.

Referring to FIG. 15, the display device 1000 may include the display panel 100, the driving unit 200, and a processor 900.

The display panel 100 may include the plurality of pixels, and each pixel may include the plurality of sub-pixels.

In detail, the display panel 100 may be a matrix form in which agate lines G1 to Gx and data lines D1 to Dy cross each other, and each pixel may be positioned in a region provided at their intersection.

Here, each pixel may include the three sub-pixels such as R, G, and B, and each sub-pixel included in the display panel 100 may be, as described above, the inorganic light emitting device 120 and the sub-pixel circuit 110, corresponding to each color.

Here, the data lines D1 to Dy may be lines for applying the data voltage (in particular, the PWM data voltage) to each sub-pixel included in the display panel 100, and the gate lines G1 to Gx may be lines for selecting the pixels (or sub-pixels) included in the display panel 100 for each line. Accordingly, the data voltage applied through the data lines D1 to Dy may be applied to the pixel (or sub-pixel) of a row-line selected through the gate signal.

Here, according to an embodiment of the present disclosure, a data voltage to be applied to a pixel connected to each data line may be applied to each of the data lines D1 to Dy. Here, one pixel may include the plurality of sub-pixels (e.g., R, G, and B sub-pixels), and the data voltage to be applied to each of the R, G, and B sub-pixels included in one pixel (i.e., R data voltage, G data voltage, and B data voltage) may be time-divided and applied to each sub-pixel through one data line. As described above, the data voltage time-divided and applied through one data line may be applied to each sub-pixel through the DeMUX circuit.

In some embodiments, a separate data line may be provided for each of R, G, and B sub-pixel. In this case, the R data voltage, the G data voltage, or the B data voltage does not need to be time-divided and applied, and a corresponding data voltage may be simultaneously applied to a corresponding sub-pixel through each data line.

Meanwhile, FIG. 15 shows only one set of gate lines such as G1 to Gx for convenience of illustration. However, the actual number of gate lines may depend on a method of driving the sub-pixel circuit 110 included in the display panel 100.

The driving unit 200 may drive the display panel 100 under control of the processor 900, and include a timing controller 210, a data driver 220, and a gate driver 230.

The timing controller 210 may receive an input signal IS, a horizontal synchronization signal Hsync, a vertical synchronization signal Vsync, and a main clock signal MCLK from the outside, generate an image data signal, a scan control signal, a data control signal, a light emission control signal, etc, and provide the same to the display panel 100, the data driver 220, the gate driver 230, and the like.

In addition, the timing controller 210 may apply a control signal, i.e., DeMUX signal, for selecting each of the R, G, and B sub-pixels to the DeMUX circuit (not shown). Accordingly, the plurality of sub-pixels included in the pixels of the display panel 100 may be respectively selected through the DeMUX circuit (not shown).

The data driver 220 (or the source driver) may be a means for generating a data signal (in particular, the PWM data voltage), and generate the data signal by receiving an image data of an R/G/B component from the processor 900. In addition, the data driver 220 may apply the generated data signals to the respective sub-pixel circuits 110 of the display panel 100 through the data lines D1 to Dy.

The gate driver 230 may generate the various gate signals (e.g., VST, SP, Emi_PWM, Emi_PAM, Sweep, SET, and the like) for selecting and driving pixels arranged in the matrix form in the row-line units, and apply the generated gate signals to the display panel 100 through the gate lines G1 to Gx. In particular, according to an embodiment of the present disclosure, the gate driver 230 may sequentially apply the generated gate signals in the row-line order.

Meanwhile, although not shown in FIG. 15, the driving unit 200 may further include the driving voltage supply circuit for providing each sub-pixel circuit included in the display panel 100 with various driving voltages (e.g., first driving voltage VDD_PAM, second driving voltage VDD_PWM, ground voltage VSS, reset voltage Vset, test voltage TEST, and constant current source voltage VPAM_R/G/B), the clock signal supply circuit for providing the various clock signals to the gate driver 230 or the data driver 220, the DeMUX circuit, the sweep voltage supply circuit, the ESD protection circuit, and the like.

The processor 900 may control overall operations of the display device 1000. In particular, the processor 900 may control the driving unit 200 to drive the display panel 100.

To this end, the processor 900 may be implemented as one or more of a central processing unit (CPU), a micro-controller, an application processor (AP), a communication processor (CP), and an advanced RISC machine (ARM) processor.

Meanwhile, FIG. 15 shows the processor 900 and the timing controller 210 as separate components. However, in some embodiments, only one of the two components may be included in the display device 1000, and the included component may perform a function of the other component.

According to the various embodiments of the present disclosure as described above, it may be possible to prevent the wavelength of light emitted from the inorganic light emitting device from being changed based on its grayscale.

It may be possible to easily correct a blotch or color which may occur in the image displayed on the display panel due to characteristic deviation between the sub-pixel circuits. In particular, it may be possible to more easily correct a difference in the luminance or colors of the display modules even when a large-area display panel may be configured by combining the module-type display panels with each other.

It may be possible to design a more optimized driving circuit, and drive the inorganic light emitting device stably and efficiently. It may also be possible to reduce the power consumption when driving the display panel. It may also contribute to the smaller size and weight of the display panel. It may also be possible to detect the malfunction of the display panel even while a user uses the display module.

Meanwhile, the above description exemplifies that the sub-pixel circuit 110 be implemented as the P-type TFT, and the N-type TFT may also use any of the above-mentioned various embodiments.

In addition, the above description exemplifies that the glass substrate 73 may be the substrate on which the TFT layer 71 may be positioned, and the embodiments are not limited thereto. For example, the TFT layer 71 may be positioned on a synthetic resin substrate. In this case, the sub-pixel circuits 110 of the TFT layer 71 and the driving unit 200 on the rear surface of the substrate may be connected with each other through a hole passing through the synthetic resin substrate.

Meanwhile, the above description exemplifies that the sub-pixel circuit 110 may be implemented in the TFT layer 71. However, the embodiments are not limited thereto. That is, according to another embodiment of the present disclosure, the sub-pixel circuit 110 may also be implemented in such a manner that an ultra-small microchip-type pixel circuit chip may be implemented in a sub-pixel unit or pixel unit and mounted on a substrate without using the TFT layer 71. Here, the sub-pixel chip may be mounted, for example, around the corresponding inorganic light emitting device 120, and it not limited to this position.

In addition, the above description exemplifies that the gate drivers are positioned in the TFT layer 71, and the embodiments are not limited thereto. That is, according to another embodiment of the present disclosure, the gate drivers or the unit gate driver circuits for each row-line, included in the gate driver may be implemented as Ultra-small micro IC type gate driver chips or unit gate driver circuit chips, and mounted on the TFT layer 71.

In addition, in the above-described various embodiments of the present disclosure, the TFT included in the TFT layer (or TFT panel) is not limited to a specific structure or type. That is, the TFT cited in the various embodiments of the present disclosure may be implemented as a low temperature poly silicon (LTPS) TFT, an oxide TFT, a silicon (poly silicon or a-silicon) TFT, an organic TFT, a graphene TFT, or the like, or may use only the P-type (or N-type) MOSFET manufactured in a silicon (Si) wafer complementary metal-oxide semiconductor (CMOS) process.

The spirit of the present disclosure has been illustratively described hereinabove. It will be appreciated by those skilled in the art that various modifications and alterations may be made without departing from the essential features of the present disclosure. In addition, the embodiments disclosed in the present disclosure are provided to fully describe the present disclosure rather than to limit the spirit of the present disclosure, and the scope of the present disclosure is not limited by the embodiments. Accordingly, the scope of the present disclosure should be interpreted by the following claims, and it should be interpreted that all the spirits equivalent to the following claims fall within the scope of the present disclosure.

What is claimed is:

1. A display module comprising:

a display panel comprising a plurality of pixels each including a plurality of sub-pixels are arranged in a matrix form; and a driving circuit configured to:

apply a first control signal for setting a pulse width modulation (PWM) data voltage of the sub-pixels included in all the row-lines of the display panel in a row-line order for each image frame, and apply a second control signal for controlling light emission of the sub-pixels included in all the row-lines thereof in the row-line order based on a start signal, wherein the sub-pixels included in each row-line are configured to:

emit light for time corresponding to the PWM data voltage set based on the first control signal, based on the second control signal applied to the light emission section corresponding to the image frame, and emit no light for a predetermined time based on the second control signal applied to a period between consecutive image frame periods.

2. The display module as claimed in claim 1, further comprising a processor configured to detect a malfunction in the display panel based on power supplied to the display panel during the predetermined time.

3. The display module as claimed in claim 1, wherein the driving circuit is further configured to apply the second control signal to the sub-pixels included in all the row-lines in the row-line order whenever the start signal is input in case that the start signal is input several times at predetermined time intervals during one image frame period.

4. The display module as claimed in claim 3, wherein the sub-pixels included in each row-line are operated in the plurality of light emission sections whose number corresponds to the input number of the start signal during the one image frame period.

5. The display module as claimed in claim 1, wherein each of the sub-pixels in each row-line an inorganic light emitting device and a transistor connected to the inorganic light emitting device, and wherein the transistor is configured to be turned on based on the second control signal applied to the plurality of the light emission sections, and turned off based on the second control signal applied to the period between the consecutive image frame periods.

6. The display module as claimed in claim 1, wherein the driving circuit further comprises a plurality of driver circuits configured to apply the second control signal for each row-line.

7. The display module as claimed in claim 6, wherein each of the plurality of driver circuits comprises:

an output terminal for outputting a carry signal; and a transistor comprising a gate terminal connected to the output terminal, wherein the transistor is configured to select the second control signal applied to the sub-pixels included in each row-line from an input signal and outputs the same, based on the carry signal input through the gate terminal.

8. The display module as claimed in claim 7, further comprising:

a first driver circuit configured to:

output the second control signal applied to the sub-pixels included in a first row-line among the plurality of driver circuits which generates a first carry signal based on the start signal, select the second control signal applied to the sub-pixels included in the first row-line from the input signal and output the same, based on the first carry signal, and a second driver circuit is configured to:

output the second control signal applied to the sub-pixels included in a second row-line among the plurality of driver circuits which generates a second carry signal based on the first carry signal, and generate the second control signal applied to the sub-pixels included in the second row-line from the input signal, based on the second carry signal.

9. The display module as claimed in claim 8, wherein input signals to the first driver circuit and the second driver circuit are the same signals having different phases.

10. The display module as claimed in claim 1, wherein the driving circuit is further configured to:

apply scan signals including the first control signal to the sub-pixels included in one row-line to set the PWM data voltage of the sub-pixels included in the one row-line, during a data setting section for the one row-line of all the row-lines, and apply emission signals including the second control signal to the sub-pixels included in the one row-line to drive the display panel for the sub-pixels included in the one row-line to emit light for the time corresponding to the set PWM data voltage, during each of the plurality of the light emission sections for the one row-line.

11. The display module as claimed in claim 10, wherein a first light emission section among the plurality of light emission sections is temporally consecutive with the data setting section, and the plurality of light emission sections have a predetermined time interval.

* * * * *